(12) United States Patent
Tokita et al.

(10) Patent No.: US 6,440,508 B1
(45) Date of Patent: *Aug. 27, 2002

(54) LAMINATED FILM, METHOD FOR PRODUCTION THEREOF, BAG AND PACKAGE USING THE LAMINATED FILM, AND METHOD FOR SEPARATION THEREOF

(75) Inventors: Yoshiaki Tokita, Urayasu; Takahiro Takagi, Saitama-ken, both of (JP)

(73) Assignee: Kyodo Shiko Co., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/654,836

(22) Filed: Sep. 1, 2000

Related U.S. Application Data

(62) Division of application No. 08/969,792, filed on Nov. 13, 1997, now Pat. No. 6,244,746.

(51) Int. Cl.[7] .............................................. B65D 30/02
(52) U.S. Cl. ................... 428/35.2; 428/35.4; 428/36.6; 428/518; 428/516; 428/520; 426/127; 383/1; 383/208; 383/209; 383/210; 206/484.2; 206/524.7
(58) Field of Search ................. 428/35.2, 35.4, 428/35.9, 36.6, 518, 520, 516; 383/1, 210, 61, 208, 209; 206/484.2, 524.7, 438; 426/127; 43/1

(56) References Cited

U.S. PATENT DOCUMENTS

| 2,541,674 A | 2/1951 | Snyder |
| 3,114,643 A | 12/1963 | Boston et al. |
| 3,272,424 A | 9/1966 | Rodkey |
| 3,419,137 A | 12/1968 | Walck, III |

(List continued on next page.)

FOREIGN PATENT DOCUMENTS

| AU | A-77062/91 | 11/1991 |
| EP | A1-0011502 | 5/1980 |
| EP | A1-0190776 | 8/1986 |
| EP | 0 328 052 A1 | 8/1989 |
| EP | 0 328 245 | 8/1989 |
| EP | 0 328 317 A1 | 8/1989 |
| EP | A1-0-608 801 | 8/1991 |
| EP | 0 457 600 A2 | 11/1991 |
| EP | 0 514 172 A1 | 11/1992 |
| EP | A-0520280 | 12/1992 |
| EP | A1-0518689 | 12/1992 |
| EP | A2-0 644 032 | 3/1995 |
| EP | A2-0769369 | 4/1997 |
| FR | 1600060 | 8/1970 |
| FR | 2585248 | 1/1987 |
| GB | 922317 | 9/1963 |
| GB | A-1054808 | 1/1967 |
| GB | 2 150 908 A | 7/1985 |

(List continued on next page.)

OTHER PUBLICATIONS

The New Food & Drug Packaging, "Containers/Materials", Jan. 1994.
C.A. Finch, "Polyvinyl Alcohol", Properties and Applications, Croda Polymers Ltd., Luton, p. 241–243.
SoluGard, Packaging Strategies, Graphic Packaging Co., Dec. 15, 1994.

*Primary Examiner*—Rena L. Dye
(74) *Attorney, Agent, or Firm*—Oliff & Berridge, PLC

(57) ABSTRACT

A laminated film includes an outer-layer-film, a water-soluble film, and an intermediate layer interposed between the outer-layer-film and the water-soluble film. The intermediate layer contains high-pressure polyethylene oxidized to a prescribed degree on a surface thereof contiguous to the water-soluble film. The outer-layer-film and the intermediate layer adhere fast to each other. The intermediate layer and the water-soluble film directly contact each other and adhere so weakly to each other as to be peelable.

11 Claims, 27 Drawing Sheets

U.S. PATENT DOCUMENTS

| | | |
|---|---|---|
| 3,454,210 A | 7/1969 | Spiegel et al. |
| 3,768,725 A | 10/1973 | Pilaro |
| 4,279,344 A | 7/1981 | Holloway, Jr. |
| 4,289,815 A | 9/1981 | Lee |
| 4,365,716 A | 12/1982 | Watt |
| 4,416,791 A | 11/1983 | Haq |
| 4,498,591 A | 2/1985 | Smith, II |
| 4,648,513 A | 3/1987 | Newman |
| 4,680,340 A | 7/1987 | Oreglia et al. |
| 4,681,228 A | 7/1987 | Kerry et al. |
| 4,705,174 A | 11/1987 | Goglio |
| 4,785,937 A | 11/1988 | Tamezawa et al. |
| 4,787,517 A | 11/1988 | Martin |
| 4,844,828 A | 7/1989 | Aoki |
| 4,875,587 A | 10/1989 | Lulham et al. |
| 4,886,615 A | 12/1989 | Dehan |
| 4,886,690 A | 12/1989 | Davis et al. |
| 4,889,731 A | 12/1989 | Williams, Jr. |
| 4,923,309 A | 5/1990 | VanErden |
| 5,005,695 A | 4/1991 | Tennefos et al. |
| 5,015,513 A | 5/1991 | Newbold et al. |
| 5,078,301 A | 1/1992 | Gladfelter et al. |
| 5,080,226 A | 1/1992 | Hodakowski et al. |
| 5,230,994 A | 7/1993 | Beer et al. |
| 5,253,754 A | 10/1993 | Soodak |
| 5,279,421 A | 1/1994 | Gouge et al. |
| 5,281,027 A | 1/1994 | Thrall |
| 5,316,688 A | 5/1994 | Gladfelter et al. |
| 5,330,047 A | 7/1994 | Gouge et al. |
| 5,341,922 A | 8/1994 | Cerwin et al. |
| 5,362,532 A | 11/1994 | Famili et al. |
| D355,436 S | 2/1995 | Suwa |
| 5,403,589 A | 4/1995 | Edwards et al. |
| 5,429,874 A | 7/1995 | Vanputte |
| 5,441,805 A | 8/1995 | Kwok |
| 5,459,928 A | 10/1995 | Hustad et al. |
| 5,468,526 A | 11/1995 | Allen et al. |
| 5,487,940 A | 1/1996 | Bianchini et al. |
| 5,487,947 A | 1/1996 | Kakishita et al. |
| 5,614,318 A | 3/1997 | Hayashi |
| 5,622,432 A | 4/1997 | Zicker |
| 5,655,653 A | 8/1997 | Chester |
| 5,691,015 A | 11/1997 | Tsukamoto et al. |
| 5,827,586 A | 10/1998 | Yamashita et al. |
| 6,040,024 A * | 3/2000 | Tokita et al. .............. 428/35.2 |
| 6,213,645 B1 | 4/2001 | Beer |

FOREIGN PATENT DOCUMENTS

| | | |
|---|---|---|
| GB | 2193925 A | 2/1988 |
| GB | 2244258 A | 11/1991 |
| JP | 54-97193 | 8/1979 |
| JP | A-56-72006 | 6/1981 |
| JP | U-60-32273 | 3/1985 |
| JP | A-61-164983 | 7/1986 |
| JP | 1-153459 | 6/1989 |
| JP | 226569 | 9/1989 |
| JP | 2-163149 | 6/1990 |
| JP | 242748 | 9/1990 |
| JP | 4-57989 | 2/1992 |
| JP | 5/140350 | 6/1993 |
| JP | A-6-72469 | 3/1994 |
| JP | A-6134942 | 5/1994 |
| JP | A-6-155690 | 6/1994 |
| JP | A-6-219492 | 8/1994 |
| JP | A-06286082 | 10/1994 |
| JP | A-6328608 | 11/1994 |
| JP | A-6-329820 | 11/1994 |
| JP | A-6-329821 | 11/1994 |
| JP | A-07002272 | 1/1995 |
| JP | A-6-127593 | 5/1995 |
| JP | A-07118407 | 5/1995 |
| JP | A-7-195647 | 8/1995 |
| JP | A-9066261 | 3/1997 |
| JP | A-9-164623 | 6/1997 |
| JP | A-9-221147 | 8/1997 |
| SE | 303252 | 8/1968 |
| WO | WO 93/22215 | 11/1993 |
| WO | WO 94/29104 | 12/1994 |
| WO | WO 96/15903 | 5/1996 |

* cited by examiner

LAMINATED FILM, METHOD FOR PRODUCTION THEREOF, BAG AND PACKAGE USING THE LAMINATED FILM, AND METHOD FOR SEPARATION THEREOF

This is a Division of application Ser. No. 08/969,792 filed Nov. 13, 1997 now U.S. Pat No. 6,244,746. The entire disclosure of the prior applications is hereby incorporated by reference herein in its entirety.

BACKGROUND OF THE INVENTION

The present invention relates to a laminated film, a method for the production thereof, a bag and a package both using the laminated film, and a method of the peeling (or separating) thereof.

Heretofore, for the purpose of accommodating agricultural chemicals and other various commodities, bags which are made of a laminated film having the component layers thereof joined by lamination so strongly as to be impossible to peel have been used. The conventional laminated film has for the innermost layer thereof a film (such as, for example, LLD-PE (linear low-density polyethylene) film) that is thermally adhesive (namely heat-sealable) to itself. A commodity is placed in a hermetically sealed bag produced by superposing this laminated film so that the thermally adhesive film is. positioned inside, and heat-sealing the prescribed portions of the superposed laminated film so that the parts of the thermally adhesive film facing to each other at the prescribed portions are fused to each other.

As means for enabling commodities to be contained in hermetically sealed bags that are made of the laminated film mentioned above, the two methods called "bag supplying method" and "automatic packaging method". are known. The bag supplying method comprises a manufacturer of bags initially producing bags open in one side from the laminate film mentioned above and a manufacturer of commodities then receiving the supply of these bags, filling the bags with their commodities via the openings thereof, and thereafter occluding the openings of the bags by heat-sealing. The automatic packaging method comprises a manufacturer, for example, of commodities forwarding the laminated film mentioned above through the sequential steps of the process of production of bags such as, for example, superposing the laminated film upon itself, heat-sealing the prescribed portions of the superposed laminated film, and filling the formed bags with their commodities, and finally obtaining hermetically sealed bags accommodating the commodities therein. Irrespectively of the choice between these two methods, automatic machines adapted to automate the steps of manufacture mentioned above have been finding extensive adoption by the manufacturers of commodities. In the case of the bag supplying method, for example, such automatic machines as are capable of automatically filling the bags opened in one side with the commodities and then automatically heat-sealing the openings of the filled bags are used. In the case of the automatic packaging method, such automatic machines as are capable of automating the process of automatic packaging mentioned above are used.

Generally, even when the commodity to be contained happens to be a powdery agricultural chemicals (which is generally diluted with water prior to use), for example, it is directly contained in the bag that is made of the conventional laminated film mentioned above. When a user of the agricultural chemicals opens the bag, the powdery agricultural chemicals is drifted up through the opened side of the bag possibly to be inhaled by the user or suffered to impinge on the user's hands, with the result that the powder will do harm to the user's system. When the user transfers the powdery agricultural chemicals from the bag into a tank for the purpose of diluting it with water, the powdery agricultural chemicals is likewise drifted up and suffered to do harm to the user's system. Even after the agricultural chemicals has been extracted from the bag, the remnant thereof adheres to the inner wall of the bag. If the bag in this condition is discarded among the household rubbish, therefore, it will form a cause for environmental pollution.

For the purpose of safeguarding the environment against this danger, therefore, the practice of containing a given powdery agricultural chemicals in a bag made of a water-soluble film, hermetically sealing this bag, further containing the bag of the water-soluble film accommodating the agricultural chemicals in a bag formed of the conventional laminated film mentioned above, and hermetically sealing the outer bag has been in vogue in recent years. In this case, the bag of the water-soluble film serves as an inner bag and the bag of the conventional laminated film as an outer bag. The reason for using the outer bag in this manner is that the water-soluble film succumbs readily to the degeneration by the ambient condition and possesses no sufficient strength.

When the inner bag and the outer bag are used as described above, the outer bag can be opened without entailing the danger of drifting up the agricultural chemicals and the inner bag containing the agricultural chemicals can be directly placed in a tank and diluted with the water accommodated in the tank (because the inner bag of the water-soluble film dissolves on contact with water), with the result that the composite bag will ensure perfect ease of handling because the agricultural chemicals accommodated therein no longer has the possibility of doing harm to the user's system or jeopardizing the safety of the environment. After the agricultural chemicals has been extracted from the outer bag, absolutely no remnant thereof is adhering to the inner wall of the outer bag. When the outer bag is discarded as it is among household rubbish, therefore, it entails absolutely no problem.

The foregoing remarks hold good not only for the powdery agricultural chemicals mentioned above but also for a granular or liquid agricultural chemicals and other various commodities.

The conventional practice of using both an inner bag and an outer bag, however, incurs a huge cost. This conventional practice of using both an inner bag and an outer bag, for example, requires inner bags to be separately produced and necessitates an extra cost for this production. The operation of placing the inner bag accommodating a given commodity in the outer bag, for example, necessitates the use of new devices at an extra cost of equipment because this operation does not permit use of the aforementioned existing automatic machines which fit the bag supplying method and the automatic packaging method mentioned above.

The idea of preparing a laminated film having an outer-layer-film and a water-soluble film weakly joined to each other in a peelable manner through the adhesive of weak adhesive force (adhesive strength or peel strength) and, in accordance with the conventional bag supplying method or automatic packaging method mentioned above, superposing this laminated film so that the water-soluble film is positioned inside, heat-sealing the prescribed portions of the superposed laminated film so that the parts of the water-soluble film facing to each other a the prescribed portions are fused to each other, thereby forming a hermetically sealed bag, and containing a commodity in this bag is conceivable in the circumstance. Incidentally, the water-soluble film is generally thermally adhesive to itself.

According to this method employing the adhesive, the bag made of the laminated film mentioned above has a double-wall structure consisting of an outer-layer-film functioning as an outer bag and a water-soluble film functioning as an inner bag. The user of the commodity contained in this bag, similarly to the aforementioned composite bag consisting of an inner bag and an outer bag, is only required to peel (or separate) the outer-layer-film to obtain the commodity as contained in the inner bag of the water-soluble film without entailing the danger of drifting up the commodity such as, for example, agricultural chemicals. He is then required to place the inner bag still accommodating the commodity in the tank and dilute it with the water accommodated in the tank (because the bag made of the water-soluble film dissolves on contact with water), with the result that the user will enjoy perfect ease of handling because the commodity accommodated therein no longer has the possibility of doing harm to his system or jeopardizing the safety of the environment.

Since the laminated film mentioned above can be handled during the insertion of a given commodity therein in the same manner as the conventional laminated film, the existing automatic machines and other devices can be used in their unmodified form. The bag incurs no noticeable addition to the cost of production because it obviates the necessity of separately producing inner bags unlike the aforementioned composite bag consisting of an inner bag and an outer bag.

In the method resorting to an adhesive agent, the adhesive agent is not easily obtained as vested with ideal properties for the adhesion contemplated by the method. The product of this method, therefore, has the possibility that the properties of the adhesive and the water-soluble film will vary with the elapse of time because of the reaction between the components of the adhesive and the water-soluble film. The possibility that the outer-layer-film will not be easily peeled off from water-soluble film when the user seeks to use the commodity accommodated in the bag, the outer-layer-film will peel from the water-soluble film before the bag reaches the user, the water-soluble film will sustain pinholes therein, or the water-soluble film will suffer degradation of the water-solubility thereof, therefore, is undeniable. Further, the possibility exists that part of the adhesive will remain on the water-soluble film and go to impair the solubility of the water-soluble film after the outer-layer-film has been peeled from the water-soluble film and the components of the adhesive will react with the components of the commodity such as, for example, agricultural chemicals in the tank accommodating water and degenerate the commodity after the water-soluble film has been dissolved in the water during the use of the commodity.

In the method described above, the user of the commodity accommodated in the bag incurs inconvenience in peeling the outer-layer-film unless the bag is provided with a part which becomes a beginning for peeling the outer-layer-film.

SUMMARY OF THE INVENTION

The present invention has been produced in view of he circumstances mentioned above. The present invention has an object of providing a laminated film capable of producing by the use of existing facilities a bag having a double-wall structure essentially consisting of an outer bag and an inner bag made of a water-soluble film and excelling in the peeling property of the outer bag, a method for producing the laminated film, and a bag and a package both using the laminated film.

The present invention has another object of providing a bag and a package which both have a double-wall structure essentially consisting of an outer bag and an inner bag made of a water-soluble film, permit effective use of the existing facilities for the production thereof, and allows the outer bag film thereof to be easily peeled when the commodity accommodated therein is used, and a method for the peeling thereof.

To solve the problems mentioned above, a laminated film according to a first aspect of the present invention comprises: an outer-layer-film including one or more layers; a water-soluble film; and an intermediate layer interposed between the outer-layer-film and the water-soluble film, the intermediate layer containing high-pressure polyethylene oxidized to a prescribed degree at least on a surface thereof contiguous to the water-soluble film. The outer-layer-film and the intermediate layer adhere fast to each other. The intermediate layer and the water-soluble film directly contact each other and adhere so weakly to each other as to be peelable (or separable).

The term "fast adhesion" as used herein means the union of two faces with such adhesive force as to render their peeling substantially difficult and the term "weak adhesion" means the union of two faces with such adhesive force as is weaker than that of the fast adhesion mentioned above and is capable of allowing the joined faces to peel.

A laminated film according to a second aspect of the present invention is a laminated film according to the first aspect, wherein the intermediate layer contains an ethylene. α-olefin copolymer elastomer mixed with the high-pressure polyethylene.

A laminated film according to a third aspect of the present invention is a laminated film according to the first or the second aspect, wherein the carbonyl groups of the oxidized high-pressure polyethylene on the surface of the intermediate layer are bound to the hydroxyl groups of a surface of the water-soluble film.

A laminated film according to a fourth aspect of the present invention is a laminated film according to any of the first through third aspects, wherein the water-soluble film comprises at least one material selected from the group consisting of polyvinyl alcohol, vinyl acetate, vinyl acetate type resin, polyacrylamide, polyethylene oxide, and polyvinylpyrrolidone.

A laminated film according to a fifth aspect of the present invention is a laminated film according to any of the first through the fourth aspects, wherein the water-soluble film has the surface thereof contiguous to the intermediate layer subjected to a corona treatment.

A method for producing a laminated film according to a sixth aspect of the present invention comprises: a step of extruding a melted and thermally oxidized high-pressure polyethylene in the form of a film between an outer-layer-film including one or more layers and a water-soluble film; and a step of compressing and meanwhile cooling the outer-layer-film, the water-soluble film and the film of high-pressure polyethylene.

A method for producing a laminated film according to a seventh aspect of the present invention comprises: a step of extruding a melted and thermally oxidized mixture containing a high-pressure polyethylene and an ethylene. α-olefin copolymer elastomer in the form of a film between an outer-layer-film including layers and a water-soluble film; and a step of compressing and meanwhile cooling the outer-layer-film, the water-soluble film and the film of the mixture.

A method for producing a laminated film according to a eighth aspect of the present invention is a method according to the sixth or the seventh aspect, further comprising: a step, performed prior to the step of compressing, of blowing ozone against the surface of the film of high-pressure polyethylene or the film of the mixture destined to contact with the water-soluble film.

A method for producing a laminated film according to a ninth aspect of the present invention is a method according to any of the sixth through the eighth aspects, further comprising: a step, performed prior to the step of compressing, of subjecting the surface of the water-soluble film destined to contact with the outer-layer-film to a corona treatment.

A bag according to a tenth aspect of the present invention is made of at least one laminated film set forth in any of the first through the fifth aspects. The at least one laminated film is formed in the shape of a bag opened on one side. The at least one laminated film is superposed so that the water-soluble film is positioned inside. Prescribed portions of the superposed laminated film are heat-sealed so that the parts of the water-soluble film facing to each other at the prescribed portions are fused to each other.

A package according to a eleventh aspect of the present invention comprises a hermetically sealed bag made of at least one laminated film set forth in any of the first through fifth aspects; and a prescribed commodity placed in the bag. The at least one laminated film is superposed so that the water-soluble film is positioned inside. Prescribed portions of the superposed laminated film are heat-sealed so that the parts of the water-soluble film facing to each other at the prescribed portions are fused to each other.

A package according to a twelfth aspect of the present invention is a package according to the eleventh aspect, wherein perforations for tearing are formed in the heat-sealed portion of the package.

A package according to a thirteenth aspect of the present invention comprises: a hermetically sealed bag made of at least one laminated film set forth in any of the first through the fifth aspects, the water-soluble film not being formed on prescribed edge portions of the outer-layer-film; and a prescribed commodity placed in the bag. The at least one laminated film is superposed so that the water-soluble film is positioned inside and that the edge portions are shifted and faced to each other. Prescribed portions of the superposed laminated film are heat-sealed so that the parts of the water-soluble film facing to each other at the prescribed portions are fused to each other.

A package according to a fourteenth aspect of the present invention is a package according to the eleventh aspect, wherein the bag has a non-heat-sealed portion enclosed with the heat-sealed portions and taking no part in accommodating the commodity; and the bag has a notched part for tearing formed in the edge portion corresponding to the non-heat-sealed portion.

A package according to a fifteenth aspect of the present invention is a package according to any of the eleventh through the fourteenth aspects, wherein the commodity is agricultural chemicals, medicament, food, or ground bait.

Here, the inferable basic principle of the weak adhesion in the laminated film according to the first through the fifth aspects will be described below.

In the light of the conventional technical common sense prevalent in the field of laminated films, it is thought that direct adhesion (adhesion in the absence of an adhesive) between high-pressure polyethylene and a water-soluble film is difficult to attain. Absolutely no case of effecting this form of adhesion has ever been reported to date in the field of laminated films. The techniques of lamination include the extrusion lamination in which a plurality of films directly are adhered to each other without using an adhesive, besides the adhesive lamination. However, in the field of techniques of lamination, the extrusion lamination has been established as a technique of attaining fast adhesion of a plurality of films into an integral composite. Absolutely no idea has been conceived of using the extrusion lamination for attaining so weak adhesion of a plurality of films as permits the joined films to be separated by peeling. Absolutely no case of using the extrusion lamination for weak adhesion of a plurality of films has ever been reported. Particularly, absolutely no case of using the extrusion lamination for direct adhesion between a high-pressure polyethylene and a water-soluble film has ever been known.

The high-pressure polyethylene has a repeating unit (represented by the following chemical formula (1), having a hydrogen bond, nonpolar in behavior, for the terminal group thereof.

  (1)

On the other hand, a water-soluble film has the polar group of the form of hydroxyl-OH— for the terminal group thereof. It is, therefore, thought that the direct adhesion (through no medium such as an adhesive) of the two members under discussion is difficult.

The present inventors, after a study, have found that when the surface of a film including high-pressure polyethylene therein is oxidized, union is attained with adhesive force (peeling force) in accordance with to the extent of the oxidation between high-pressure polyethylene and a water-soluble film.

Specifically, when the high-pressure polyethylene is oxidized, the part of the high-pressure polyethylene that responds to the oxidation becomes a composition. represented by the following chemical formula (2).

  (2)

On the other hand, the substance of the water-soluble film such as, for example, polyvinyl alcohol has a repeating unit represented by the following chemical formula (3) and a chemical structure represented by the following chemical formula (4).

  (3)

  (4)

It is, therefore, made possible to generate linkage of relatively weak binding strength between the carbonyl group of the oxidized high-pressure polyethylene and the hydroxyl group of the polyvinyl alcohol as represented by the following chemical formula (5).

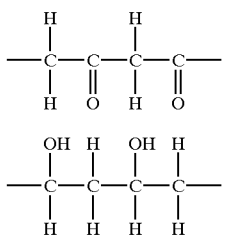

(5)

This linkage generates adhesive force between the film of the oxidized high-pressure polyethylene and the film of the polyvinyl alcohol and allows direct adhesion of the two films. Since the amount of the carbonyl group in the oxidized high-pressure polyethylene varies with the degree of the oxidation, the adhesive force between the film of the oxidized high-pressure polyethylene and the film of the polyvinyl alcohol can be adjusted by the extent to which the high-pressure polyethylene is oxidized. Since other water-soluble films likewise have a hydroxyl group, the principle described above applies not only to the film of polyvinyl alcohol but also to the other water-soluble films.

It is thought based on the principle described above that in the laminated film according to the first aspect mentioned above, the water-soluble film and the intermediate layer containing high-pressure polyethylene oxidized to a prescribed degree at least on the surface thereof contiguous to the water-soluble film directly contact each other and can adhere so weakly to each other as to permit the joined films to be separated by peeling.

For the layer of the outer-layer-film that approximates most to the intermediate layer in the first aspect mentioned above, for example, it suffices to employ a layer to which the high-pressure polyethylene can be joined by thermal adhesion (that is, a layer to which the high-pressure polyethylene in a molten state is capable of adhering fast). As a result, the fast adhesion can be realized between the outer-layer-film and the intermediate layer.

For the outer-layer-film to be used in the present invention, various outer-layer-films which have been used in the conventional laminated films mentioned above may be employed. More specifically for the outer-layer-film, (1) simple polyester film, (2) simple paper, (3) a composite having polyester film thermally adhered to paper (with the paper on the intermediate layer side), (4) a composite obtained by superposing a polyester film, an adhesive layer, an aluminum foil layer, an adhesive layer, and a polyester film sequentially in the order mentioned and dry-laminating the superposed layer by means of the adhesive layers mentioned above, and (5) a composite obtained by superposing an aluminum-evaporated polyester film (polyester film having aluminum evaporated thereon), an adhesive layer, and a polyester film sequentially in the order mentioned and dry-laminating the superposed layers by means of the adhesive layer mentioned above (with the polyester film on the intermediate layer side), for example, may be employed.

The oxidation of the high-pressure polyethylene may be the oxidation caused by heating the high-pressure polyethylene to an elevated temperature (for imparting a molten state to the high-pressure polyethylene, for example) and enabling the oxygen in the air to induce oxidation owing to the elevated temperature (this oxidation referred to hereinafter as "thermal oxidation"), the oxidation induced forcedly, for example, by blowing ozone thereto (this oxidation referred to hereinafter as "forced oxidation"), or the oxidation due to the combination of the thermal oxidation and the forced oxidation. For example, in the case of the thermal oxidation, the amount of the oxidation can be adjusted by suitably varying the temperature of the high-pressure polyethylene, and in the case of the forced oxidation, the amount of the oxidation can be adjusted by suitably varying the concentration of the ozone.

It has been found that when the mixture of the high-pressure polyethylene with an ethylene. α-olefin copolymer elastomer is used for the intermediate layer as in the second aspect mentioned above, the adhesive force between the intermediate layer and the water-soluble film can be adjusted by the ratio of combination of the mixture. Further, the mixture thus incorporating the ethylene. α-olefin copolymer elastomer therein enables the intermediate layer to gain in flexibility. As a result, although the water-soluble film readily expands and contracts, the intermediate layer can follow the expansion and contraction of the water-soluble film, so the possibility that the expansion and contraction of the water-soluble film will induce unintentional peeling or the like between the intermediate layer and the water-soluble film is decreased. A substance which has a similar chemical nature as the ethylene. α-olefin copolymer elastomer may be used in the place or in addition to the elastomer in the mixture.

The water-soluble film may be formed of various substances as cited in the fourth aspect mentioned above. For example, the water-soluble film may be the film of such a water-soluble synthetic polymer as partially saponified polyvinyl alcohol. A water-soluble polyvinyl alcohol type film, for example, may be used as the water-soluble film. As concrete examples of the water-soluble polyvinyl alcohol type film, partially saponified polyvinyl acetate, or polyvinyl alcohol denatured with maleic acid, itaconic acid or the like. The degree of saponification may be in the range of 70–98 mol % and the degree of polymerization may be in the range of 500–3000. These degrees of saponification and polymerization can be suitably determined in respect of the degree of water-solubility, the strength of the film, and the speed of solution in water.

For example, the water-soluble film may be (1) the film of a partially saponified polyvinyl alcohol not being denatured, (2) the film of polyvinyl alcohol denatured with a carboxylic acid, (3) the film of a denatured polyvinyl alcohol incorporating therein an oxyalkylene group or a cationic group, or (4) the film of a denatured polyvinyl alcohol containing a sulfonic acid group. As a concrete example of the water-soluble film of a denatured polyvinyl alcohol containing a sulfonic acid group, the water-soluble film of a denatured polyvinyl alcohol which is disclosed in JP-A-07-118,407 may be cited. This water-soluble film is produced by forming in the shape of a film a denatured polyvinyl alcohol containing 0.1–20 mol % of a sulfonic acid group-containing unit represented by the following chemical formula (6).

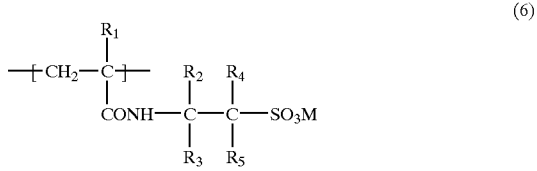

(6)

In the chemical formula (6), $R_1$ is a hydrogen atom or a lower alkyl group, $R_2$ is an alkyl group, $R_3$, $R_4$ and $R_5$ are each independently a hydrogen atom or an alkyl group, and M is a hydrogen atom, an alkali metal atom, an ammonium group, or an amine.

The water-soluble film may have the surface thereof contiguous to the intermediate layer subjected to corona-treated as in the fifth embodiment mentioned above. The corona treatment is generally means for modifying the surface of a given material, particularly a macromolecular material, by virtue of corona discharge in the air under a pressure of not less than 100 mmHg, generally, under the atmospheric pressure. It is useful for enhancing such properties as adhesion. Since a trace amount of ozone gas is generated by corona discharge when the corona treatment is performed, this ozone gas can be used for causing the forced oxidation of the surface of the high-pressure polyethylene by blowing this ozone gas against the high-pressure polyethylene in a molten state.

For example, the laminated film according to any of the first through the fifth aspects mentioned above can be produced by the methods for production according to the sixth through the ninth aspects mentioned above. These methods for production are based on the technique of extrusion lamination. Since these methods for production use the high-pressure polyethylene in a molten state, the high-pressure polyethylene has a high temperature and, therefore, is subjected to thermal oxidation. The amount of the oxidation by the thermal oxidation is determined by the temperature of the high-pressure polyethylene and the duration of the exposure thereof to the ambient air and the like. Incidentally, in the eighth aspect mentioned above, the blowing of ozone is performed for the purpose of further increasing the amount of oxidation of the high-pressure polyethylene. As the ozone for blowing, the ozone which is generated by the corona treatment mentioned above or the ozone which is produced by an ozone generator may be used.

The bag according to the tenth aspect mentioned above is an example of the bag which is made of the laminated film according to any of the first through the fifth aspects mentioned above. Generally, in the bag supplying method already described, the bag is supplied from a manufacturer of bags to a manufacturer of commodities to be accommodated therein. The package according to the eleventh aspect mentioned above is the product obtained by placing prescribed. commodity in a bag similar to the bag according to the tenth aspect mentioned above using the laminated film according to any of the first through the fifth aspects mentioned above except the bag is in a completely hermetically sealed state. The package constitutes itself the final form in which the commodity reaches the consumer thereof. The package according to the eleventh aspect may be a product produced by using the bag of the tenth aspect in accordance with the bag supplying method mentioned above or a product produced by using the laminated film of any of the first through fifth aspects mentioned above in accordance with the automatic packaging method mentioned above.

In the laminated film according to any of the first through the fifth aspects mentioned above, the outer-layer-film and the intermediate layer adhere fast to each other, and the intermediate layer and the water-soluble film directly contact each other and adhere so weakly to each other as to peelable. The package according to the eleventh aspect mentioned above which uses the laminated film, therefore, has a double-wall structure consisting of the outer-layer-film and the intermediate layer (hereinafter collectively referred to as "outer bag film" for the sake of explanation) which adhere fast to each other and act as an outer bag and the water-soluble film which acts as an inner bag. In this structure, the outer bag film and the water-soluble film adhere so weakly to each other as to be peelable. The user of the commodity in the package, therefore, is only required to peel the outer bag film in gaining access to the commodity accommodated in the inner bag of the water-soluble film similarly to the aforementioned composite package consisting of an inner bag and an outer bag. When the commodity happens to be agricultural chemicals, the outer bag does not suffer the commodity to drift up when it is peeled and the inner bag still accommodating the commodity can be placed in a tank and diluted with the water placed in the tank (because the inner bag made of the water-soluble film dissolves on contact with water). This package, therefore, ensures perfect ease of handling because the commodity accommodated therein no longer has the possibility of doing harm to the user's system or jeopardizing the safety.

Since the laminated film according to any of the first through the fifth aspects mentioned above can be handled during the insertion of the commodity therein in the same manner as the conventional laminated film, the existing automatic machines and other devices can be used in their unmodified form. The bag incurs no noticeable addition to the cost of production because it obviates the necessity of separately producing inner bags unlike the aforementioned composite bag consisting of an inner bag and an outer bag.

In the laminated film according to any of the first through the fifth aspects mentioned above, only linkage occurs between the carbonyl group of the oxidized high-pressure polyethylene and the hydroxyl group-of the water-soluble film as described above. There is no possibility that the high-pressure polyethylene and the water-soluble film will induce other chemical reactions with the elapse of time. Unlike the laminated film of the type using an adhesive as mentioned above, the present laminated film can obtain stable adhesive force with the elapse of time between the intermediate layer and the water-soluble film due to a sparing possibility of the change of the properties of the high-pressure polyethylene and the water-soluble film with the elapse of time. As a result, there is no possibility that the outer bag film will not be easily peeled off the water-soluble film when the user seeks to use the commodity accommodated in the bag. There is no possibility that the outer bag film will be peeled off the water-soluble film before the bag reaches the user. There is no possibility that the water-soluble film will have pinholes therein. There is no possibility that the water-solubility thereof. Further, since the adhesive force between the outer bag film and the water-soluble film (namely, between the intermediate layer and the water-soluble film) originates in the union of relatively weak binding strength produced between the carbonyl group of the oxidized high-pressure polyethylene and the hydroxyl group of the polyvinyl alcohol as already described, there is no possibility that the components of the intermediate layer remain on the water-soluble film after peeling the outer bag film. As a result, there is no possibility that, after the water-soluble film has been dissolved in water in preparation for use of the commodity such as the agricultural chemicals accommodated therein, the components of the intermediate layer will react with the components of the commodity such as the agricultural chemicals accommodated in the bag to deteriorate the commodity. Since the intermediate layer, unlike the adhesive, can be formed so as to have a relatively large thickness, the intermediate layer additionally functions as a protector against a mechanical shock. In the case of using adhesive, sufficient moistureproofing ability can not be obtained since the adhesive produces pinholes due to a coating. The intermediate layer functions so as to enhance the moistureproofing ability since intermediate layer does not produce such pinholes thereof.

In the package according to the eleventh aspect mentioned above, like that of the fifteenth aspect mentioned above, the commodity accommodated therein is not limited to agricultural chemicals. The commodity accommodated may be other commodities such as, for example, medicament, food, and ground bait. The package may accept still other commodities which are used by placing in liquids capable of dissolving the water-soluble film. It is particularly effective in accommodating such commodities as do harm to the human skin, emit offensive odor,. or defile the ambience. The form of the commodity is not limited to powder. The commodity may be a granular substance or a liquid substance. When the liquid commodity is an organic solvent, for example, it has no possibility of dissolving the water-soluble film.

Incidentally, the package according to the eleventh aspect mentioned above compels the user of the commodity accommodated in the bag to experience inconvenience in peeling the outer bag film unless the package is provided with a part which becomes a beginning for peeling the outer bag film. The package according to the twelfth or the thirteenth aspect mentioned above is the case where such a beginning part is formed.

In the package according to the twelfth aspect mentioned above, since the perforations for tearing are formed in the heat-sealed portions, when a part of the heat-sealed portions is torn off along the perforations, the outer bag film and the water-soluble film are stretched in mutually different amounts and consequently the stretched parts of the two films is separated from each other. These stretched parts, therefore, serve as a part which becomes a beginning for peeling the outer bag film.

In the package according to the thirteenth aspect mentioned above, the prescribed edge portions of the outer-layer-film on which the water-soluble film is not formed are sifted and faced to each other, and therefore these portions do not adhere to each other. Thus, these portions function as a part which becomes a beginning for peeling the outer bag film.

In the package according to the fourteenth aspect mentioned above, when a part is torn off from the notched part to the non-heat-sealed portion enclosed with the heat-sealed-portions and taking no part in accommodating the commodity, the outer bag film and the water-soluble film are stretched in mutually different amounts and consequently the stretched parts of the two films is separated from each other. These stretched parts, therefore, serve as a part which becomes a beginning for peeling the outer bag film.

A bag according to a sixteenth aspect of the present invention is made of at least one laminated film. The at least one laminated film is formed in the shape of a bag opened on one side thereof. The at least one laminated film comprises: an outer-layer-film including one or more layers; a water-soluble film; and an intermediate layer interposed between the outer-layer-film and the water-soluble film. The outer-layer-film and the intermediate layer adhere fast to each other. The intermediate layer and the water-soluble film directly contact each other and adhere so weakly to each other as to be peelable. The at least one laminated film is superposed so that the water-soluble film is positioned inside. Prescribed portions of the superposed laminated film are heat-sealed so that the parts of the water-soluble film facing to each other at the prescribed portions are fused to each other. A non-heat-sealed portion and a heat-sealed portion are formed in a mutually adjoining state in the area outside a heat-sealed portion enclosing an area of the superposed laminated film destined to accommodate a commodity. One end of the boundary line between the non-heat-sealed portion in the outside area and the heat-sealed portion in the outside area reaches the outer edge of the bag on which the front side part of the laminated film and the rear side part of the laminated film do not continue into each other. A part of the peripheral edge of the non-heat-sealed portion in the outside area, which continues to the boundary line, forms a part of the outer edge of the bag on which the front side part of the laminated film and the rear side part of the laminated film do not continue into each other. A part of the peripheral edge of the heat-sealed portion in the outside area, which continues to the boundary line, forms a part of the outer edge of the bag on which the front side part of the laminated film and the rear side part of the laminated film do not continue into each other.

A bag according to a seventeenth aspect of the present invention is a bag according to the sixteenth aspect mentioned above, wherein a part of the peripheral edge of the heat-sealed portion in the outside area, which confronts the boundary line, forms a part of the outer edge of the bag on which the front side part of the laminated film and the rear side part of the laminated film do not continue into each other.

A bag according to a eighteenth aspect of the present invention is a bag according to the seventeenth aspect mentioned above, wherein, of the part of the heat-sealed portion in the outside area that lies along the boundary line, at least the part thereof which is positioned on the side of the one end of the boundary line has a narrow width.

A bag according to a nineteenth aspect of the present invention is a bag according to the sixteenth aspect mentioned above, wherein a slit piercing the front side part and the rear side part of the laminate film is formed in the outside area in such a manner that one end of the slit reaches the outer edge of the bag on which the front side part of the laminated film and the rear side part of the laminated film do not continue into each other. A part of the peripheral edge of the heat-sealed portion in the outside area, which confronts the boundary line, coincides with at least a part of the slit.

A bag according to a twentieth aspect of the present invention is a bag according to the nineteenth aspect mentioned above, wherein, of the part of the heat-sealed portion in the outside area that lies along the boundary line, at least the part thereof which is positioned on the side of the one end of the boundary line has a narrow width.

A bag according to a twenty-first aspect of the present invention is made of at least one laminated film. The at least one laminated film is formed in the shape of a bag opened on one side thereof. The at least one laminated film comprises: an outer-layer-film including one or more layers; a water-soluble film; and an intermediate layer interposed between the outer-layer-film and the water-soluble film. The outer-layer-film and the intermediate layer adhere fast to each other. The intermediate layer and the water-soluble film directly contact each other and adhere so weakly to each other as to be peelable. The at least one laminated film is superposed so that the water-soluble film is positioned inside. Prescribed portions of the superposed laminated film are heat-sealed so that the parts of the water-soluble film facing to each other at the prescribed portions are fused to each other. A non-heat-sealed portion enclosed with heat-sealed portions is formed in the area outside a heat-sealed portion enclosing an area of the superposed laminated film destined to accommodate a commodity. Perforations for excising a part of the outside area are formed in the outside area. One end of the boundary line between a non-heat-sealed portion and a heat-sealed portion mutually adjoining in the outside area remaining after the excision of the part of the outside area reaches the perforations. A part of the peripheral edge of the non-heat-sealed portion remaining after the excision of the part in the outside area, which continues to the boundary line, coincides with the perforations. A part of the peripheral edge of the heat-sealed portion remaining after the excision of the part in the outside area, which continues to the boundary line, coincides with the perforations.

A bag according to the twenty-second aspect of the present invention is a bag according to the twenty-first aspect mentioned above, wherein, of the heat-sealed portion remaining after the excision of the part in the outside area, at least the part which is positioned on the side of the one end of the boundary line has a narrow width.

A bag according to a twenty-third aspect of the present invention made of at least one laminated film. The at least one laminated film is formed in the shape of a bag opened on one side thereof. The at least one laminated film comprises: an outer-layer-film including one or more layers; a water-soluble film; and an intermediate layer interposed between the outer-layer-film and the water-soluble film. The outer-layer-film and the intermediate layer adhere fast to each other. The intermediate layer and the water-soluble to film directly contact each other and adhere so weakly to each other as to be peelable from each other. The at least one laminated film is superposed so that the water-soluble film is positioned inside. Prescribed portions of the superposed laminated film are heat-sealed so that the parts of the water-soluble film facing to each other at the prescribed portions are fused to each other. A slit exclusively piercing the outer-layer-film and the intermediate layer is formed in the area outside an area of the superposed laminated film destined to accommodate a commodity.

A package according to a twenty-fourth aspect of the present invention comprises: a hermetically sealed bag made of at least one laminated film; and a prescribed commodity placed in the bag. The at least one laminated film comprises: an outer-layer-film including one or more layers; a water-soluble film; and an intermediate layer interposed between the outer-layer-film and the water-soluble film. The outer-layer-film and the intermediate layer adhere fast to each other. The intermediate layer and the water-soluble film directly contact each other and adhere so weakly to each other as to be peelable. The at least one laminated film is superposed so that the water-soluble film is positioned inside. Prescribed portions of the superposed laminated film are heat-sealed so that the parts of the water-soluble film facing to each other at the prescribed portions are fused to each other. A non-heat-sealed portion and a heat-sealed portion are formed in a mutually adjoining state in the area outside a heat-sealed portion enclosing an area accommodating the commodity of the superposed laminated film. One end of the boundary line between the non-heat-sealed portion in the outside area and the heat-sealed portion in the outside area reaches the outer edge of the bag on which the front side part of the laminated film and the rear side part of the laminated film do not continue into each other. A part of the peripheral edge of the non-heat-sealed portion in the outside area, which continues to the boundary line, forms a part of the outer edge of the bag on which the front side part of the laminated film and the rear side part of the laminated film do not continue into each other. A part of the peripheral edge of the heat-sealed portion in the outside area, which continues to the boundary line, forms a part of the outer edge of the bag on which the front side part of the laminated film and the rear side part of the laminated film do not continue into each other.

A package according to a twenty-fifth aspect of the present invention is a package according to the twenty-fourth aspect mentioned above, wherein a part of the peripheral edge of the heat-sealed portion in the outside area, which confronts the boundary line, forms a part of the outer edge of the bag on which the front side part of the laminated film and the rear side part of the laminated film do not continue into each other.

A package according to a twenty-sixth aspect of the present invention is a package according to the twenty-fifth aspect mentioned above, wherein, of the part of the heat-sealed portion in the outside area that lies along the boundary line, at least the part thereof which is positioned on the side of the one end of the boundary line has a narrow width.

A package according to a twenty-seventh aspect of the present invention is a package according to the twenty-fourth aspect mentioned above, wherein a slit piercing the front side part and the rear side part of the laminate film is formed in the outside area in such a manner that one end of the slit reaches the outer edge of the bag on which the front side part of the laminated film and the rear side part of the laminated film do not continue into each other. A part of the peripheral edge of the heat-sealed portion in the outside area, which confronts the boundary line, coincides with at least a part of the slit.

A package according to a twenty-eighth aspect of he present invention is a package according to the twenty-seventh aspect mentioned above, wherein, of the part of the heat-sealed portion in the outside area that lies along the boundary line, at least the part thereof which is positioned on the side of the one end of the boundary line has a narrow width.

A package according to a twenty-ninth aspect of the present invention comprises: a hermetically sealed bag made of at least one laminated film; and a prescribed commodity placed in the bag. The at least one laminated film comprises: an outer-layer-film including one or more layers; a water-soluble film; and an intermediate layer interposed between the outer-layer-film and the water-soluble film. The outer-layer-film and the intermediate layer adhere fast to each other. The intermediate layer and the water-soluble film directly contact each other and adhere so weakly to each other as to be peelable. The at least one laminated film is superposed so that the water-soluble film is positioned inside. Prescribed portions of the superposed laminated film are heat-sealed so that the parts of the water-soluble film facing to each other at the prescribed portions are fused to each other. A non-heat-sealed portion enclosed with heat-sealed portions is formed in the area outside a heat-sealed portion enclosing an area accommodating the commodity of the superposed laminated film. Perforations for excising a part of the outside area are formed in the outside area. One end of the boundary line between a non-heat-sealed portion and a heat-sealed portion mutually adjoining in the outside area remaining after the excision of the part of the outside area reaches the perforations. A part of the peripheral edge of the non-heat-sealed portion remaining after the excision of the part in the outside area, which continues to the boundary line, coincides with the perforations. A part of the peripheral edge of the heat-sealed portion remaining after the excision of the part in the outside area, which continues to the boundary line, coincides with the perforations.

A package according to a thirtieth aspect of the present invention is a package according to-the twenty-ninth aspect mentioned above, wherein, of the heat-sealed portion remaining after the excision of the part in the outside area, at least the part which is positioned on the side of the one end of the boundary line has a narrow width.

A package according to a thirty-first aspect of the present invention comprises: a hermetically sealed bag made of at least one laminated film; and a prescribed commodity placed in the bag. The at least one laminated film comprises: an outer-layer-film including one or more layers; a water-soluble film; and an intermediate layer interposed between the outer-layer-film and the water-soluble film. The outer-layer-film and the intermediate layer adhere fast to each other. The intermediate layer and the water-soluble film directly contact each other and adhere so weakly to each other as to be peelable. The at least one laminated film is superposed so that the water-soluble film is positioned inside. Prescribed portions of the superposed laminated film are heat-sealed so that the parts of the water-soluble film facing to each other at the prescribed portions are fused to each other. A slit exclusively piercing the outer-layer-film and the intermediate layer is formed in the area outside an area accommodating the commodity of the superposed laminated film.

A method for peeling according to a thirty-second aspect of the present invention is a method for peeling the outer-layer-film and the intermediate layer off a package according to any of the twenty-fourth through the twenty-eighth aspects mentioned above, comprising: a step of turning up or pulling the front side part and the rear side part of the laminated film in the non-heat-sealed portion in the outside area so as to exert force on the one end of the boundary line.

A method for peeling according to a thirty-third aspect of the present invention is a method for peeling the outer-layer-film and the intermediate layer off a package according to the twenty-ninth or the thirtieth aspect mentioned above, comprising: a step of excising the part of the outside area along the perforations; and a step of turning up or pulling the front side part and the rear side part of the laminated film in the non-heat-sealed portion remaining after the excision of the part of the outside area so as to exert force on the one end of the boundary line.

A bag according to a thirty-fourth aspect of the present invention is made of one laminated film. The laminated film comprises: an outer-layer-film including one or more layers; a water-soluble film; and an intermediate layer interposed between the outer-layer-film and the water-soluble film. The outer-layer-film and the intermediate layer adhere fast to each other. The intermediate layer and the water-soluble film directly contact each other and adhere so weakly to each other as to be peelable. The laminated film is formed in the shape of a tube lined with the water-soluble film in such a manner that: (a) a first strip portion of the laminated film and a second strip portion of the laminated film are superposed on each other so that the corresponding portions of the water-soluble film of the first and second strip portions face to each other; and the corresponding portions of the water-soluble film of the first and second strip portions are fused to each other by heat-sealing. A prescribed portion of the tube is heat-sealed so that the parts of the water-soluble film facing to each other at the prescribed portion are fused to each other in such a manner that an area destined to accommodate a commodity in the tube is occluded relative to the side of a first end part side of the tube, thereby the laminated film is formed in the shape of a bag in which the area destined to accommodate the commodity is opened from a second end part side of the tube. One end of the boundary line between the tube and a heat-sealed portion consisting of the first and second strip portions reaches the first end part side. A non-heat-sealed portion is formed in an outside area in the tube which is positioned outside the heat-sealed portion occluding the area destined to accommodate the commodity relative to the side of the first end part side. The non-heat-sealed portion is formed either on one side of the boundary line so as to be contiguous to the boundary line or on both sides of the boundary line astride the boundary line. A part of the peripheral edge of the non-heat-sealed portion includes one end of the boundary line and forms at least part of the first end part side.

A bag according to a thirty-fifth aspect of the present invention is a bag according to the thirty-fourth aspect mentioned above, wherein a heat-sealed portion is formed in the outside area in the tube so that a non-heat-sealed portion having a hermetically sealed periphery is interposed between the non-heat-sealed portion and the heat-sealed portion occluding the area destined to accommodate the commodity relative to the side of the first end part side.

A bag according to a thirty-sixth aspect of the present invention is a bag according to the thirty-fourth or the thirty-fifth aspect mentioned above, wherein the non-heat-sealed portion, of which the part of the peripheral edge forms at least part of the first end part side, are formed in the shape of a strip along the first end part side and has width of 5 mm or more and 5 cm or less. This width is preferably 7 mm or more and 5 cm or less, more preferably 1 cm or more and 5 cm or less.

A bag according to a thirty-seventh aspect of the present invention is made of one laminated film. The laminated film comprises: an outer-layer-film including one or more layers; a water-soluble film; and an intermediate layer interposed between the outer-layer-film and the water-soluble film. The outer-layer-film and the intermediate layer adhere fast to each other. The intermediate layer and the water-soluble film directly contact each other and adhere so weakly to each other as to be peelable. The laminated film is formed in the shape of a tube lined with the water-soluble film in such a manner that: (a) a first strip portion of the laminated film and a second strip portion of the laminated film are superposed on each other so that the corresponding portions of the water-soluble film of the first and second strip portions face to each other; and (b) the corresponding portions of the water-soluble film of the first and second strip portions are fused to each other by heat-sealing of the tube is heat-sealed so that the parts of the water-soluble film facing to each other at the prescribed portion are fused to each other in such a manner that an area destined to accommodate a commodity in the tube is occluded relative to the side of a first end part side of the tube, thereby the laminated film is formed in the shape of a bag in which the area destined to accommodate the commodity is opened from a second end part side of the tube. A heat-sealed portion is formed so as to give rise to a non-heat-sealed portion having a hermetically sealed periphery in an outside area in the tube which is positioned outside the heat-sealed portion occluding the area destined to accommodate the commodity relative to the side of the first end part side. The non-heat-sealed portion is formed either on one side of the boundary line between the tube and a heat-sealed portion consisting of the first and second strip portions so as to be contiguous to the boundary line or on both sides of the boundary line astride the boundary line. Perforations for excising a part of the outside area in the tube and a part of an area of the heat-sealed portion consisting of the first and the second strip portions corresponding to the outside area are formed in those areas. One end of the boundary line remaining after the excision of the part of the outside area in the tube and the part of the area of the heat-sealed portion consisting of the first and the second strip portions corresponding to the outside area reaches the perforations. A part of peripheral edge of the non-heat-sealed portion in the outside area in the tube remaining after the excision of the part of the outside area in the tube and the part of the area of the heat-sealed portion consisting of the first and the second strip portions corresponding to the outside area coincides with the perforations.

A bag according to a thirty-eighth aspect of the present invention is a bag according to any of the thirty-fourth through the thirty-seventh aspects mentioned above, wherein the heat-sealed portion consisting of the first and the second strip portions constitutes a backlining part, and the bag is a backlining-type bag.

A bag according to a thirty-ninth aspect of the present invention is a bag according to any of the thirty-fourth through the thirty-eighth aspects mentioned above, wherein the bag is a gusset-type bag provided with gusset parts.

A package according to a fortieth aspect of the present invention comprises: a hermetically sealed bag made of one laminated film; and a prescribed commodity placed in the bag. The laminated film comprises: an outer-layer-film including one or more layers; a water-soluble film; and an intermediate layer interposed between the outer-layer-film and the water-soluble film. The outer-layer-film and the intermediate layer adhere fast to each other. The intermediate layer and the water-soluble film directly contact each other and adhere so weakly to each other as to be peelable. The laminated film is formed in the shape of a tube lined with the water-soluble film in such a manner that: (a) a first strip portion of the laminated film and a second strip portion of the laminated film are superposed on each other so that the corresponding portions of the water-soluble film of the first and second strip portions face to each other; and (b) the corresponding portions of the water-soluble film of the first and second strip portions are fused to each other by heat-sealing. Prescribed portions of the tube are heat-sealed so that the parts of the water-soluble film facing to each other at the prescribed portions are fused to each other in such a manner that an area accommodating the commodity in the tube is occluded relative to the side of a first end part side of the tube and the side of a second end part side of the tube. One end of the boundary line between the tube and a heat-sealed portion consisting of the first and second strip portions reaches the first end part side. A non-heat-sealed portion is formed in an outside area in the tube which is positioned outside the heat-sealed portion occluding the area accommodating the commodity relative to the side of the first end part side. The non-heat-sealed portion is formed either on one side of the boundary line so as to be contiguous to the boundary line or on both sides of the boundary line astride the boundary line. A part of the peripheral edge of the non-heat-sealed portion includes one end of the boundary line and forms at least part of the first end part side.

A package according to a forty-first aspect of the present invention is a package according to the fortieth aspect mentioned above, wherein a heat-sealed portion is formed in the outside area in the tube so that a non-heat-sealed portion having a hermetically sealed periphery is interposed between the non-heat-sealed portion and the heat-sealed portion occluding the area accommodating the commodity relative to the side of the first end part side.

A package according to a forty-second aspect of the present invention is a package according to the fortieth or the forty-first aspect mentioned above, wherein the non-heat-sealed portion, of which the part of the peripheral edge forms at least part of the first end part side, are formed in the shape of a strip along the first end part side and has width of 5 mm or more and 5 cm or less. This width is preferably 7 mm or more and 5 cm or less, more preferably 1 cm or more and 5 cm or less.

A package according to a forty-third aspect of the present invention comprises: a hermetically sealed bag made of one laminated film; and a prescribed commodity placed in the bag. The laminated film comprises: an outer-layer-film including one or more layers; a water-soluble film; and an intermediate layer interposed between the outer-layer-film and the water-soluble film. The outer-layer-film and the intermediate layer adhere fast to each other. The intermediate layer and the water-soluble film directly contact each other and adhere so weakly to each other as to be peelable. The laminated film is formed in the shape of a tube lined with the water-soluble film in such a manner that: (a) a first strip portion of the laminated film and a second strip portion of the laminated film are superposed on each other so that the corresponding portions of the water-soluble film of the first and second strip portions face to each other; and (b) the corresponding portions of the water-soluble film of the first and second strip portions are fused to each other by heat-sealing. Pre of the tube are heat-sealed so that the parts of the water-soluble film facing to each other at the prescribed portions are fused to each other in such a manner that an area accommodating the commodity in the tube is occluded relative to the side of a first end part side of the tube and the side of a second end part side of the tube. A heat-sealed portion is formed so as to give rise to a non-heat-sealed portion having a hermetically sealed periphery in an outside area in the tube which is positioned outside the heat-sealed portion occluding the area accommodating the commodity relative to the side of the first end part side. The non-heat-sealed portion is formed either on one side of the boundary line between the tube and a heat-sealed portion consisting of the first and second strip portions so as to be contiguous to the boundary line or on both sides of the boundary line astride the boundary line. Perforations for excising a part of the outside area in the tube and a part of an area of the heat-sealed portion consisting of the first and the second strip portions corresponding to the outside area are formed in those areas. One end of the boundary line remaining after the excision of the part of the outside area in the tube and the part of the area of the heat-sealed portion consisting of the first and the second strip portions corresponding to the outside area reaches the perforations. A part of peripheral edge of the non-heat-sealed portion in the outside area in the tube remaining after the excision of the part of the outside area in the tube and the part of the area of the heat-sealed portion consisting of the first and the second strip portions corresponding to the outside area coincides with the perforations.

A package according to a forty-fourth aspect of the present invention is a package according to any of the fortieth through forty-third aspects mentioned above, wherein the heat-sealed portion consisting of the first and the second strip portions constitutes a backlining part, and the bag is a backlining-type bag.

A package according to a forty-fifth aspect of the present invention is a package according to any of the fortieth through the forty-fourth aspects mentioned above, wherein the bag is a gusset-type bag provided with gusset parts.

A method for peeling according to a forty-sixth aspect of the present invention is a method for peeling the outer-layer-film and the intermediate layer off a package according to any of the fortieth through the forty-second aspects mentioned above, comprising: a step of either pulling the parts of the laminated film positioned on the both sides of the boundary line in the non-heat-sealed portion of which the part of the peripheral edge forms at least part of the first end part side or turning up the parts of the laminated film overlapping mutually in the non-heat-sealed portion of which the part of the peripheral edge forms at least part of the first end part side, so as to exert force on the one end of the boundary line.

A method for peeling according to a forty-seventh aspect of the present invention is a method for peeling the outer-layer-film and the intermediate layer off a package according to the forty-third aspect mentioned above, comprising: a step of excising along the perforations the part of the outside area in the tube and the part of the area of the heat-sealed portion consisting of the first and the second strip portions corresponding to the outside area; and a step of either pulling the parts of the laminated film positioned on the both sides of the boundary line in the non-heat-sealed portion in the outside area in the tube remaining after the excision of the part of the outside area in the tube and the part of the area of the heat-sealed portion consisting of the first and the second strip portions corresponding to the outside area or turning up the parts of the laminated film overlapping mutually in the non-heat-sealed portion in the outside area in the tube remaining after the excision of the part of the outside area in the tube and the part of the area of the heat-sealed portion consisting of the first and the second strip portions corresponding to the outside area, so as to exert force on the one end of the boundary line.

A method for producing a laminated film according to a forty-eighth aspect of the present invention is a method according to any of the sixth through the ninth aspects mentioned above, further comprising a step of drying the water-soluble film which is performed prior to the compression.

In the sixteenth through the forty-seventh aspects mentioned above, the laminated film mentioned above may be the laminated film according to any of the first through fifth aspects mentioned above. In the sixteenth through the forty-seventh aspects mentioned above, however, the intermediate layer does not need to be an intermediate layer which contains high-pressure polyethylene oxidized to a prescribed degree at least on the surface thereof contiguous to the water-soluble film but may be an adhesive layer, for example.

The bags according to the sixteenth through the twenty-third aspects and the thirty-fourth through the thirty-ninth aspects mentioned above open on one side and are generally supplied from a manufacturer of bags to a manufacture of commodities in the bag supplying method already described, whereas the packages according to the twenty-fourth through the thirty-first aspects and the fortieth through the forty-fifth aspects mentioned above comprise a hermetically sealed bag and an prescribed commodity placed in the bag and are in the form of a finished product when they reach the users of the accommodated commodity. Thus, they are practically identical to each other. When the bags according to the sixteenth through the twenty-third aspects and the thirty-fourth through the thirty-ninth aspects mentioned above reach the users of the accommodated commodity in the form of the packages according to the twenty-fourth through the thirty-first aspects and the fortieth through the forty-fifth aspects mentioned above. The packages according to the twenty-fourth through the thirty-first aspects and the fortieth through the forty-fifth aspects mentioned above may be produced by using the bags according to the six-teenth through the twenty-third aspects and the thirty-fourth through the thirty-ninth aspects mentioned above. They may be produced in accordance with the automatic packaging method mentioned above.

In the laminated film to be used in the bag and the package according to the sixteenth through the thirty-first aspects and the fortieth through the forty-fifth aspects mentioned above, the outer-layer-film and the intermediate layer adhere fast to each other, and the intermediate layer and the water-soluble film directly contact each other and adhere so weakly to each other as to peelable. The bag of the package using this laminated film, therefore, has a double-wall structure consisting of the outer-layer-film and the intermediate layer (hereinafter collectively referred to as "outer bag film" for the sake of explanation) which adhere fast to each other and act as an outer bag and the water-soluble film which acts as an inner bag. In this structure, the outer bag film and the water-soluble film adhere so weakly to each other as to be peelable. The user of the commodity in the package, therefore, is only required to peel the outer bag film in gaining access to the commodity accommodated in the inner bag of the water-soluble film similarly to the aforementioned composite package consisting of an inner bag and an outer bag. When the commodity happens to be agricultural chemicals, the outer bag does not suffer the commodity to drift up when it is peeled and the inner bag still accommodating the commodity can be placed in a tank and diluted with the water placed in the tank (because the inner bag made of the water-soluble film dissolves on contact with water). This package, therefore, ensures perfect ease of handling because the commodity accommodated therein no longer has the possibility of doing harm to the user's system or jeopardizing the safety. Since the laminated film used in the present invention can be handled during the insertion of the commodity therein in the same manner as the conventional laminated film, the existing automatic machines and other devices can be used in their unmodified form. The bag incurs no noticeable addition to the cost of production because it obviates the necessity of separately producing inner bags unlike the aforementioned composite bag consisting of an inner bag and an outer bag.

When the user of the commodity which is accommodated in the package according to the twenty-fourth through the twenty-eighth aspects mentioned above stands in need of peeling the outer bag film to gain access to the commodity, he has only to turn up or pull the front side part and the rear side part of the laminated film in the non-heat-sealed portion in the outside area mentioned above so as to exert force on the one end of the boundary line in the same manner as in the thirty-second aspect mentioned above. When the laminated films are turned up, the part near the one end of the boundary line in the water-soluble film moves toward the foreground side and the part near the one end of the boundary line of the outer bag film (the outer-layer-film and the intermediate layer) of the front and the rear laminated film turns up outwardly because the water-soluble film has expansibility and contractility and also because the water-soluble film of the front and the rear laminated film in the heat-sealed portion bordering on the boundary line are fused to each other. As a result, a gap originates near the one end of the boundary line and then continues to grow between the water-soluble film and the outer bag film. When the laminated films are pulled, a gap gradually grows between the water-soluble film and the outer bag film in the part near the one end of the boundary line because the water-soluble film stretches in a larger amount than the outer bag film. The outer bag film, therefore, can be easily peeled by using the gap as a beginning for peeling the outer bag film.

When the part of the peripheral edge of the heat-sealed portion in the outside area, which confronts the boundary line, forms the part of the outer edge of the bag on which the front side part of the laminated film and the rear side part of the laminated film or coincides with at least a part of the slit as in the twenty-fifth or the twenty-seventh aspect mentioned above, the outer bag film can be peeled more easily because the gap is enlarged to the corner part of the heat-sealed portion by increasing the amounts of the laminated films on the front and the rear side in the non-heat-sealed portions in the outside area to be turned up or pull. In this case, when, of the part of the heat-sealed portion in the outside area that lies along the boundary line, at least the part thereof which is positioned on the side of the one end of the boundary line has a narrow width as in the twenty-sixth and the twenty-eighth aspects mentioned above, the outer bag film can be peeled more easily because the gap is enlarged to the corner part of the heat-sealed portion even if the amount to be turned up or pulled is small.

When the user of the commodity accommodated in the package according to the twenty-ninth and the thirtieth aspects mentioned above stands in need of peeling the outer bag film to gain access to the commodity, he is first required to excise (or cut off) the part of the outside area along the perforations as in the thirty-third aspect mentioned above.

As a result, the package becomes the same state as the package according to the twenty-fourth through the twenty-eighth aspects mentioned above. When the front side part and the rear side part of the laminated films in the non-heat-sealed portion remaining after the excision of the part of the outside area are subsequently turned up or pulled so as to exert force on the one end of the boundary line in the same manner as in the thirty-third aspect mentioned above, a gap originates near the one end of the boundary line and then continues to grow between the water-soluble film and the outer bag film. As a result, the outer bag film can be easily is peeled by using the gap as a beginning for peeling the outer bag film. In the case of the twenty-ninth and the thirtieth aspects mentioned above, there is no possibility that the water-soluble film in the non-heat-sealed portion will be degraded by the ambient condition because the non-heat-sealed portions are enclosed with the heat-sealed portions and so the water-soluble film in the non-heat-sealed portion is opened into the ambience except for the perforations.

When the user of the commodity accommodated in the package according to the thirty-first aspect mentioned above stands in need of peeling the outer bag film to gain access to the commodity, he is first required to fold the bag along the slit. As a result, the outer bag film is peeled off the water-soluble film and floats up in the part lying along the slit. The outer bag film, therefore, can be easily peeled by using the floating part as a beginning for peeling the outer bag film.

When the user of the commodity accommodated in the package according to the fortieth through the forty-second aspects mentioned above stands in need of peeling the outer bag film to gain access to the commodity, he is only required to pull the parts of the laminated film positioned on the both sides of the boundary line in the non-heat-sealed portion of which the part of the peripheral edge forms at least part of the first end part side or to turn up the parts of the laminated film overlapping mutually in the non-heat-sealed portion of which the part of the peripheral edge forms at least part of the first end part side, so as to exert force on the one end of the boundary line, in the same manner as in the forty-sixth aspect mentioned above. As a result, a gap originates near the one end of the boundary line and then continues to grow between the water-soluble film and the outer bag film in a manner similar to the package according to the twenty-fourth through the twenty-eighth aspect mentioned above. The outer bag film, therefore, can be peeled easily by using the gap as a beginning for peeling the outer bag film.

When the user of the commodity accommodated in the package according to the forty-third through the forty-fourth aspects mentioned above stands in need of peeling the outer bag film to gain access to the commodity, he is first required to excise (or cut off) along the perforations the part of the outside area in the tube and the part of the area of the heat-sealed portion consisting of the first and the second strip portions corresponding to the outside area in the same manner as in the forty-seventh aspect mentioned above. Consequently, the package becomes the same state as the package according to the fortieth through the forty-second aspects mentioned above. The outer bag film, therefore, can be easily peeled thereafter in the same manner as the package according to the fortieth through the forty-second aspects mentioned above.

Incidentally, in the case of the thirty-fifth and forty-first aspects mentioned above, the area destined to accommodate a prescribed commodity is occluded at least doubly by the heat-sealed portions relative to the first end part side. Even when the water-soluble film in the non-heat-sealed portion approximating most to the first end part side happens to be degraded by the ambient condition, there is no possibility that this degradation extends to affect the area designed to accommodate the commodity.

When the non-heat-sealed portion, of which the part of the peripheral edge forms at least part of the first end part side, are formed in the shape of a strip along the first end part side in the same manner as in the thirty-sixth and the forty-second aspects mentioned above, it is preferable that the non-heat-sealed portion has a width of not less than 5 mm because the laminated films in the non-heat-sealed portion can be gripped in a hand so easily as to render the peeling of the outer bag film more easily. If the width of the non-heat-sealed portion is unduly large, the part incapable of contributing to the accommodation of the commodity in the package will unduly increase. Therefore, the width of the non-heat-sealed portion is preferably not more than 5 cm.

The bag and the package according to the sixteenth through the thirty-first aspects mentioned above may be made of two mutually separate laminated films one each on the front and the rear side or of one laminated film. The bag and the package according to the thirty-fourth through the forth-fifth aspects mentioned above are made of one laminated film. In the bag and the package made of one laminated film, the number of edge parts that constitute themselves folded ends is larger than in those made of two laminated films. In the edge parts which neither constitute themselves a folded end nor provide continuation between the laminated films on the front and the rear side, the outer bag film tends to separate accidentally because the edge parts possibly attract force, sustain fracture, or gather wrinkles. In the folded edge, there is no possibility that the outer bag film is accidentally separated. The bag and the package made of one laminated film, therefore, are at an advantage in having less possibility of suffering the outer bag film to incur accidental separation during the course of transportation than the bag and the package which are made of two laminated films. When the bag and the package made of one laminated film is constituted as backlining-type as in the thirty-eighth and the forty-fourth aspects mentioned above, the possibility of the outer bag film being accidentally separated as during the course of transportation is further decreased as compared with the bag and the package which are not backlining-type because the number of folded edges is increased and the number of edge parts providing no continuation between the laminated films on the front and the rear side is decreased.

DESCRIPTION OF THE PREFERRED EMBODIMENTS

Now, the laminated film, the method for the production thereof, the bag and the package formed with the laminated film, and the method for peeling thereof according to the present invention will be described specifically below with reference to the accompanying drawings.

Figure 1:
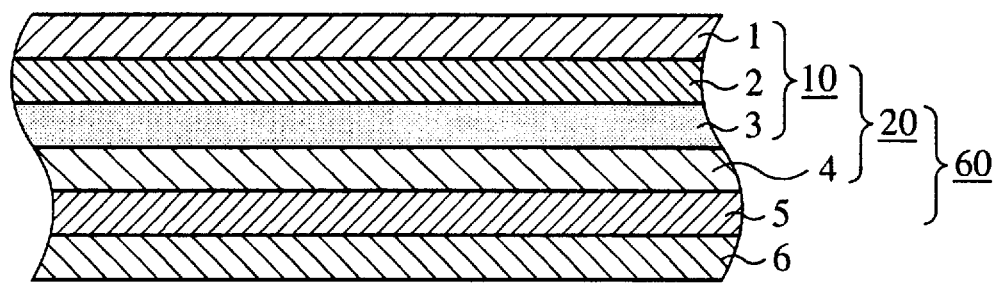
FIG. 1 is a cross section illustrating schematically a laminated film according to an embodiment of the present invention.

FIG. 1 is a cross section illustrating schematically a laminated film according to an embodiment of the present invention.

The laminated film according to the present embodiment, as shown in FIG. 1, is composed of an outer-layer-film 20, a water-soluble film 6, and an intermediate layer 5 interposed between the outer-layer-film 20 and the water-soluble film 6, the intermediate layer 5 containing high-pressure polyethylene oxidized to a prescribed degree at least on the surface thereof contiguous to the water-soluble film 6. The outer-layer-film 20 and the intermediate layer 5 adhere fast to each other. The intermediate layer 5 and the water-soluble film 6 contact directly each other and adhere so weakly to each other as to be peelable.

In the present embodiment, the outer-layer-film 20 is composed of a substrative film 10 and an anchor coat agent layer. The substrative film 10 is obtained by dry-laminating a polyester film 1, an adhesive layer 2, and an aluminum-evaporated polyester film 3. The anchor coat agent layer 4 is intended to improve the fastness of adhesion between the aluminum-evaporated polyester film 3 and the intermediate layer 5.

Specifically, a commercially available PET#12 produced by Unitika Ltd. of Japan and marketed under trademark designation of "Emblet Polyester Film" is used as the polyester film 1. A commercially available MLPET#12 produced by Tohcello Co., Ltd. of Japan and marketed under trademark designation of "MLPET-C" is used as the aluminum-evaporated polyester film 3.

The intermediate layer 5 is produced by preparing as the material therefor either a commercially available LDPE (high-pressure low-density polyethylene), one species of high-pressure polyethylene, produced by Nippon Polyolefins Co., Ltd. (a company established by amalgamation between the resin divisions of Showa Denko K.K. and the resin divisions of Nippon Petrochemicals Co., Ltd.) of Japan and marketed under product code of "L178", or a mixture combining the product just mentioned and a commercially available ethylene. α-olefin copolymer elastomer produced by Mitsui Petrochemical Industries, Ltd. of Japan and marketed under trademark designation of "Tafmer" at such a varying ratio as specifically described below and forming this material in the form of a layer, 20 μm in thickness by the extrusion lamination.

A polyvinyl alcohol film produced by Kuraray Co., Ltd. of Japan is used as the water-soluble film 6.

Figure 2:
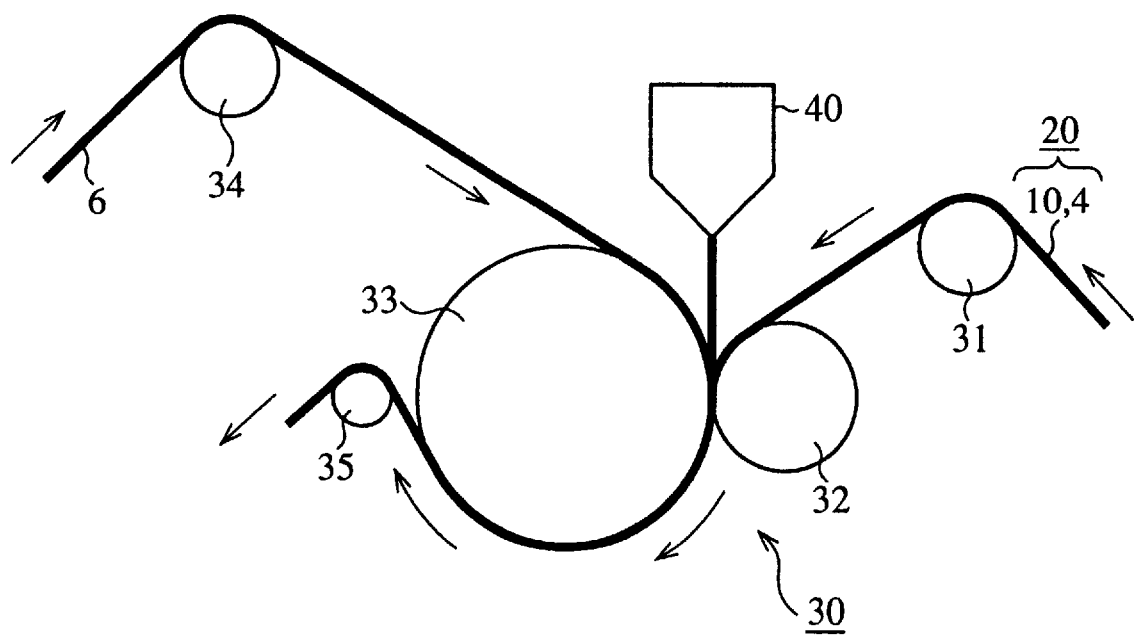
FIG. 2 is a diagram illustrating schematically a part of the process for the production of a laminated film according to an embodiment of the present invention.

The present inventors actually produced a plurality of kinds of the laminate film of the structure described above, with part of the prescribed production conditions and the material for the intermediate layer 5 varied as specifically described below. The method for this production is as follows. FIG. 2 is a diagram schematically illustrating a part of the process of the production.

Figure 5:
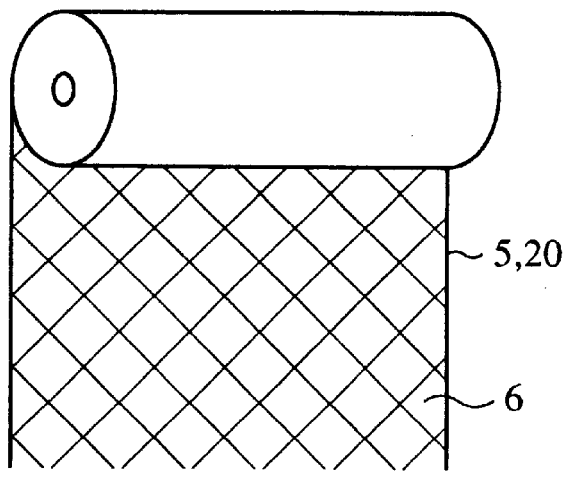
FIG. 5 is a diagram illustrating a laminated film taken up in the shape of a roll.
Figure 11:
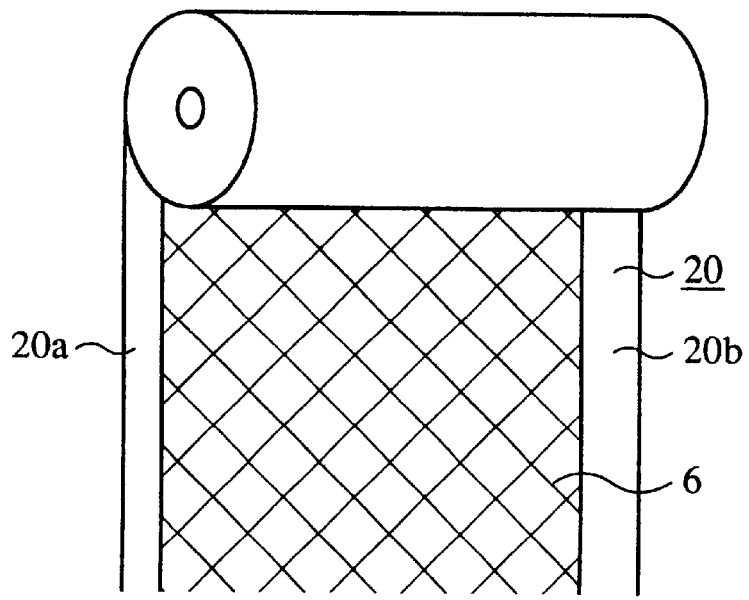
FIG. 11 is a diagram illustrating another laminated film taken up in the shape of a roll.

First, the substrative film 10 was prepared by dry-laminating "Emblet PET" (polyester film 1) and "MLPET-C" (aluminum-evaporated polyester film 3) through the adhesive 2. Then, it was forwarded via a guide roller 31 of a laminating device 30 and guided to the position between a pressure roller 32 and a cooling roller 33 of the laminating device 30. The substrative film 10 was disposed with the "MLPET-C" (aluminum-evaporated polyester film 3) side thereof held on the upper side in FIG. 2. The substrative film 10 was already coated on the upper surface thereof with the anchor coat agent 4 by means of a coating roller not shown and, therefore, was completed as the outer-layer-film 20. Meanwhile, the polyvinyl alcohol film produced by Kuraray Co., Ltd. (the water-soluble film 6) was forwarded via a guiding roller 34 of the laminating device 30 and guided from the side opposite the outer-layer-film 20 to the position between the pressure roller 32 and the cooling roller 33. Simultaneously, from above the position intervening between the pressure roller 32 and the cooling roller 33, a molten intermediate layer substance (the substance destined to form the intermediate layer 5) which will be specifically described below was extruded toward the position between the outer-layer-film 20 and the polyvinyl alcohol film 6 in the form of a film by an extruding device 40. As a result, the outer-layer-film 20, the film of the intermediate layer substance, and the polyvinyl alcohol film 6 were compressed while cooled by the pressure roller 32 and the cooling roller 33 and consequently converted to the laminated film shown in FIG. 1 mentioned above. The laminated film was guided to a guide roller 35 and taken up as shown in FIG. 5 or FIG. 11 as will be specifically described below.

The extruding device 40 used herein was of a type qualified by L/D=32 and D=90 mm (diameter), wherein L is the length of a screw and D is the diameter of the screw. The pulling out speed of the laminating device 30 was set at 100 m/min.

The intermediate layer substance (the substance destined to form the intermediate layer 5) was varied in four kinds, A, B, C, and D. For each of the kinds, the temperature of the intermediate layer substance prior to the departure from the extruding device 40 was varied in three magnitudes, 320° C., 325° C., and 330° C. With all the other conditions set equally, a total of eight kinds of the laminated film of the structure shown in FIG. 1 were produced.

Here, the intermediate layer substance A was a pure substance consisting of 100% by weight of "L178" (high-pressure polyethylene), the intermediate layer substance B was a mixture consisting of 97% by weight of "L178" and 3% by weight of "Tafmer" (ethylene.α-olefin copolymer elastomer), the intermediate layer substance C was a mixture consisting of 95% by weight of "L178" and 5% by weight of "Tafmer," and the intermediate layer substance C was a mixture consisting of 90% by weight of "L178" and 10% by weight of "Tafmer."

In the eight kinds of the laminated film obtained as described above, the peel strength (adhesive force or adhesive strength) between the water-soluble film 6 and the film consisting of the outer-layer-film 20 and the intermediate layer 5 varied as shown in Table 1. The peel strength was measured by the use of a horizontal tensile strength tester produced by Tester Sangyo Co., Ltd. of Japan under the conditions of 180° peel and 15 mm width in accordance with JIS (Japanese Industrial Standard) P8113. In each kind of the laminated film, several tens of pieces were cut from varying portions and measured for peel strength. In Table 1, for each kind of the laminated film, the range of numerical values found by the measurement of the individual pieces is shown.

TABLE 1

Peel strength (Adhesive force) (Unit: g/15 mm)

| | Temperature | | |
|---|---|---|---|
| Species | 320° C. | 325° C. | 330° C. |
| A | 0.2 ~ 3.2 | 9.5 ~ 21.1 | 9.0 ~ 40.3 |
| B | 1.2 ~ 4.5 | 6.5 ~ 22.0 | 14.0 ~ 32.0 |
| c | 1.1 ~ 4.0 | 7.0 ~ 20.3 | 18.5 ~ 32.0 |
| D | 0.8 ~ 4.0 | 3.2 ~ 22.0 | 15.0 ~ 28.5 |

It is noted from Table 1 that the peel strength was varied depending on the mixing ratio of the ethylene.α-olefin copolymer elastomer to the high-pressure polyethylene in the inter-mediate layer 5. It is also noted that the peel strength increases with increased temperature of the inter-mediate substance rose. This relationship implies that the peel strength can be exalted by increasing the amount of oxidation of the high-pressure polyethylene because the fact that the amount of thermal oxidation of the high-pressure polyethylene increases as the temperature rises is self-evident. From the data shown in the table, it is found that the all the magnitudes of peel strength obtained in the test ranged from 0.2 to 40.3 g/15 mm. In the present specification, the adhesive force of weak union is not limited to this particular range.

The phenomenon that the components of the intermediate layer 5 remain on the water-soluble film 6 after the film consisting of the outer-layer-film 20 and the intermediate layer 5 is peeled from the water-soluble film 6 was not recognized in the test.

No change of peel strength was observed after the bag produced in a hermetically sealed state with the laminated film using the intermediate layer substance A under the condition of 330° C. was left standing for 48 hours in the environment kept at 90% of humidity and normal room temperature and after the bag was left standing for three weeks in the environment kept at 30% of humidity and normal room temperature.

Since the peel strength is increased by increasing the amount of oxidation of the high-pressure polyethylene, the temperature of the intermediate layer substance may be further elevated, and/or the intermediate layer substance may be subjected to forced oxidation by blowing ozone against the inter-mediate substance held in a molten state besides the thermal oxidation, where the peel strength is required to be greater.

Figure 3:
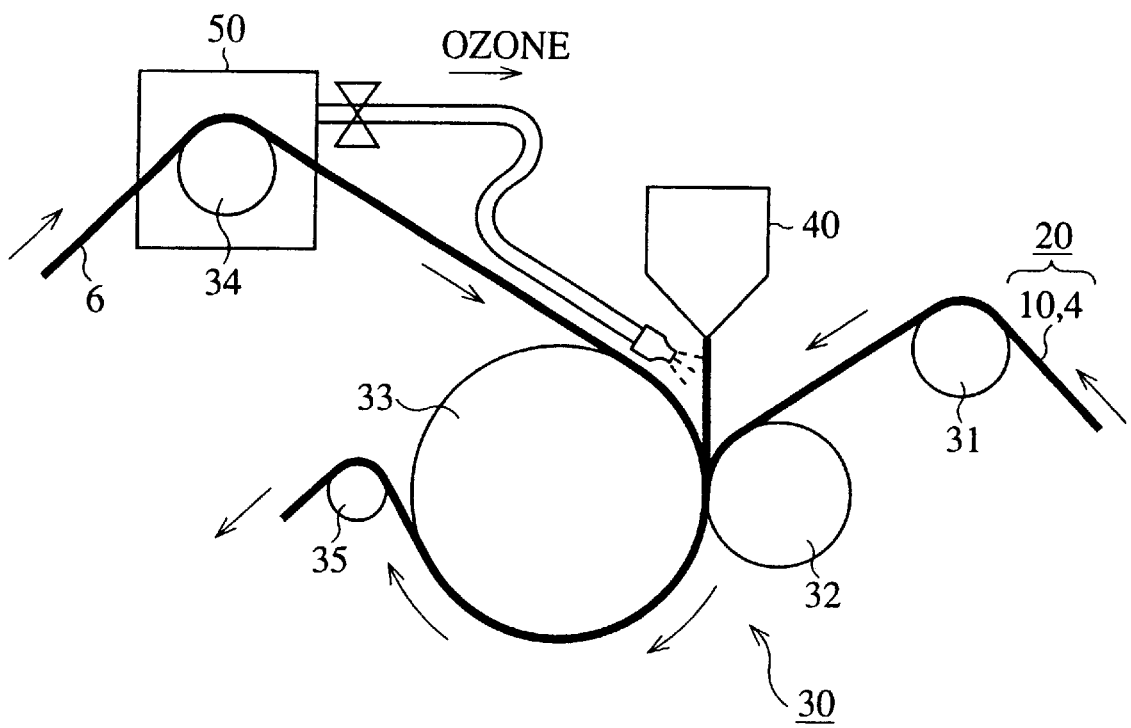
FIG. 3 is a diagram illustrating schematically a part of the process for the production of a laminated film according to another embodiment of the present invention.

The forced oxidation with ozone may be effected, for example, by installing a corona-treating device 50 as shown in FIG. 3 and causing the ozone emitted from the corona-treating device 50 to be blown against the water-soluble film 6 side surface of the intermediate layer substance extruded in the shape of a film from the extruding device 40. In this case, since the corona-treating device 50 is used to generate ozone and since the generation of ozone necessitates corona discharge, the corona treatment with the corona-treating device 50 is effected on the intermediate layer substance before the water-soluble film 6 is joined thereto by compression. It is inferred that the adhesive force between the water-soluble film 6 and the intermediate layer 5 can be adjusted by virtue of the physical changes (such as, for example, surface coarsening) caused on the surface of the water-soluble film 6 in consequence of the corona treatment. Instead of using the corona-treating device 50, an ozone-generating device (not shown) may be used for the purpose of blowing ozone against the water-soluble film 6 side surface of the intermediate layer substance extruded in the shape of a film from the extruding device 40. It is permissible to utilize the corona-treating device 50 for effecting the corona treatment of the water-soluble film 6 and, at the same time, allowing the ozone discharged from the corona-treating device 50 to be released directly into the ambience without being blown against the intermediate layer substance extruded in the shape of a film from the extruding device 40.

Figure 4:
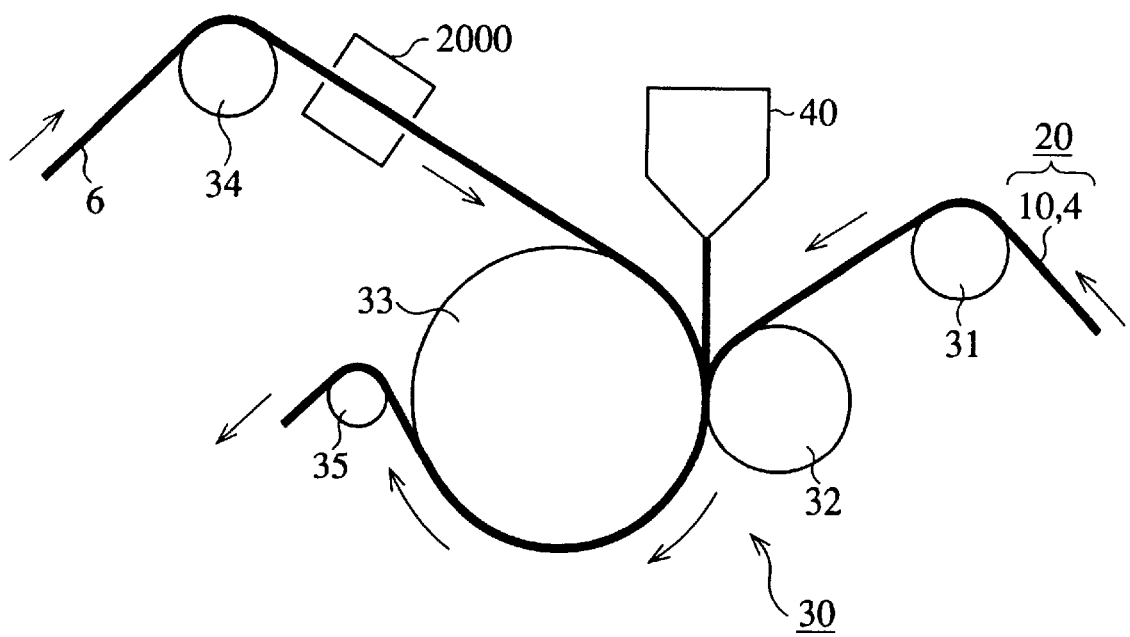
FIG. 4 is a diagram illustrating schematically a part of the process for the production of a laminated film according to still another embodiment of the present invention.

It has been found by a test that the adhesive force between the water-soluble film 6 and the intermediate layer 5 is lowered as the water content of the water-soluble film 6 is increased. Appropriately, for the purpose of retaining the adhesive force stably at a level aimed at, the water-soluble film 6 is stored in a humidity adjusting chamber and allowed to acquire and retain the water content at a prescribed level in advance of regular storage. Even. after the water-soluble film 6 has been stored as described above, it possibly has the water content thereof varied by the ambient humidity during the production of the laminated film. Where this possibility exists, a drying chamber 2000 may be installed as shown in FIG. 4 and the water-soluble film 6 may be dried by being passed through this drying chamber 2000 and consequently enabled to retain the adhesive force stably at the prescribed level before it is subjected to lamination. Incidentally, the drying chamber 2000 may be formed with a far infrared generating device, for example.

As laminated films according to the other embodiments of the present invention, the present inventors manufactured other various kinds of laminated film (laminated films of Sample No. 1–19) sharing the basic structure of FIG. 1 mentioned above. The laminated films of Sample No. 1–19 were tested for peel strength (adhesive force or adhesive strength) between the film consisting of the outer-layer-film 20 and the intermediate layer 5 and the water-soluble film 6. The results of this test are shown in Table 2 below. For the measurement of the peel strength in this case, the same method as used in the measurement of peel strength whose results are shown in Table 1 was adopted. The measurement of peel strength whose results are shown in Table 2 was conducted on the laminated films after the films had been kept standing in a temperature retaining chamber kept at 40° C. for 48 hours after their manufacture.

TABLE 2

| Sample No. | Intermediate layer [L178] (wt %) | [Tafmer] (wt %) | Corona treatment (KW) | Peel strength (g/15 mm) |
|---|---|---|---|---|
| 1 | 100 | 0 | 0 | 25 ~ 40 |
| 2 | 100 | 0 | 1.0 | 55 ~ 70 |
| 3 | 100 | 0 | 1.5 | 130 ~ 140 |
| 4 | 100 | 0 | 1.8 | 135 ~ 180 |
| 5 | 97 | 3 | 0 | 40 ~ 75 |
| 6 | 95 | 5 | 0 | 50 ~ 90 |
| 7 | 90 | 10 | 0 | 55 ~ 75 |
| 8 | 90 | 10 | 1.5 | 85 ~ 150 |
| 9 | 90 | 10 | 2.5 | 120 ~ 175 |
| 10 | 90 | 10 | 3.0 | 200 ~ 250 |
| 11 | 100 | 0 | 0 | 30 ~ 35 |
| 12 | 100 | 0 | 1.0 | 125 ~ 150 |
| 13 | 100 | 0 | 1.5 | 110 ~ 120 |
| 14 | 97 | 3 | 0 | 25 ~ 60 |
| 15 | 95 | 5 | 0 | 45 ~ 75 |
| 16 | 90 | 10 | 0 | 50 ~ 55 |
| 17 | 90 | 10 | 1.5 | 135 ~ 170 |
| 18 | 90 | 10 | 2.5 | 200 ~ 255 |
| 19 | 90 | 10 | 3.0 | 200 ~ 335 |

The laminated films of Sample No. 1–19 used a commercially available polyvinyl alcohol film, 35 μm in thickness, produced by Tohcello Co., Ltd. of Japan and marketed under trademark designation of "Tosslon ET-20#35" as the water-soluble film 6.

In the laminated films of Sample No. 1~10, the outer-layer-film 20 was composed of a substrative film 10 obtained by dry-laminating a polyester film 1, an adhesive agent layer 2, and a aluminum-evaporated polyester film 3, and an anchor coat agent layer 4 serving to enhance the fastness of union between the aluminum-evaporated polyester film 3 and the intermediate layer 5. In the laminated films of Sample No. 1–10, a commercially available PET#12 produced by Unitika Ltd. of Japan and marketed under trademark designation of "Emblet PET" was used as the polyester film 1 and a commercially available MLPET#12 produced by Tohcello Co., Ltd. of Japan and marketed under trademark designation of "MLPET-C" was used as the aluminum-evaporated polyester film 3.

In the laminated films of Sample No. 11–19, the outer-layer-film 20 was composed of a substrative film 10 obtained by extrusion laminating a polyester film 1, a high-pressure polyethylene film 2, and an aluminum foil 3 and an anchor coat agent layer 4. In the laminated films of Sample No. 11–19, a commercially available PET#12 produced by Unitika Ltd. of Japan and marketed under trademark designation of "Emblet PET" was used as the polyester film 1, a commercially available LDPE (high-pressure low-density polyethylene), 25 $\mu$m in thickness, produced by Nippon Polyolefins Co., Ltd. (a company established by amalgamation between the resin divisions of Showa Denko K.K. and the resin divisions of Nippon Petrochemicals Co., Ltd.) of Japan and marketed under product code of "L178" was used as the high-pressure polyethylene film 2, and a commercially available aluminum foil, 7 $\mu$m in thickness, produced by Showa Aluminum Co., Ltd. of Japan was used as the aluminum foil 3.

In the laminated films of Sample No. 1–19, the intermediate layer 5 was produced by preparing as the material therefor either a commercially available LDPE (high-pressure low-density process polyethylene), one species of high-pressure polyethylene, produced by Japan Polyolefins Co., Ltd. of Japan and marketed under product code of "L178" or a mixture combining the product just mentioned and a commercially available ethylene- a -olefin copolymer elastomer produced by Mitsui Petrochemical Industries, Ltd. of Japan and marketed under trademark designation of "Tafmer" at such a varying ratio as specifically described below and forming this material in the form of a layer, 20 $\mu$m in thickness by the extrusion lamination.

The intermediate layer substance for the intermediate layer 5 was formed of 100% by weight of "L178" in the laminated films of Sample No. 1, 2, 3, 4, 11, 12, and 13, a mixture of 97% by weight of "L178" and 3% by weight of "Tafmer" in the laminated films of Sample No. 5 and 14, a mixture of 95% by weight of "L178" and 5% by weight of "Tafmer" in the laminated films of Sample No. 6 and 15, and a mixture of 90% by weight of "L178" and 10% by weight of "Tafmer" in the laminated films of Sample No. 7–10, and 16–19.

The laminated films of Sample No. 1–19 were produced by such a method as used in the production described above with reference to FIG. 2. In the production of the laminated films of Sample No. 2–4, 8–10, 12, 13, 17, and 19, such a corona treating device 50 as shown in FIG. 3 was used to effect a corona treatment on the water-soluble film 6. The ozone which was issued from the corona treating device 50 was not blown against the intermediate layer substance extruded in the shape of film from the extruding device 40 but was released directly into the ambient air. In this case, a commercially available machine produced by Tomoe Kogyo K.K. of Japan and marketed under trademark designation of "Roll Electrode Station" was used as the corona treating device 50. The corona treatment was carried out at 1.0 KW in the production of the laminated films of Sample No. 2 and 12, at 1.5 KW in the production of the laminated films of Sample No. 3, 8, 13, and 17, at 1.8 KW in the production of the laminated film of Sample No. 4, at 2.5 KW in the production of the laminated films of Sample No. 9 and 18, and at 3.0 KW in the production of the laminated films of Sample No. 10 and 19. In the production of the laminated films of Sample No. 1, 5–7, 11, and 14–16, no corona treatment was conducted on the water-soluble film 6.

In the production of the laminated films of Sample No. 1–19, the extruding device 40 was of a type qualified by LID=32 and D=90 mm (diameter) and the pulling out speed of the laminating device 30 was set at 100 m/min. In the production of the laminated films of Sample No. 1–19, the temperature of the intermediate layer substance (the substance destined to form the intermediate layer 5) prior to extruding from the extruding device 40 was set at 330° C.

It is noted from Table 2 that the peel strength varied with the mixing ratio of the ethylene.α-olefin copolymer elastomer to the high-pressure polyethylene in the intermediate layer 5, the presence or absence of the corona treatment, and the degree of the corona treatment. In the laminated films of Sample No. 1–19, the phenomenon that the components of the intermediate layer 5 remain on the water-soluble film 6 after the film consisting of the outer-layer-film 20 and the intermediate layer 5 is peeled from the water-soluble film 6 was not recognized.

As another example of the commercial product of the water-soluble film 6, a commercially available polyvinyl alcohol film produced by Kuraray Co., Ltd. of Japan and marketed under product code of "VF-HP" may be cited.

Now, typical bags formed with the laminated film of the structure of FIG. 1 will be described below with reference to FIG. 5–FIG. 8.

Figure 6:
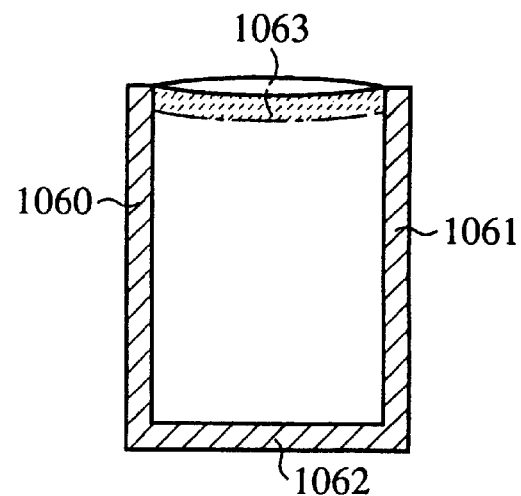
FIG. 6 is a diagram illustrating a bag according to yet another embodiment of the present invention.
Figure 7:
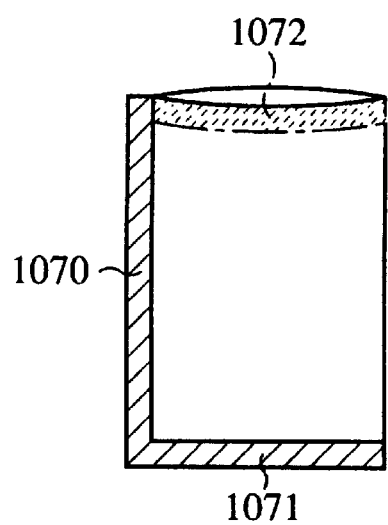
FIG. 7 is a diagram illustrating a bag according to a further embodiment of the present invention.
Figure 8:
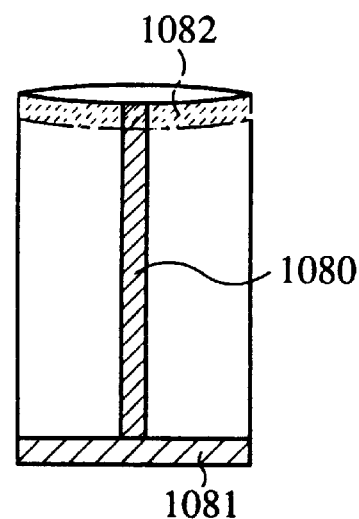
FIG. 8 is a diagram illustrating a bag according to still another embodiment of the present invention.

FIG. 5 represents the laminated film of FIG. 1, which has the water-soluble film 6 laminated on the outer-layer-film 20 throughout the entire surface thereof and is taken up in the shape of a roll. FIG. 6–FIG. 8 represent examples of the bag made of the laminated film shown in FIG. 5. In these bags, the laminated film is formed in the shape of a bag opened on one side thereof. In these bags, the laminated film is superposed by folding so that the water-soluble film 6 is positioned inside, and prescribed portions of the superposed laminated film are heat-sealed so that the parts of the water-soluble film 6 facing to each other at the prescribed portions are fused to each other. In the bag shown in FIG. 6, the left side, right side, or lower side constitutes itself a folding line and a portion 1060 along the left side, a portion 1061 along the right side, and a portion along the lower side are heat-sealed and the upper side is left open to give rise to what is called a three-side sealed bag. In the bag shown in FIG. 7, the right side constitutes itself a folding line and a portion 1070 along the left side and a portion 1071 along the right side are heat-sealed and the upper side is left open to give rise to what is called an L-shaped sealed bag. In the bag shown in FIG. 8, the left side and the right sides each constitute a folding line and a backlining portion 1080 and a portion 1081 are heat-sealed and the upper side is left open to give rise to what is called a backlining-type bag. The shape of the bag is not limited to the shapes mentioned above. Bags in arbitrarily selected shapes including the gusset-type bag can be produced with the laminated film of the present invention.

The bags shown in FIG. 6–FIG. 8 which open in the upper side, in the case of the bag supplying method, are produced by a manufacturer of bags and then supplied to a manufacture of commodities accommodated therein. In the case of the bag supplying method, the manufacturer of commodities places his commodities into the bags shown in FIG. 6–FIG. 8 through the openings in the upper side and subsequently heat-seals the portions 1063, 1072, and 1082 along the upper side to complete packages, i.e. the products in the finished state in which they reach users of the commodities. In the case of the automatic packaging method, the manufacturer of commodities performs continuously the operation of producing bags shown in FIG. 6–FIG. 8 from the laminated film shown in FIG. 5, filling the bags with his commodities, and heat-sealing the portions 1063, 1072, and 1082 of the bags along the upper side.

The bag of the package is in a double-wall structure consisting of the outer-layer-film 20 and the intermediate layer 5 (hereinafter collectively referred to as "outer bag film 60" for the sake of explanation) which adhere fast to each other and function as an outer bag and the water-soluble film 6 which functions as an inner bag. The outer bag film 60 and the water-soluble film 6 adhere so weakly to each other as to be peelable. The user of the commodity in the package, therefore, has only to peel the outer bag film 60 to gain access to the commodity accommodated in the inner bag formed of the water-soluble film 6 like the aforementioned composite bag which consists of an inner bag and an outer bag.

With the packages using the bags which are shown in FIG. 6–FIG. 8, the users of the commodities in the packages experience inconvenience in peeling the outer bag film 60 because the packages lack a part which becomes a beginning for peeling the outer bag film 60. Now, the examples shown in FIG. 9 and FIG. 10 which are provided with such a beginning will be described below.

Figure 9:
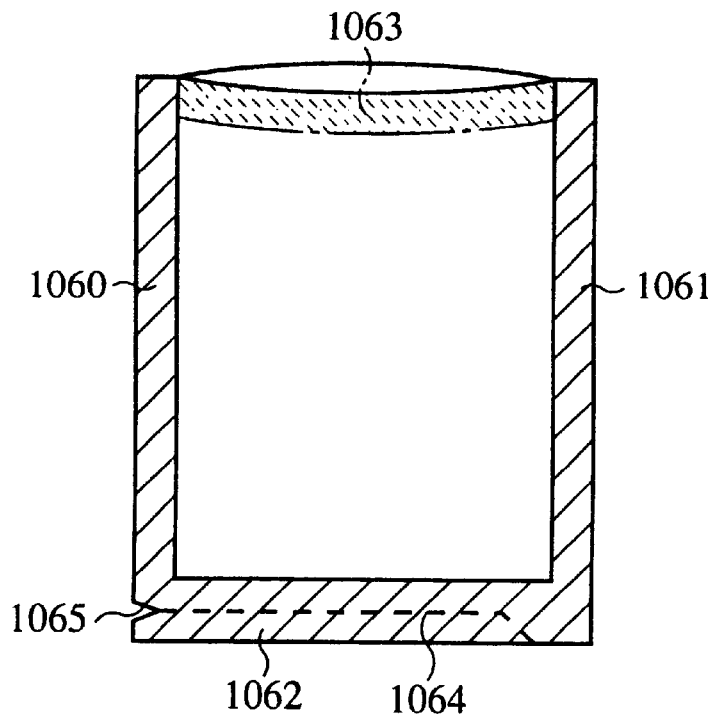
FIG. 9 is a diagram illustrating a bag provided with a beginning for peeling an outer bag film according to still another embodiment of the present invention.

FIG. 9 illustrates what is obtained by forming perforations 1064 for tearing in the sealed portion 1062 in the three-side seal bag shown in FIG. 6. A notch 1065 is formed at the end part of the perforations 1064. In the package using the bag which is shown in FIG. 9, when the lower portion of the heat-sealed portion 1062 is torn along the perforations 1064, the outer bag film 60 and the water-soluble film 6 stretch in amounts different from each other and the stretched parts of the two films are consequently caused to separate from each other. The parts becomes a beginning for peeling the outer bag film 60. The present embodiment has an advantage in allowing the low potion to be easily torn along the perforations 1064 because it is provided with the notch 1065. It nevertheless finds the formation of the notch 1065 indispensable. The perforations 1064 and the notch 1065 may be formed after the bags have been filled with their commodities in the bags shown in FIG. 6–FIG. 8.

Figure 10:
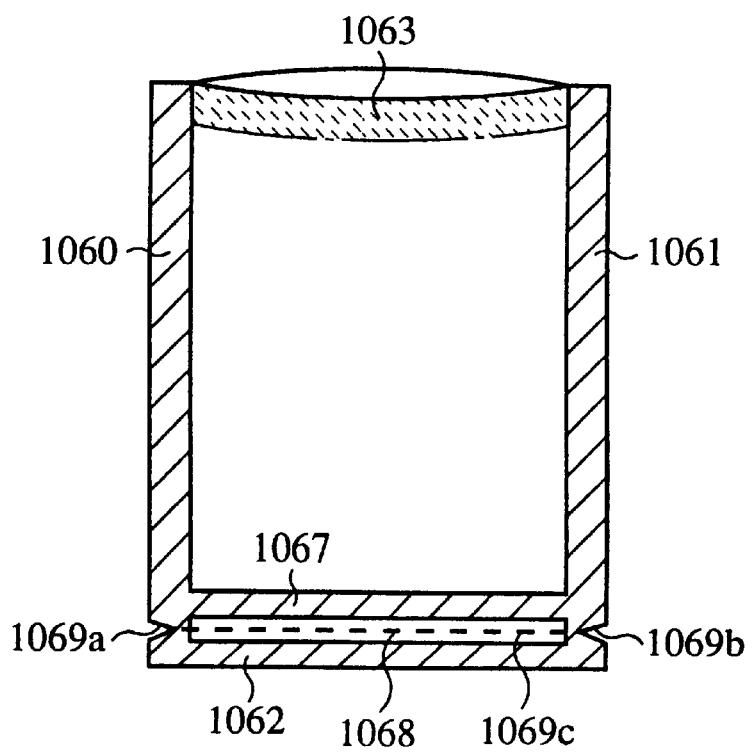
FIG. 10 is a diagram illustrating a bag according to a further embodiment of the present invention.

FIG. 10 illustrates what is obtained by also heat-sealing a portion 1067 parallel to the portion 1062 extending along the lower side as separated by a small distance from the portion 1062 thereby forming a non-heat-sealed portion 1068 enclosed with a heat-sealed portion and not destined to accommodate a commodity and forming notches 1069a and 1069b for tearing in the edge parts corresponding to the non-heat-sealed portion 1068 in the three-side seal bag shown in FIG. 6. The bag also has perforations 1069c formed between the notches 1069a and 1069b across the non-heat-sealed portion 1068. In the package using the bag which is shown in FIG. 10, when the bag is torn from the notch 1069a or the notch 1069b through the perforations 1069c to the non-heat-sealed portion 1068, the outer bag film 60 and the water-soluble film 6 stretch in amounts different from each other and, as a result, the stretched parts of the two films are caused to separate from each other. The parts become a beginning for peeling the outer bag film 60. The present embodiment has an advantage in allowing the bag to be easily torn along the perforations 1069c because it is provided with the two notches 1069a and 1069b. It nevertheless finds it permissible to omit one of the two notches 10609a and 1069b and the perforations 1069c.

Figure 12A:
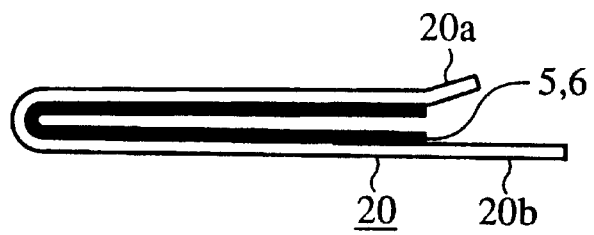
FIG. 12A is a schematic side view illustrating a bag according to a further embodiment of the present invention.
Figure 12B:
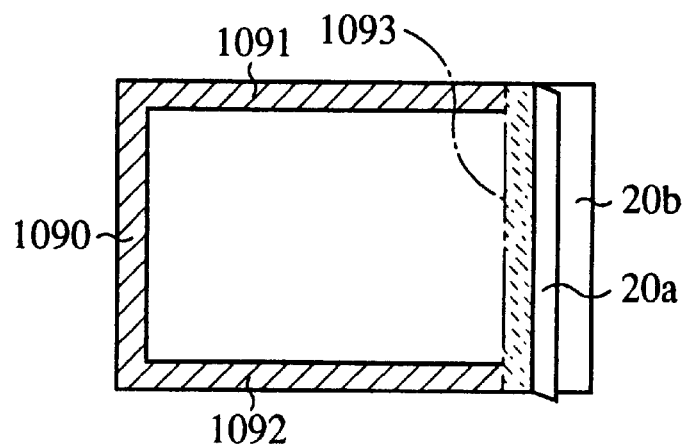
FIG. 12B is a schematic plan view illustrating the bag shown in FIG. 12A.

FIG. 11 illustrates the laminated film of the structure of FIG. 1 taken up in the shape of a roll, providing the water-soluble film 6 is joined by lamination to the outer-layer-film 20 except for opposite edge portions 20a and 20b. In the present embodiment, the intermediate layer 5 is not formed in the edge portions 20a and 20b. The intermediate layer 5 may be formed therein. Optionally, the edge portions 20a and 20b may be formed exclusively of the substrative film 10. The edge portion 20b is given a larger width than the edge portion 20a. The bag shown in FIG. 12B is made of the laminated film shown in FIG. 11. The laminated film is formed in the shape of a bag opened on one side thereof. In this bag, the laminated film is superposed so that the water-soluble film 6 is positioned inside and that the edge portions 20a and 20b are shifted and faced to each other (in the manner shown in side elevation in FIG. 12A) by folding the laminated film along the center line of the part having the water-soluble film 6 joined by lamination. Further, in this bag, prescribed portions of the superposed laminated film are heat-sealed so that the parts of the water-soluble film 6 facing to each other at the prescribed portions are fused to each other. In the present embodiment, the left side of the bag shown in FIG. 12B constitutes itself a folding line, a portion 1090 along the left side, a portion 1091 (except the edge portions 20a and 20b) along the upper side, and a portion 1091 (except the edge portions 20a and 20b) along the lower side are heat-sealed, and the right side is left open.

The bag which is opened on the right side as shown in FIG. 12B, in the case of the bag supplying method, is supplied by a manufacturer of bags to a manufacturer of commodities accommodated therein. In the case of the bag supplying method, the manufacturer of commodities places his commodity into the bag shown in FIG. 12B through the opening in the right side and subsequently heat-seals the portion 1093 (except the edge portions 20a and 20b) along the right side to complete a package, i.e. the product in the finished state in which it reaches the user of the commodities. In the case of the automatic packaging method, the manufacturer of commodities performs continuously the operation of producing bags shown in FIG. 12B from the laminated film shown in FIG. 11, filling the bags with his commodities, and further heat-sealing the portion 1093 along the right side.

In the package using the bag which is shown in FIG. 12B, since the edge portions 20a and 20b of prescribed portions of the outer-layer-film 20 on which the water-soluble film 6 Is not formed are shifted and faced to each other, and therefore these portions do not adhere to each other. Thus, these portions 20a and 20b function as a part which becomes a beginning for peeling the outer bag film 60.

The laminated films to be used in the present invention (particularly, the laminated films to be used in the various examples shown in FIG. 13A–FIG. 36B which will be described specifically below) are not limited to the laminated films of the structure shown in FIG. 1. For example, the laminated films using an adhesive layer as the intermediate layer can be used instead. In this case, the outer-layer-film and the intermediate layer can be caused to adhere fast to each other and the intermediate layer and the water-soluble film to contact directly each other and adhere so weakly to each other as to permit separation by peeling by suitably selecting the material of the part of the outer-layer-film most approximating to the intermediate layer side and the material of the intermediate layer.

Now, preparatory to the description of the bags according to the other embodiments of the present invention, a basic principle of peeling the outer bag film 60 consisting of the outer-layer-film 20 and the intermediate layer 5 in the package according to the present invention will be described with reference to FIG. 13A–FIG. 13D below.

Figure 13A:
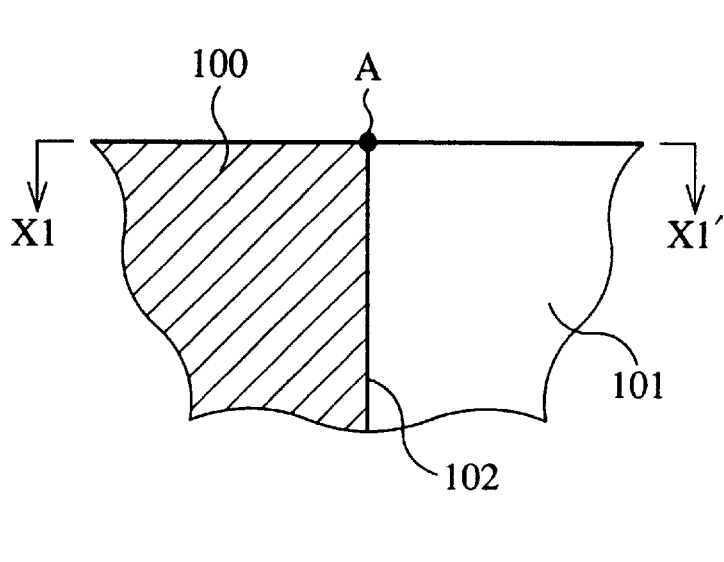
FIG. 13A is a plan view illustrating a laminated film superposed and partly heat-sealed.
Figure 13B:
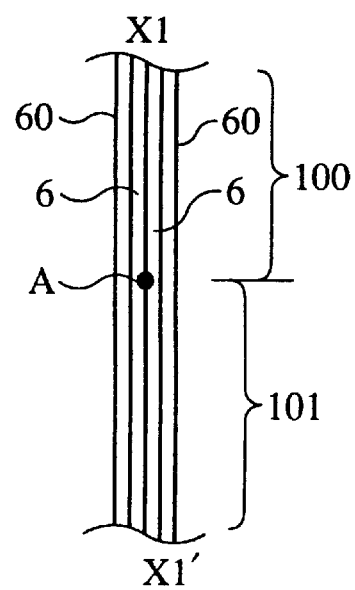
FIG. 13B is a view taken in the direction of the arrows along the line X1–X1' in FIG. 13A.
Figure 13C:
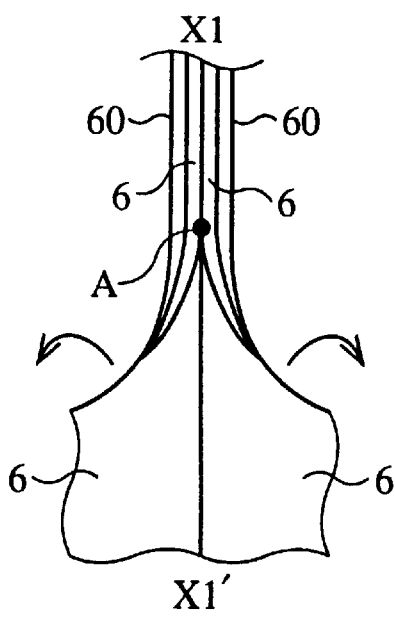
FIG. 13C is a diagram illustrating a process of peeling of the outer bag film.
Figure 13D:
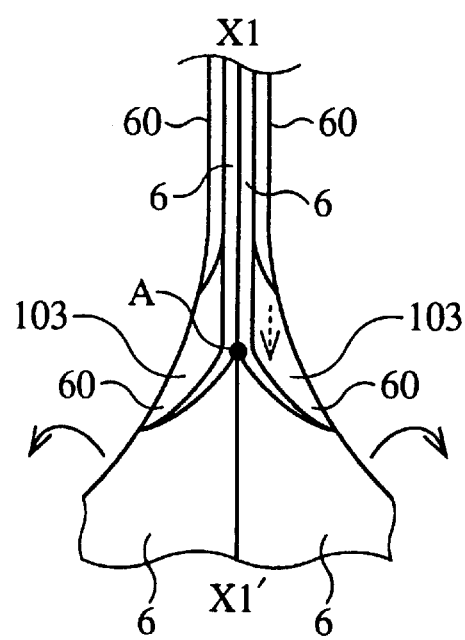
FIG. 13D is a diagram illustrating a process of peeling subsequent to that of peeling shown in FIG. 13C.

FIG. 13A is a plan view of what is obtained by superposing the laminated film shown in FIG. 1 so that the water-soluble film 6 is positioned inside and heat-sealing a part of the superposed laminated film, as seen from the front side thereof. FIG. 13B is a view taken in the direction of the arrows along the line X1–X1' in FIG. 13A. FIG. 13C and FIG. 13D, corresponding to FIG. 13B, are diagrams illustrating sequential steps of the process of peeling the outer bag film 60.

As shown in FIG. 13A and FIG. 13B, a heat-sealed portion 100 and a non-heat-sealed portion 101 adjoin each other in a boundary line 102. In the heat-sealed portion 100, the opposed front and rear surfaces of the water-soluble film 6 is fused to each other. On the upper side in the bearings of FIG. 13A, the laminated film on the front side and the laminated film on the rear side do not continue into each other. In other words, the upper side in the bearings of FIG. 13A does not constitute itself a folding line of the laminated film. The point A which is one end of the boundary line 102 reaches the upper side. In the embodiment shown in FIG. 13A and FIG. 13B, the length of the upper side of the heat-sealed portion 100, namely the width of the portion extending along the boundary line 102 in the heat-sealed portion 100 (the length of the upper side of the heat-sealed portion 100 in FIG. 13A) is wide.

From the laminated film which is supposed as shown in FIG. 13A and FIG. 13B, the outer bag film 60 can be easily peeled in a manner as shown in FIG. 13C and FIG. 13D. To be specific, when the front side and the rear side of the laminated film in the non-heat-sealed portion 101 are turned up so as to exert force on the point A, first the outer bag film 60 becomes the state shown in FIG. 13C immediately before starting the peeling and subsequently the portion of the point A of the water-soluble film 6 is moved toward the foreground side (the lower side in the bearings of FIG. 13D) as shown in FIG. 13D, whereas the portions of the front and the rear laminated film in the neighborhood of the boundary line 102 of the outer bag film 60 are gradually turned up outwardly. This is because the water-soluble film 6 possesses expansibility and contractility and the doubled parts of the water-soluble film 6 of the front and the rear laminated film in the heat-sealed portion 100 bordering on the boundary line 102 are fused to each other. As a result, a gap 103 originates in the neighborhood of the point A and develops gradually between the water-soluble film 6 and the outer bag film 60. By utilizing this gap 103 as a beginning for peeling the outer bag film 60, therefore, the outer bag film 60 can be easily peeled.

Figure 14A:
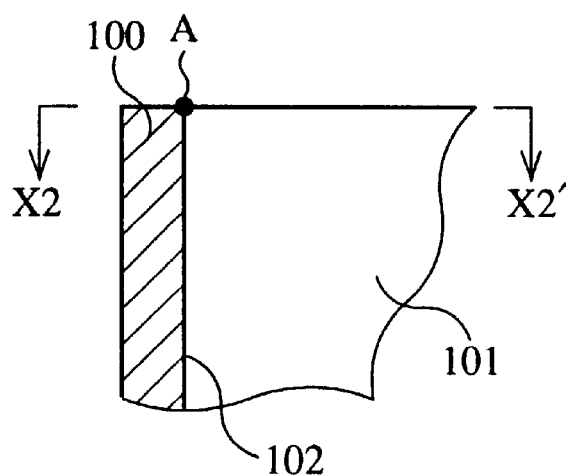
FIG. 14A is a plan view illustrating a laminated film superposed and partly heat-sealed.
Figure 14B:
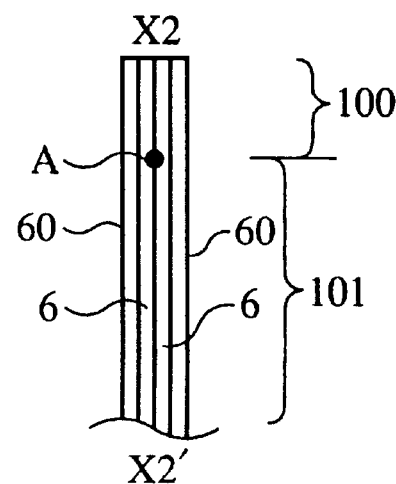
FIG. 14B is a view taken in the direction of the arrows along the line X2–X2' in FIG. 14A.
Figure 14C:
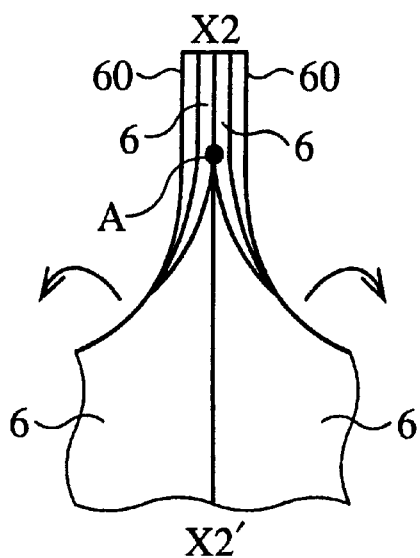
FIG. 14C is a diagram illustrating a process of separation occurring in the outer bag film.
Figure 14D:
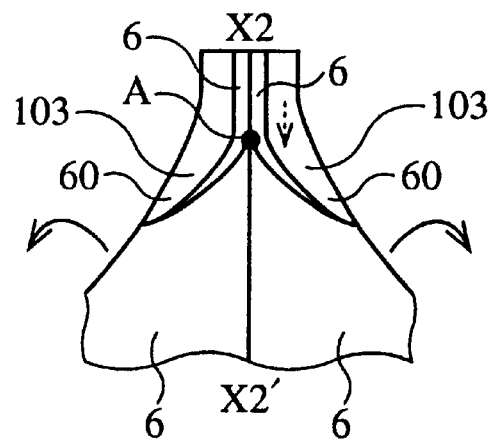
FIG. 14D is a diagram illustrating a process of peeling subsequent to that of peeling shown in FIG. 14C.

FIG. 14A–FIG. 14D are diagrams corresponding respectively to FIG. 13A–FIG. 13D. In FIG. 14A–FIG. 14D, identical or similar parts found in FIG. 13A–FIG. 13D are denoted by like reference numerals. These parts are omitted from the following description to avoid repetition. In the case shown in FIG. 14A–FIG. 14D, the left side of the heat-sealed portion 100 constitutes itself an edge side as shown in FIG. 14A and the laminated film on the front side and the laminated film on the rear side do not continue into each other in the left side. The length of the upper side of the heat-sealed portion 100, namely the width of the part of the heat-sealed portion 100 extending along the boundary line 102 (the length of the upper side of the heat-sealed portion 100 in the bearings of FIG. 14A) is narrow. In this example as in the example shown in FIG. 13A–FIG. 13D, when the front side and the rear side of the laminated film in the non-heat-sealed portion 101 are turned up so as to exert force upon the point A, they are transformed through the state of FIG. 14C to the state of FIG. 14D. In the example shown in FIG. 14A–FIG. 14D, the outer bag film 60 can be more easily peeled because the gap 103 reaches the left side of the heat-sealed portion 100 in the bearings of FIG. 14A and expands to the corner portion as shown in FIG. 14D. Moreover, in the case shown in FIG. 14A–FIG. 14D, the outer bag film 60 can be peeled more easily because the length of the upper side of the heat-sealed portion 100 is small and the gap 103 reaches the left side of the heat-sealed portion 100 in the bearings of FIG. 14A even when the amount of turning is small.

Another principle of peeling the outer bag film 60 consisting of the outer-layer-film 20 and the intermediate layer 5 in the package according to the present invention will be described below with reference to FIG. 26A–FIG. 26D.

Figure 26A:
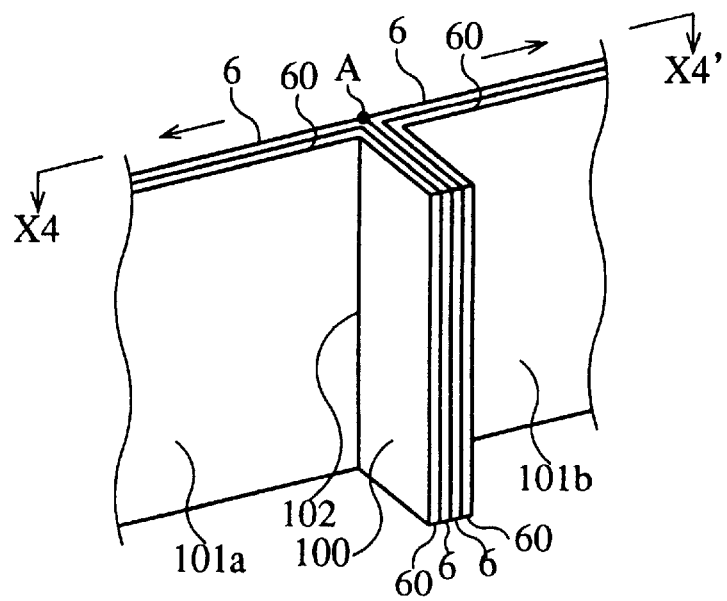
FIG. 26A is a perspective view illustrating a laminated film superposed, partly heat-sealed, and opened.
Figure 26B:
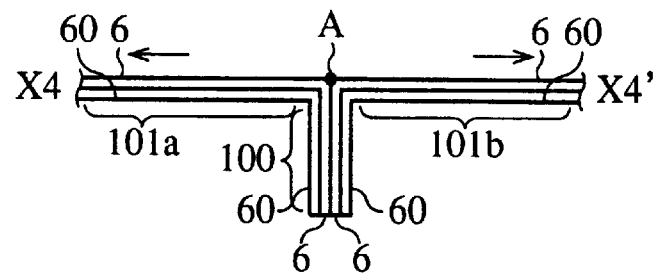
FIG. 26B is a view taken in the direction of the arrows along the line X4–X4' in FIG. 26A.
Figure 26C:
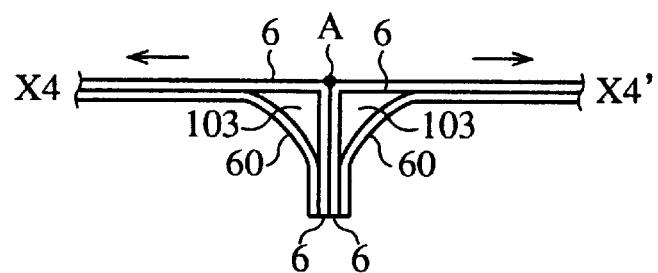
FIG. 26C is a diagram illustrating a process of peeling the outer bag film.
Figure 26D:
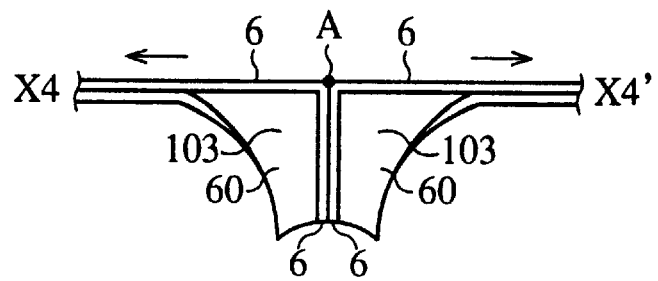
FIG. 26D is a diagram illustrating the process of peeling subsequent to that of peeling shown in FIG. 26C.

FIG. 26A is a perspective view of the laminated film in the state shown in FIG. 14A, with the front and the rear side of the laminated films 101a and 101b in the heat-sealed portion 100 opened toward the opposite sides from the boundary line 102. FIG. 26B is a view taken in the direction of the arrows along the line X4–X4' in FIG. 26A. FIG. 26C and FIG. 26D, corresponding to FIG. 26B, are diagrams illustrating sequential steps of the process of the separation of the outer bag film 60. In FIG. 26A–FIG. 26D, identical or similar parts found in FIG. 14A–FIG. 14D are denoted by like reference numerals. These parts are omitted from the following description to avoid repetition.

From the laminated film in the state shown in FIG. 26A and FIG. 26B, the outer bag film 60 can be easily peeled as shown in FIG. 26C and FIG. 26D. When the laminated films 101a and 101b on both sides of the boundary line 102 are pulled away from each other so as to exert force on the point A, the outer bag film 60 is peeled in the neighborhood of the point A and the gap 103 gradually grows between the water-soluble film 6 and the outer bag film 60. The reason for this peeling (or separation) is that the water-soluble film 6 stretches in a larger amount than the outer bag film 60 and also that the front and the rear part of the water-soluble film 6 of the laminated film in the heat-sealed portion 100 bordering on the boundary line 102 are fused to each other. As a result, the outer bag film 60 can be easily peeled by utilizing this gap 103 as a beginning for peeling the outer bag film 60. In the example shown in FIG. 26A–FIG. 26D, since the width of the heat-sealed portion 100 (the length in the vertical direction in the bearings of FIG. 26B) is small, the gap 103 passes the state of FIG. 26C and expands to the corner part of the heat-sealed portion 100 as shown in FIG. 26D. The width of the heat-sealed portion 100 is not always required to be small.

Still another principle of peeling the outer bag film 60 consisting of the outer-layer-film 20 and the intermediate layer 5 in the package according to the present invention will be described below with reference to FIG. 15A–FIG. 15D.

Figure 15A:
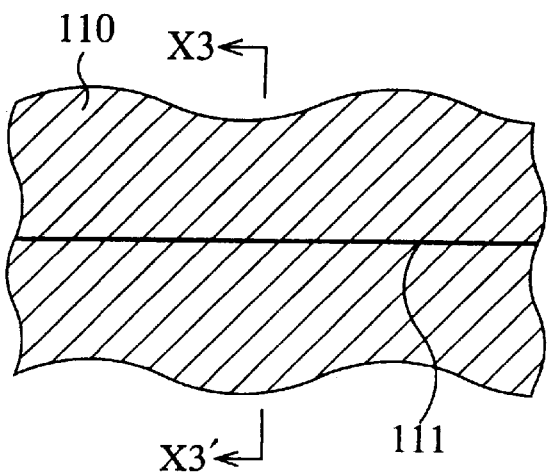
FIG. 15A is a plan view illustrating a laminated film superposed and partly heat-sealed.
Figure 15B:
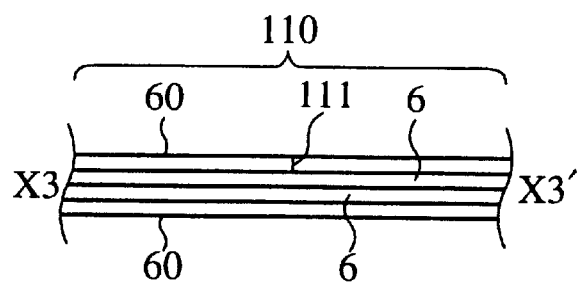
FIG. 15B is a cross section taken along the line X3–X3' in FIG. 15A.
Figure 15C:
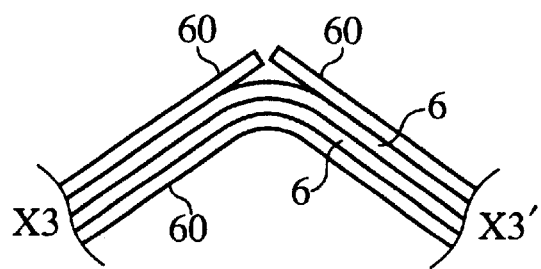
FIG. 15C is a diagram illustrating a process of peeling the outer bag film.
Figure 15D:
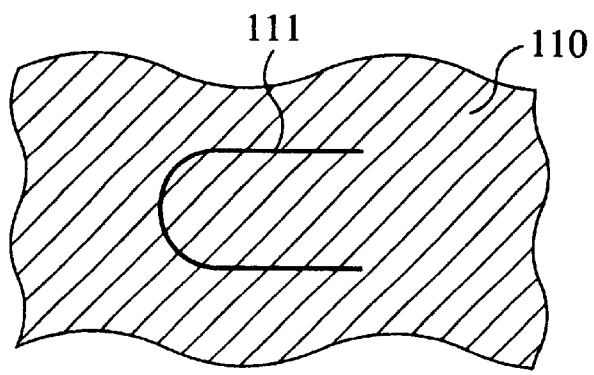
FIG. 15D is a plan view illustrating a laminated film superposed and partly heat-sealed.

FIG. 15A is a plan view of what is obtained by superposing the laminated film shown in FIG. 1 so that the water-soluble film 6 is positioned inside and heat-sealing a part of the superposed laminated film, as seen from the front side thereof. FIG. 15B is a cross section taken through FIG. 15A across the line X3–X3'. FIG. 15C, corresponding to FIG. 15B, is a diagram illustrating a step of peeling the outer bag film 60. FIG. 15D, corresponding to FIG. 15A, is a plan view illustrating another example of a slit 111.

As shown in FIG. 15A and FIG. 15B, the linear slit 111 piercing only the outer bag film 60 of the laminated film on the front side are formed in the heat-sealed portion 100. The slit 111 of this kind can be formed, for example, by depressing a blade having a height equal to the thickness of the outer bag film 60.

From the laminated film which is superposed as shown in FIG. 15A and Fib. 15B, the outer bag film 60 can be easily peeled as shown in FIG. 15C. Specifically, the peeling is attained by simply folding the outer bag film 60 along the slit 111 as shown in FIG. 15C. As a result, the outer bag film 60 is peeled and raised from the water-soluble film 6 in the portion extending along the slit 111. The outer bag film 60, therefore, can be easily peeled by utilizing the raised portion as a beginning for the outer bag film 60.

While the slit 111 is formed in a linear shape in the case shown in FIG. 15A–FIG. 15C, it may be formed in the shape of the letter U (or in the shape of three sides of a square) as shown in FIG. 15D. In this case, the outer bag film 60 can be peeled in the shape of a tongue. While the slit 111 is formed in the heat-sealed portion in the case shown in FIG. 15A–FIG. 15C, it may be formed in a non-heat-sealed portion (not shown) instead. Where the laminated film on the front side and the laminated film on the rear side do not form a mutually continuing portion through the medium of a folding line, a slit piercing only the outer bag film 60 of the laminated film on the front side, though not shown in the diagram, may be formed.

Now, typical bags made of the laminated film shown in FIG. 1 in accordance with the principles of peeling mentioned above will be described below with reference to FIG. 16 through FIG. 25.

FIG. 16 through FIG. 25 represent examples of the bag, made the laminated film shown in FIG. 1. In these bags, the laminated film is formed in the shape of a bag opened on one side thereof. In these bags, the laminated film is superposed so that the water-soluble film 6 is positioned inside, and prescribed portions of the superposed laminated film are heat-sealed so that the parts of the water-soluble film 6 facing to each other at the prescribed portions are fused to each other. These bags is constituted of two mutually separate laminated films on the front and the rear side which are superposed upon each other. The bags may be constituted of one laminated films superposed by folding. In this case, the folding line for superposing the one laminated film is set so as to be positioned on a prescribed position (for example, the left side or the right side in the bag shown in FIG. 16 which will be described specifically below). The bags shown in FIG. 16 through FIG. 25 are invariably so-called three-side-sealed bags. The bags according to the present invention do not need to be limited to this particular structure.

Figure 16:
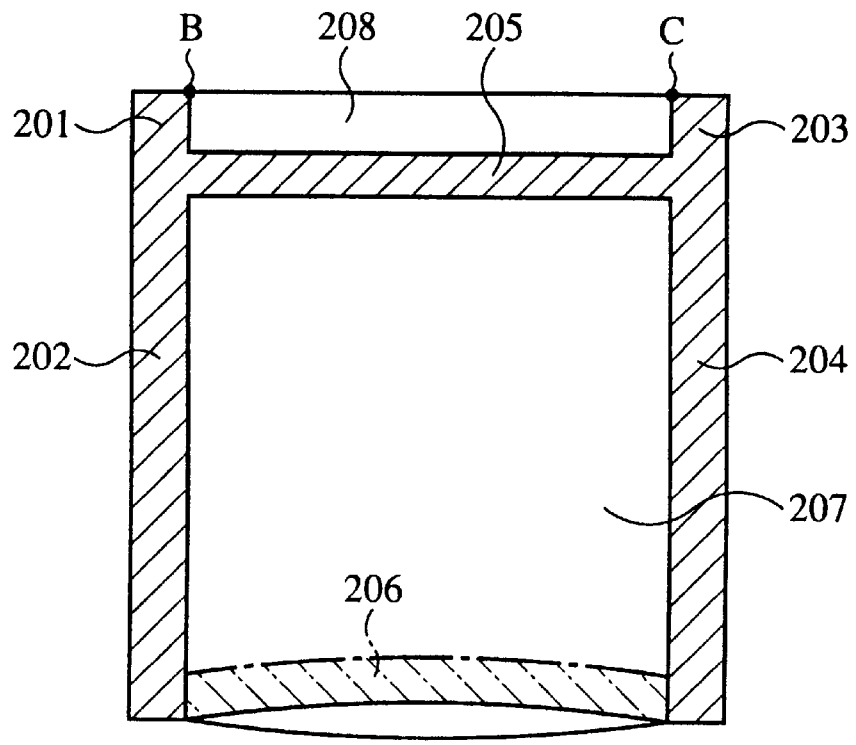
FIG. 16 is a diagram illustrating a bag according to a further embodiment of the present invention.

In the bag shown in FIG. 16, portions 201–204 along the left and the right sides and a strip portion 205 separated by a prescribed distance from the upper side and laid parallel to the upper side are heat-sealed and the lower side is left open. The part which is enclosed with the heat-sealed portions 202, 204, and 205 and a portion 206 extended along the lower side which is heat-sealed after a prescribed commodity has been inserted through the opening of the lower side constitutes itself an area 207 destined to accommodate the commodity. In the area outside the heat-sealed portion 205 which participates in enclosing the area 207 destined to accommodate the commodity, therefore, a non-heat-sealed portion 208 and the heat-sealed portions 201 and 203 are formed in a mutually adjoining state. One-ends (points B and C) of the boundary lines between the non-heat-sealed portion 208 in the outside area and the heat-sealed portions 201 and 203 in the outside area reach the outer edge of the bag on which the laminated film on the front side and the laminated film on the rear side do not continue into each other. A part of the peripheral edge of the non-heat-sealed portion 208 in the outside area mentioned above, which continues to the boundary line mentioned above (namely the upper side of the non-heat-sealed portion 208), forms a part of the outer edge of the bag on which the laminated film on the front side and the laminated film on the rear side do not continue into each other. A part of the peripheral edge of the heat-sealed portions 201 and 203 in the outside area mentioned above, which continues to the boundary line mentioned above (namely the upper side of the heat-sealed portions 201 and 203), forms a part of the outer edge of the bag on which the laminated film on the front side and the laminated film on the rear side do not continue into each other. A part of the peripheral edge of the heat-sealed portions 201 and 203 which confront to the boundary line mentioned above (namely the left side of the heat-sealed portion 201 and the right side of the heat-sealed portion 203), forms a part of the outer edge of the bag on which the laminated film on the front side and the laminated film on the rear side do not continue into each other. In the present embodiment, the widths of the heat-sealed portions 201 and 203 in the lateral direction are relatively large.

The bag which is opened on the lower side as shown in FIG. 16, in the case of the bag supplying method, are supplied from a manufacturer of bags to a manufacturer of commodities. In the case of the bag supplying method, the manufacturer of commodities places his commodity into the bag shown in FIG. 16 through the opening in the lower side and subsequently heat-seals the portion 206 along the lower side to complete a package, i.e. the product in the finished state in which it reaches the user of the commodities. In the case of the automatic packaging method, the manufacturer of commodities performs continuously the operation of producing bags shown in FIG. 16 from the laminated film shown in FIG. 1 and taken up in the shape of a roll, filling the bags with his commodities, and further heat-sealing the portion 206 along the lower side. This situation similarly applies to the bags to be described below.

The bag of the package is in a double-wall structure consisting of the outer-layer-film 20 and the intermediate layer 5 (the outer bag film 60) which adhere fast to each other and function as an outer bag and the water-soluble film 6 which functions as an inner bag. The outer bag film 60 and the water-soluble film 6 adhere so weakly to each other as to be peelable. The user of the commodity accommodated in the package, therefore, has only to peel the outer bag film 60 to gain access to the commodity as accommodated in the inner bag formed of the water-soluble film 6 like the aforementioned composite bag which consists of an inner bag and an outer bag.

In the package using the bag shown in FIG. 16, the non-heat-sealed portion 208 in FIG. 16 corresponds to the non-heat-sealed portion 101 in FIG. 13D–FIG. 13D, the heat-sealed portions 201 and 203 in FIG. 16 correspond to the heat-sealed portion 100 in FIG. 13A–FIG. 13D, and the points B and C in FIG. 16 correspond to the point A in FIG.

13A–FIG. 13D. The outer bag film 60 can be easily peeled off this package by the method of peeling described above with reference to FIG. 13A–FIG. 13D. When the front and the rear laminated film in the non-heat-sealed portion 208 in FIG. 16 are opened as shown in FIG. 26A and FIG. 26B, the outer bag film 60 can be easily peeled off the package by the method of peeling described above with reference to FIG. 26A–FIG. 26D.

Figure 17:
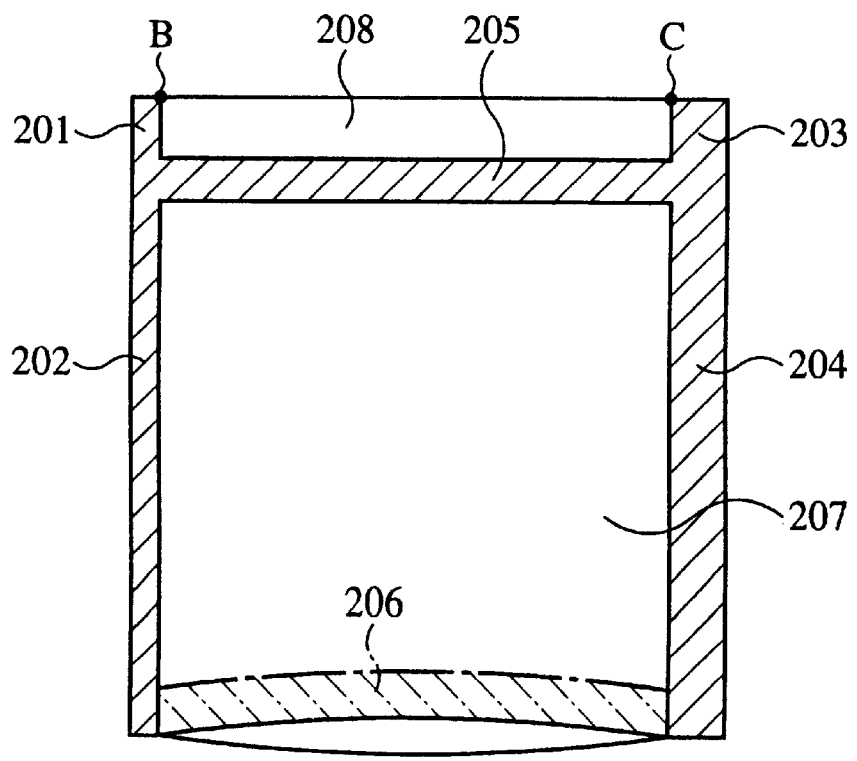
FIG. 17 is a diagram illustrating a bag according to another embodiment of the present invention.
Figure 28A:
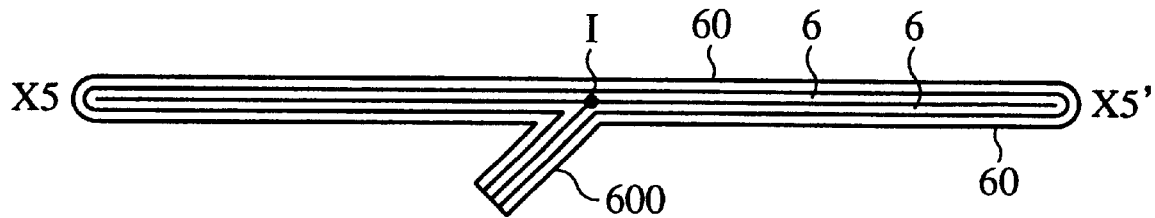
FIG. 28A is a view taken in the direction of the arrows along the line X5–X5' in FIG. 27A.
Figure 28B:
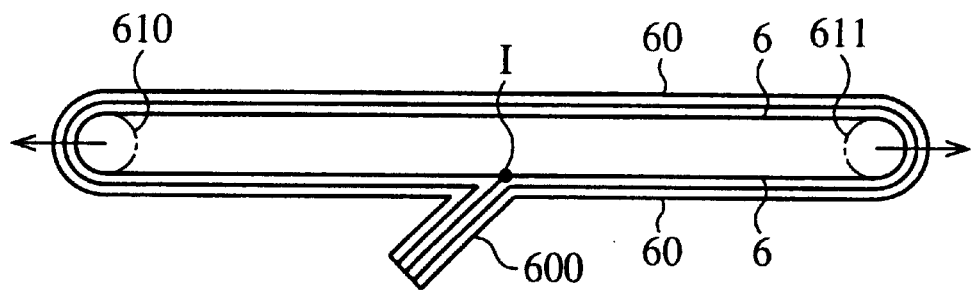
FIG. 28B is a diagram illustrating a first specific method for peeling the outer bag film.

In FIG. 17, identical or similar components found in FIG. 16 are denoted by like reference numerals. The description of these components will be omitted from the following description to avoid repetition. The bag shown in FIG. 17 differs from the bag shown in FIG. 16 only in respect that the heat-sealed portions 201 and 202 along the left side have a small width. In the package using the bag shown in FIG. 17, therefore, the non-heat-sealed portion 208 in FIG. 17 corresponds to the non-heat-sealed portion 101 in FIG. 14A–FIG. 14D, the heat-sealed portion 201 in FIG. 17 corresponds to the heat-sealed portion 100 in FIG. 14A–FIG. 14D, and the point B in FIG. 17 corresponds to the point A in FIG. 14A–FIG. 14D. The outer bag film 60 can be more easily peeled off this package by the method of peeling described above with reference to FIG. 14A–FIG. 14D. When the laminated films on the front and the rear side in the non-heat-sealed portion 208 in FIG. 17 are opened as shown in FIG. 26A and FIG. 28B, therefore, the outer bag film 60 can be easily peeled off this package by the method of peeling described above with reference to FIG. 26A–FIG. 26D.

Figure 18:
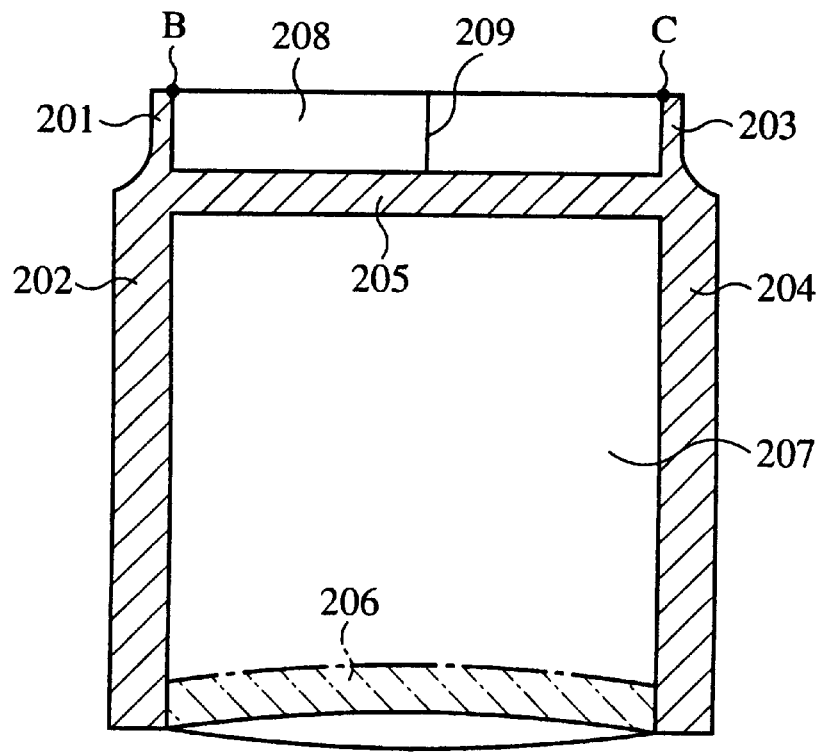
FIG. 18 is a diagram illustrating a bag according to still another embodiment of the present invention.

In FIG. 18, identical and similar components found in FIG. 16 are denoted by like reference numerals. The description of these components will be omitted from the following description to avoid repetition. The bag shown in FIG. 18 differs from the bag shown in FIG. 16 only in respect that in the bag shown in FIG. 18, the left side portion of the heat-sealed portion 201 in FIG. 16 is cut off to decrease the width of the heat-sealed portion 201, the right side portion of the heat-sealed portion 203 is cut off to decrease the width of the heat-sealed portion 203, and a slit 209 piercing the front and the rear laminated films is formed as vertically extended at the center of the non-heat-sealed portion 208. In the package using the bag shown in FIG. 18, therefore, the non-heat-sealed portion 208 in FIG. 18 corresponds to the non-heat-sealed portion 101 in FIG. 14A–FIG. 14D, the heat-sealed portions 201 and 203 in FIG. 18 correspond to the heat-sealed portion 100 in FIG. 14A–FIG. 14D, and the points B and C in FIG. 18 correspond to the point A in FIG. 14A–FIG. 14D. The outer bag film 60 can be more easily peeled off this package by the method of peeling described above with reference to FIG. 14A–FIG. 14D. The present embodiment has an advantage in enabling the non-heat-sealed portion 208 to be easily turned up by virtue of the slit 209. When the front and the rear laminated film in the non-heat-sealed portion 208 in FIG. 18 are opened as shown in FIG. 26A and FIG. 26B, the outer bag film 60 can be easily peeled off this package by the method of peeling described above with respect to FIG. 26A–FIG. 26D.

Figure 19:
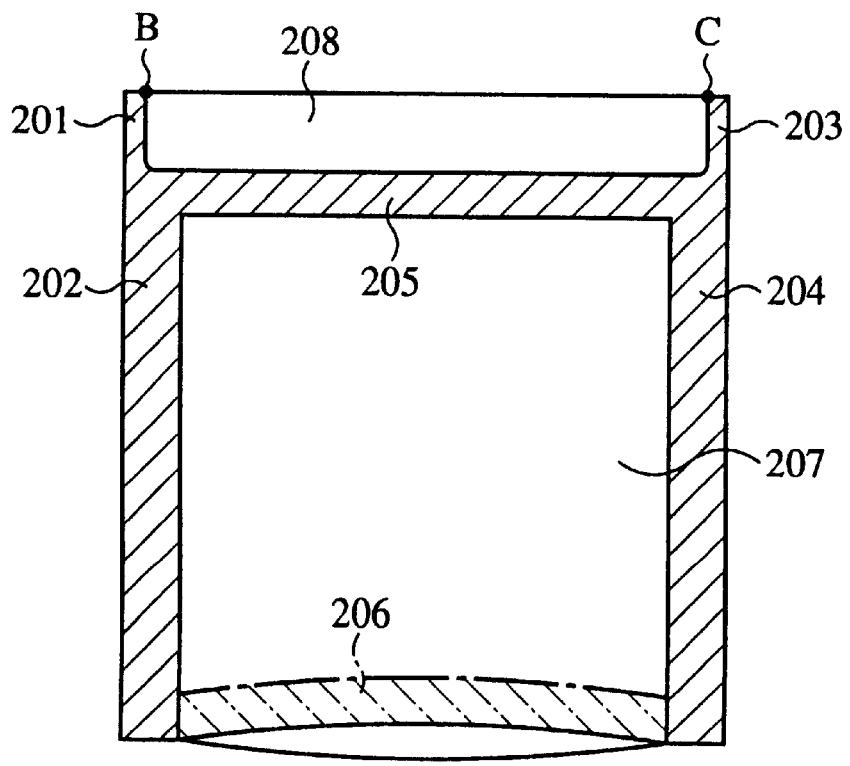
FIG. 19 is a diagram illustrating a bag according to yet another embodiment of the present invention.

In FIG. 19, identical and similar components found in FIG. 16 are denoted by like reference numerals. The description of these components will be omitted from the following description to avoid repetition. The bag shown in FIG. 19 differs from the bag shown in FIG. 16 only in respect that in the bag shown in FIG. 19, the widths of the heat-sealed portions 201 and 203 are small. The bag shown in FIG. 19, unlike the bag shown in FIG. 18, excludes the cutoff mentioned above. Likewise in the package using the bag shown in FIG. 19, the outer bag film 60 can be more easily peeled off this package by the method of peeling described above with reference to FIG. 14A–FIG. 14D. When the front and the rear laminated films in the non-heat-sealed portion 208 in FIG. 19 are opened as shown in FIG. 26A and FIG. 26B, the outer bag film 60 can be easily peeled off this package by the method of peeling described above with reference to FIG. 26A–FIG. 26D.

Figure 20:
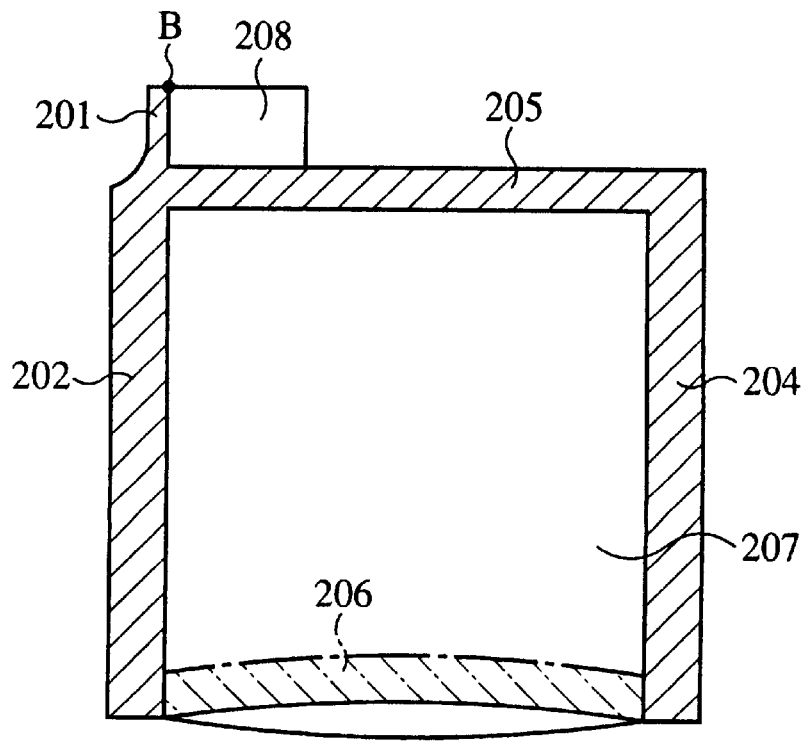
FIG. 20 is a diagram illustrating a bag according to a further embodiment of the present invention.

In FIG. 20, identical and similar components found in FIG. 16 are denoted by like reference numerals. The description of these components will be omitted from the following description to avoid repetition. The bag shown in FIG. 20 differs from the bag shown in FIG. 16 only in respect that in the bag shown in FIG. 20, the right side portions of the heat-sealed portion 203 and the non-heat-sealed portion 208 in FIG. 16 are cut off and the heat-sealed portion 201 in FIG. 16 is cut off to decrease the width of the heat-sealed portion 201. In the package using the bag shown in FIG. 20, therefore, the non-heat-sealed portion 208 in FIG. 20 corresponds to the non-heat-sealed portion 101 in FIG. 5, the heat-sealed portion 201 in FIG. 20 corresponds to the heat-sealed portion 100 in FIG. 14A–FIG. 14D, and the point B in FIG. 20 corresponds to the point A in FIG. 14A–FIG. 141D. The outer bag film 60 can be more easily peeled off this package by the method of peeling described above with reference to FIG. 14A–FIG. 14D. When the front and the rear laminated film in the non-heat-sealed portion 208 in FIG. are opened as shown in FIG. 26A and FIG. 26B, therefore, the outer bag 60 can be easily peeled from this package by the method of peeling described above with reference to FIG. 26A–FIG. 26D.

Figure 21:
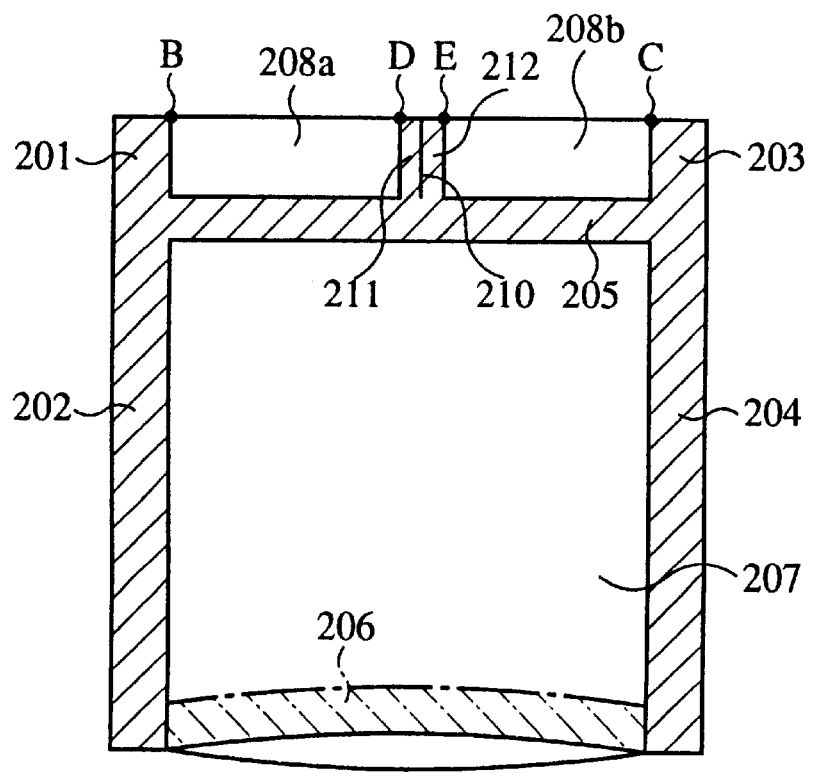
FIG. 21 is a diagram illustrating a bag according to another embodiment of the present invention.

In FIG. 21, identical and similar components found in FIG. 16 are denoted by like reference numerals. The description of these components will be omitted from the following description to avoid repetition. The bag shown in FIG. 21 differs from the bag shown in FIG. 16 only in respect that in the bag shown in FIG. 21, a slit 210 piercing the front and the rear laminated film is formed vertically at the center of the non-heat-sealed portion 208, heat-sealed portions 211 and 212 are formed on the left and the right sides of the slit 210, and two non-heat-sealed portions 208a and 208b are used instead of the non-heat-sealed portion 208 in FIG. 16. One end of the slit 210 reaches the outer edge (namely the upper side) of the back on which the laminated film on the front side and the laminated film on the rear side do not continue into each other. A part of the peripheral edge of the heat-sealed portion 211, which confronts the boundary line between the heat-sealed portion 211 and the non-heat-sealed portion 208a (namely, the right side of the heat-sealed portion 211), coincides with the slit 210. Likewise, a part of the peripheral edge of the heat-sealed portion 212, which confronts the boundary line between the heat-sealed portion 212 and the non-heat-sealed portion 208b (namely, the left side of the heat-sealed portion 211), coincides with the slit 210. The width of the portion of the heat-sealed portion along the boundary line mentioned above (namely, the length of the upper side of the heat-sealed portion 211) is decreased. The width of the portion of the heat-sealed portion 212 along the boundary line (namely, the length of the upper side of the heat-sealed portion 212) is similarly decreased. In the package using the bag shown in FIG. 21, the non-heat-sealed portions 208a and 208b in FIG. 21 correspond to the non-heat-sealed portion 101 in FIG. 14A–FIG. 14D, the heat-sealed portions 211 and 212 in FIG. 21 correspond to the heat-sealed portion 100 in FIG. 14A–FIG. 14D, and the point D, E in FIG. 21 corresponds to the point A in FIG. 14A–FIG. 14D. The outer bag film 60 can be more easily peeled off this package by the method of peeling described above with reference to FIG. 14A–FIG. 14D. When the front and the rear laminate film in the non-heat-sealed portion 208a or 208b in FIG. 21 are opened as shown in FIG. 26A and FIG. 26B, therefore, the outer bag film 60 can be easily peeled from this package by the method of peeling described above with reference to FIG. 26A–FIG. 26D.

Figure 22:
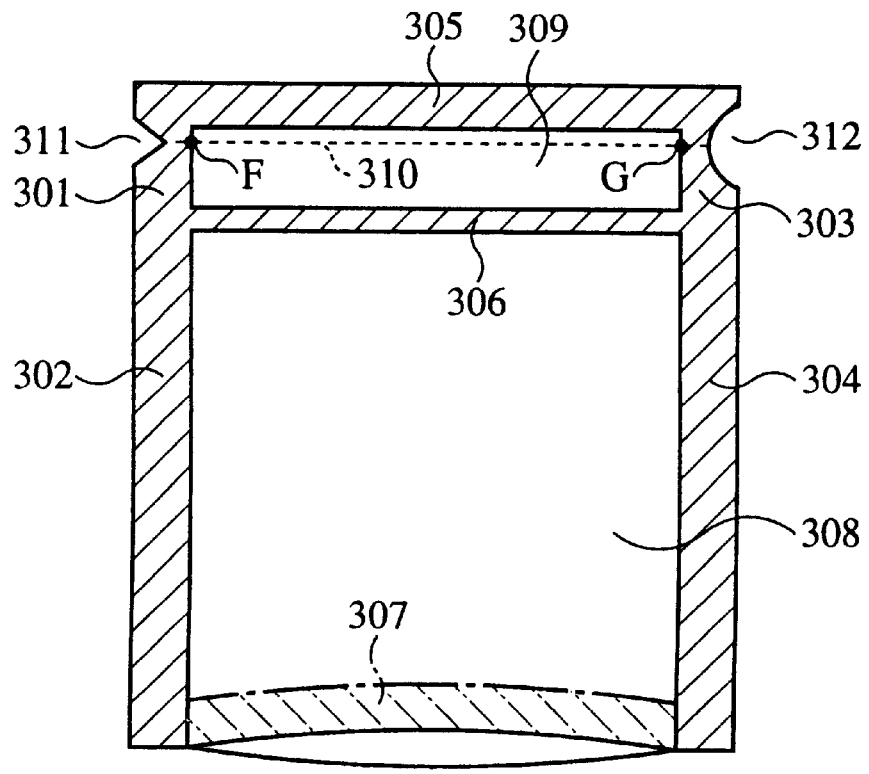
FIG. 22 is a diagram illustrating a bag according to still another embodiment of the present invention.

In the bag shown in FIG. 22, portions 301–304 along the left and the right sides, a portion 305 along the upper side, and a strip portion separated by a prescribed distance from the upper side and extended parallel to the upper side are heat-sealed and the lower side is left open. The part which is enclosed with the heat-sealing portions 302, 304 and 306, and a portion 307 extended along the lower side which will be heat-sealed after a prescribed commodity has been inserted in the bag through the opening in the lower side constitutes itself an area 308 destined to accommodate the commodity. As a result, a non-heat-sealed portion 309 enclosed with the heat-sealed portions 301, 303, 305 and 306 is formed in the area outside the heat-sealed portion 306 which participates in enclosing the area 308 destined to accommodate the commodity. In the outside area mentioned above, perforations 310 for excising a part of the area are formed. In the present embodiment, the perforations 310 are linearly formed parallel to the lower side of the heat-sealed portion 305 at a position slightly lower than the lower side of the heat-sealed portion 305 and are allowed to reach the left side of the heat-sealed portion 301 and the right side of the heat-sealed portion 305. At the left end of the perforations 310 (namely, the heat-sealed portion 301), a notch 311 for facilitating the excision along the perforations 310 is formed. In the neighborhood of the right end of the perforations 310 (namely, the heat-sealed portion 303), a notch 312 corresponding to the excision portion of the heat-sealed portion 203 described above with reference to FIG. 18 is formed. One-ends (points F and G) of the boundary lines between the non-heat-sealed portion 309 and the heat-sealed portions 301 and 303 mutually adjoining in the outside area mentioned above remaining after the excision of the upper side portion of the perforations 310 in the outside area mentioned above reach the perforations 310. A part of the peripheral edge of the heat-sealed portion 309 remaining after the excision of the upper side portion of the perforations 310 in the outside area mentioned above, which continues to the boundary line mentioned above, coincides with the perforations 310. A part of the peripheral edge of the heat-sealed portions 301 and 303 remaining after the excision of the upper side portion of the perforations 310 in the outside area mentioned above, which continues to the boundary line mentioned above, coincides with the perforations 310.

In the package using the bag shown in FIG. 22, the peeling of the outer bag film 60 is initiated by excising the upper side portion of the perforations 310 along the perforations 310. As a result, the remaining heat-sealed portion 301 corresponds to the heat-sealed portion 201 in FIG. 20, the point F corresponds to the point B in FIG. 16, and the heat-sealed portions 306 corresponds to the heat-sealed portion 205 in FIG. 16 and FIG. 18, the remaining heat-sealed portion 303 corresponds to the heat-sealed portion 203 in FIG. 18, and the point G corresponds to the point C in FIG. 18. The outer bag film 60, therefore, can be as easily peeled as in the embodiments of FIG. 16 and FIG. 18. In the bag shown in FIG. 22, there is no possibility that the water-soluble film 6 of the non-heat-sealed portion 309 is degenerated by the ambient condition because the non-heat-sealed portion 309 is enclosed with the heat-sealed portions 301, 303, 305 and 306 and the non-heat-sealed portion 309 is not opened into the ambience except for the portion of the perforations 310.

Figure 23:
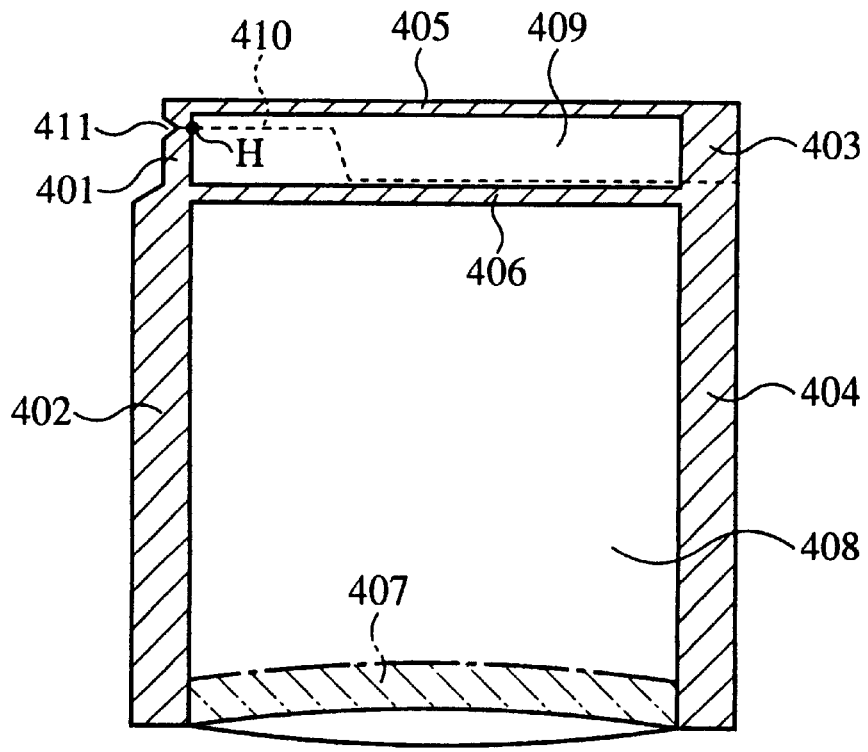
FIG. 23 is a diagram illustrating a bag according to yet another embodiment of the present invention.

In the bag shown in FIG. 23, portions 401–404 along the left and the right sides, a portion 405 along the upper side, and a strip portion 406 separated by a prescribed distance from the upper side and extended parallel to the upper side are heat-sealed and the lower side is left open. The part which is enclosed with the heat-sealed portions 402, 404 and 406, and a portion 407 which will be heat-sealed after a prescribed commodity has been inserted in the bag through the opening in the lower side constitutes itself an area 408 destined to accommodate the commodity. As a result, a non-heat-sealed portion 409 enclosed with the heat-sealed portions 401, 403, 405 and 406 is formed in the area outside the heat-sealed portion 406 which participates in enclosing the area 408 destined to accommodate the commodity. The heat-sealed portion 401 has the left side thereof cut off to decrease the width thereof. In the outside area mentioned above, perforations 410 for cutting off a part of the area are formed. In the present embodiment, the perforations 410 on the left side are linearly formed parallel to the lower side of the heat-sealed portion 405 at a position slightly lower than the heat-sealed portion 405 and on the right side are linearly formed parallel to the upper side of the heat-sealed portion 406 at a position slightly higher than the heat-sealed portion 406. Collectively, the perforations 410 are formed in a stepped manner. They reach the left side of the heat-sealed portion 401 and the right side of the heat-sealed portion 403. At the left end of the perforations (namely the heat-sealed portion 401), a notch 411 adapted to facilitate the separation along the perforations 410 is formed. One end (the point H) of the boundary line between the non-heat-sealed portion 409 and the heat-sealed portion 401 mutually adjoining in the outside area mentioned above remaining after the excision of the upper side portion of the perforations 410 in the outside area reaches the perforations 410. A part of the peripheral edge of the non-heat-sealed portion 409 remaining after the excision of the upper side portion of the perforations 410 in the outside area mentioned above, which continues to the boundary line mentioned above, coincides with the perforations 410. A part of the peripheral edge of the heat-sealed portions 401 and 403 remaining after the excision of the upper side portion of the perforations 410 in the outside area mentioned above, which continues to the boundary line mentioned above, coincides with the perforations 410.

In the package using the bag shown in FIG. 23, the peeling of the outer bag film 60 is initiated by excising the upper side portion of the perforations 410 along the perforations 410. As a result, the remaining heat-sealed portion 401 corresponds to the heat-sealed portion 201 in FIG. 20, the point H corresponds to the point B in FIG. 20, and the heat-sealed portions 406 corresponds to the heat-sealed o portion 205 in FIG. 20. The outer bag film 60, therefore, can be as easily peeled as in the embodiment of FIG. 20. In the bag shown in FIG. 23, there is no possibility that the water-soluble film 6 of the non-heat-sealed portion 409 is degenerated by the ambient condition because the non-heat-sealed portion 409 is enclosed with the heat-sealed portions 401, 403, 405 and 406 and the non-heat-sealed portion 409 is not opened to the ambience except for the portion of the perforations 410.

Figure 24:
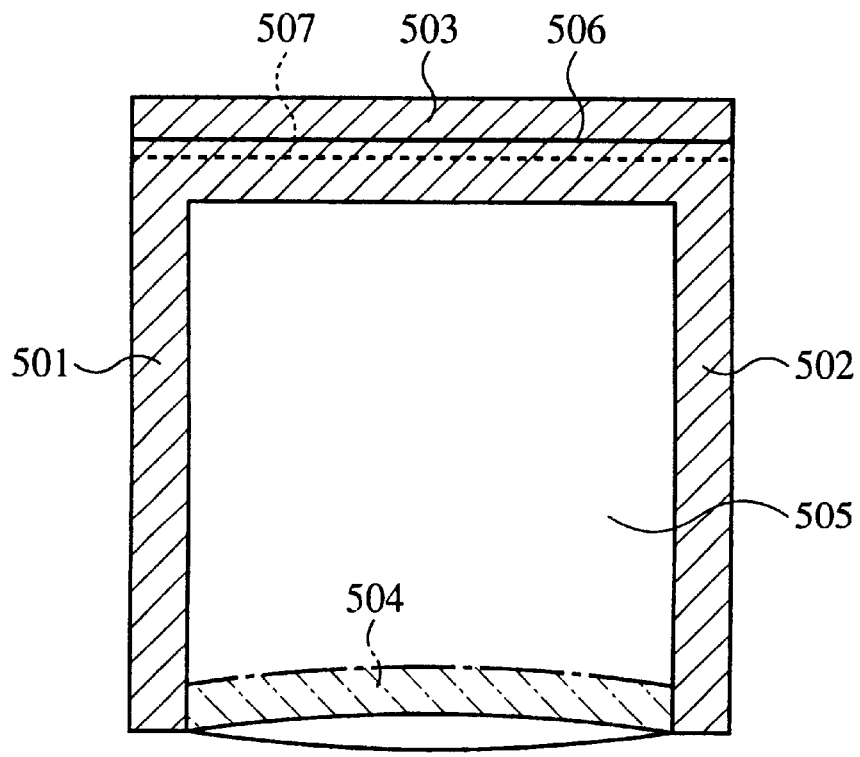
FIG. 24 is a diagram illustrating a bag according to a further embodiment of the present invention.

In the bag shown in FIG. 24, portions 501–503 along the left side, the right side and the upper side are heat-sealed and the lower side is left open. The part which is enclosed with the heat-sealed portions 501–503 and a portion 504 along the lower side which will be heat-sealed after the commodity has been inserted into the bag through the opening in the lower side constitutes itself an area 505 destined to accommodate the commodity. In the heat-sealed portion 503 which forms an area outside the area 505 destined to accommodate the commodity, a slit 506 piercing only the outer bag film 60 on the front side and a slit 507 piercing only the outer bag film 60 on the rear side are formed. In the present embodiment, the slits 506 and 507 are linearly formed and allowed to reach the left and the right sides of the bag.

In the package using the bag shown in FIG. 24, the heat-sealed portion 503 corresponds to the heat-sealed portion 110 in FIG. 15A–FIG. 15C and the slits 506 and 507 correspond to the slit 111 in FIG. 15A–FIG. 15C. The outer bag film 60, therefore, can be easily peeled off this package by the method of peeling described above with reference to FIG. 15A–FIG. 15C.

Figure 25:
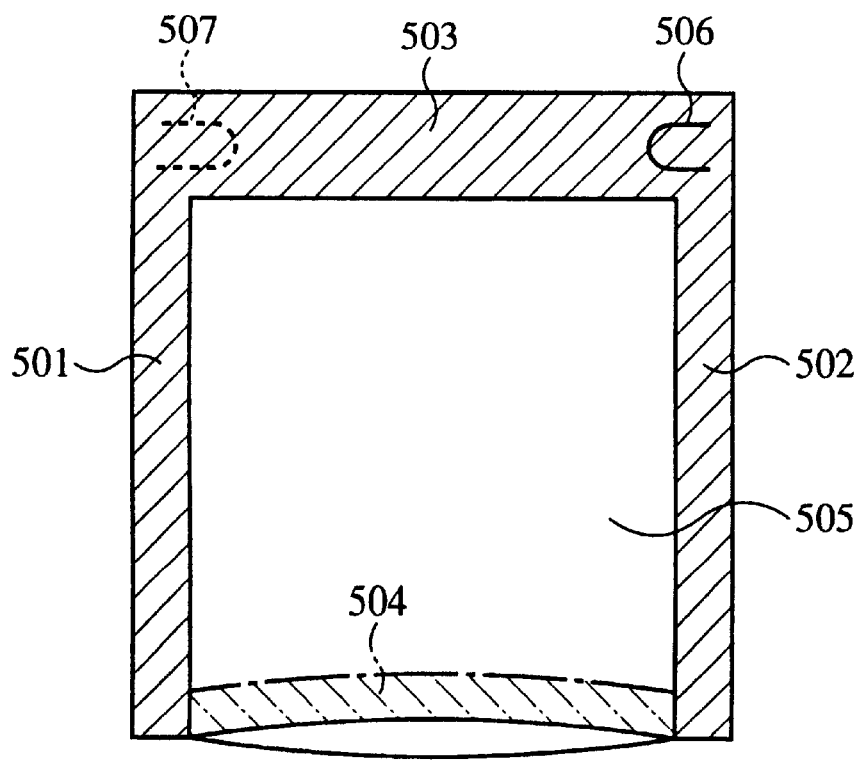
FIG. 25 is a diagram illustrating a bag according to another embodiment of the present invention.

In FIG. 25, identical and similar components found in FIG. 24 are denoted by like reference numerals. The description of these parts will be omitted from the following description to avoid repetition. The bag shown in FIG. 25 differs from the bag shown in FIG. 24 only in respect that the slits 506 and 507 are each formed in the shape of the letter U. In the package using the bag shown in FIG. 25, therefore, the heat-sealed portion 503 corresponds to the heat-sealed portion 110 in FIG. 15D and the slits 506 and 507 correspond to the slit 111 in FIG. 15D. The outer bag film 60, therefore, can be easily peeled off this package by the method of peeling described above with reference to FIG. 15D.

Now, yet other typical bags made of the laminated film shown in FIG. 1 in accordance with the principles of peeling mentioned above will be described below with reference to FIG. 27 through FIG. 36B.

FIG. 27A, FIG. 29A, FIG. 30A, FIG. 31A, FIG. 32, FIG. 33A, FIG. 34A, FIG. 35A, and FIG. 36A severally illustrate examples of the bag made of one laminated film shown in FIG. 1. In these bags, the laminated film is formed in the shape of a tube lined with the water-soluble film in such a manner that: (a) a first strip portion of the laminated film and a second strip portion of the laminated film are superposed on each other so that the corresponding portions of the water-soluble film of the first and second strip portions face to each other; and (b) the corresponding portions of the water-soluble film of the first and second strip portions are fused to each other by heat-sealing. A prescribed portion of the tube is heat-sealed so that the parts of the water-soluble film facing to each other at the prescribed portion are fused to each other in such a manner that an area destined to accommodate a commodity in the tube is occluded relative to the side of a first end part side of the tube, thereby the laminated film is formed in the shape of a bag in which the area destined to accommodate the commodity is opened from a second end part side of the tube.

Figure 27A:
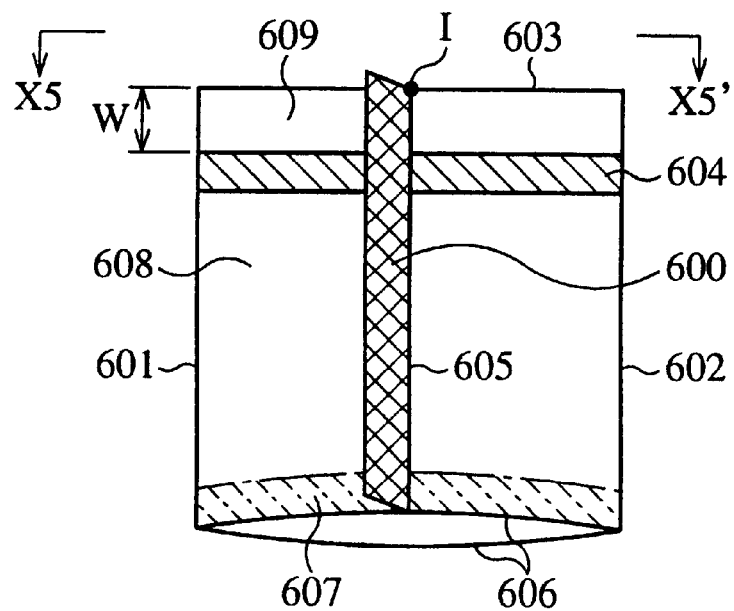
FIG. 27A is a diagram illustrating a bag according to a further embodiment of the present invention.
Figure 27B:
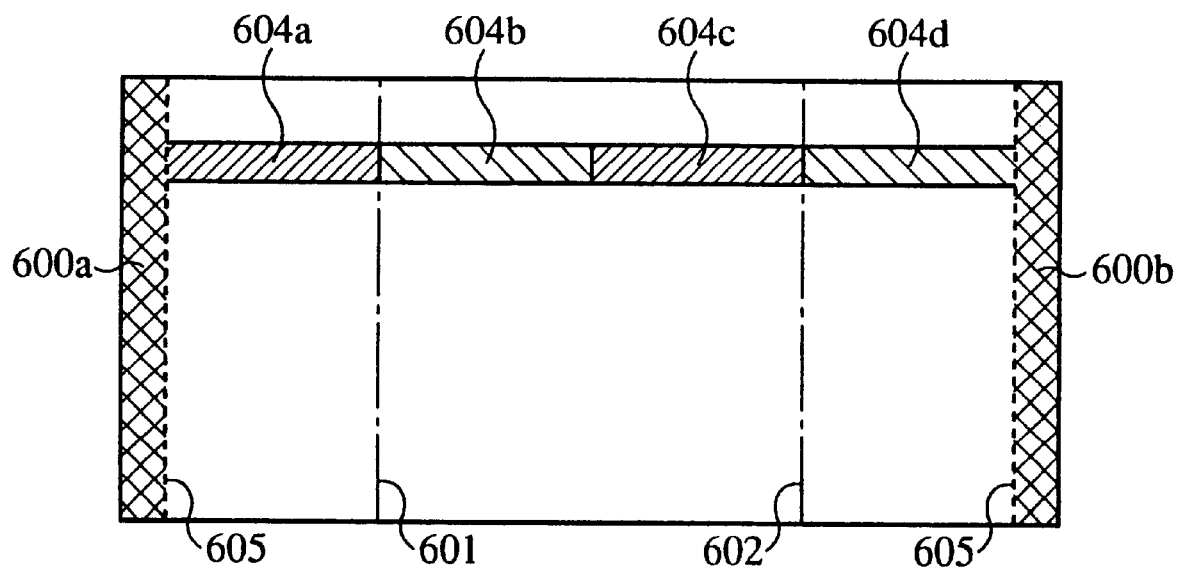
FIG. 27B is a developed diagram of the bag shown in FIG. 27A.

The bag shown in FIG. 27A is made of one rectangular laminated film (the laminated film shown in FIG. 1) shown in FIG. 27B. FIG. 27B depicts the bag shown in FIG. 27A in a developed state. In FIG. 27B, the water-soluble film 6 is disposed in the foreground side and the outer bag film 60 in the background side with respect to the surface of the sheet of the figure. In the bag shown in FIG. 27A, a first strip portion 600a extending along the left side and a second strip portion 600b extending along the right side respectively of the laminated film shown in FIG. 27B are superposed so that the corresponding portions of the water-soluble film of the strip portions 600a and 600b face to each other. The corresponding portions of the water-soluble film of the strip portions 600a and 600b are fused to each other. In such a manner, the portion of the laminated film other than the strip portions 600a and 600b forms a tube. In FIG. 27A, 600 denotes a heat-sealed portion consisting of the strip portions 600a and 600b. In the present embodiment, the heat-sealed portion 600 constitutes a backlining part and the bag shown in FIG. 27A is a backlining-type bag. In the present embodiment, the laminated film is folded inwardly along lines 601 and 602 in FIG. 27B. These lines 601 and 602 correspond to the left and the right sides of the bag shown in FIG. 27A. In the bag shown in FIG. 27A, a strip portion (heat-sealed portion) 604 separated by a prescribed distance W from an upper end part side 603 of the tube and extended parallel to the end part side 603 is heat-sealed. That is, the a portion 604a of the water-soluble film 6 and a portion 604b of the water-soluble film 6 in FIG. 27B are superposed and fused to each other, and a portion 604c of the water-soluble film 6 and a portion 604d of the water-soluble film 6 are superposed and fused to each other. These portions 604a through 604d jointly form the heat-sealed portion 604. One end (the upper end, the point I) of a boundary line 605 between the heat-sealed portion 600 and the tube mentioned above reaches the end part side 603. In the present embodiment, the other end (the lower end) similarly reaches a lower end part side 606. In the bag shown in FIG. 27B, the area in the tube between the heat-sealed portion 604 and a strip portion 607 extended along the end part side 606 is an area 608 destined to accommodate the commodity. The strip portion 607 is destined to be heat-sealed after a commodity has been inserted into the bag through the opened end part side 606. The strip portion 607 to be heat-sealed may be separated by a slight distance from the end part side 606. The heat-sealed portion 604, therefore, occludes the area 608 destined to accommodate the commodity relative to the side of the end part side 603. In the area outside the heat-sealed portion 604 in the tube mentioned above, a non-heat-sealed portion 609 is formed. In the present embodiment, the non-heat-sealed portion 609 is formed in the shape of a strip of a width W along the end part side 603. The non-heat-sealed portion 609 is formed on both sides of the boundary line 605 astride the boundary line 605. A part of the peripheral edge of the non-heat-sealed portion 609 (namely, the upper side of the non-heat-sealed portion 609) includes one end (the point I) of the boundary line 605 and forms the end part side 603.

Figure 28C:
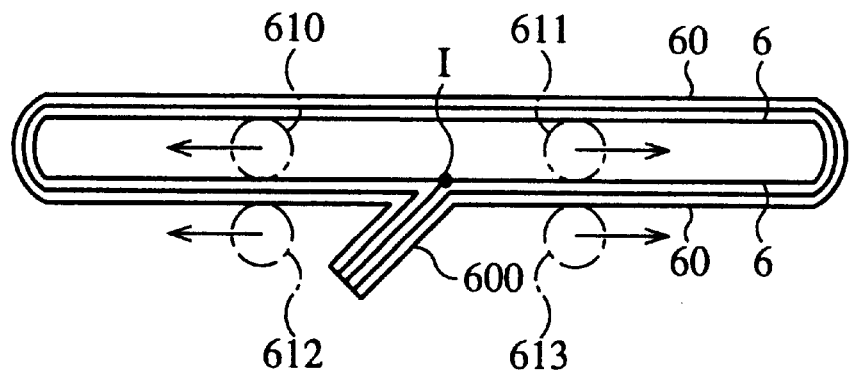
FIG. 28C is a diagram illustrating a second specific method for peeling the outer bag film.

In the package using the bag shown in FIG. 27A, the outer bag film 60 can be easily peeled off this package by the method of peeling described above with reference to FIG. 26A–FIG. 26D. This method of peeling will be described below with reference to FIG. 28A–FIG. 28C. FIG. 28A is a view taken in the direction of the arrows along the line X5–X5' in FIG. 27A. FIG. 28B, corresponding to FIG. 28A, is a diagram illustrating a first concrete method of peeling. FIG. 28C, corresponding to FIG. 28A, is a diagram illustrating a second concrete method of peeling. The peeling of the outer bag film 60 is attained by opening the end part side 603, inserting an index finger 610 of the left hand and an index finger 611 of the right hand, for example, inside the non-heat-sealed portion 610 as shown in FIG. 28B, and pulling the non-heat-sealed portion 610 toward the opposite sides. As a result, a force is exerted on the point I of the boundary line 605 mentioned above. In FIG. 27A and FIG. 28A–FIG. 28C, the heat-sealed portion 600 corresponds to the heat-sealed portion 100 in FIG. 26A–FIG. 26D and the laminated films on the opposite sides of the boundary line 605 in the non-heat-sealed portion 609 correspond to the laminated films 101*a* and 101*b*. The outer bag film 60, therefore, can be easily peeled according to the principle described above with reference to FIG. 26A–FIG. 26D. Peeling of the outer bag film 60 is attained by nipping the laminated film on the left side of the boundary line 605 in the non-heat-sealed portion 609 with an index finger 610 and a thumb 612 of the left hand, nipping the laminated film on the right side of the boundary line 605 in the non-heat-sealed portion 609 with an index finger 611 and a thumb 613 of the right hand as shown in FIG. 28C, and pulling the non-heat-sealed portion 609 toward the opposite sides. For the purpose of effectively performing such an operation, it is proper that the width W of the non-heat-sealed portion 609 is not less than 5 mm. The width W is preferably not less than 7 mm, and more preferably not less than 1 cm. If the width W of the non-heat-sealed portion 609 is unduly large, the excess will make no contribution to the accommodation of the commodity. Thus, the width W of the non-heat-sealed portion 609 is appropriately not more than 5 cm.

In the bag shown in FIG. 27A and FIG. 27B, the strip portions 600*a* and 600*b* which are destined to form the heat-sealed portion 600 are disposed along the left and the right sides of the laminated film. However, in FIG. 27B, the strip portion 600*a* alone may be disposed as separated by a prescribed distance from the left side, the strip portion 600*b* alone may be disposed as separated by a prescribed distance from the right side, or the strip portions 600*a* and 600*b* may be both disposed as separated by a prescribed distance (an equal distance or different distances) from the left and the right sides. This point similarly applies to the various bags to be described below.

Figure 29A:
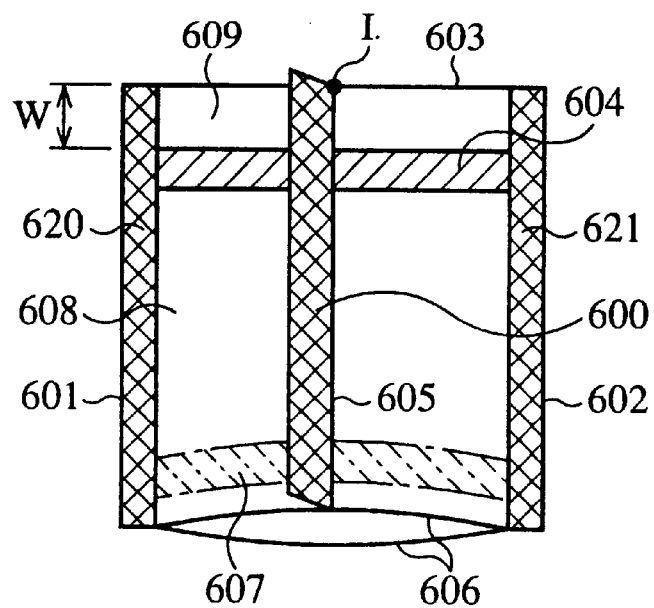
FIG. 29A is a diagram illustrating a bag according to a further embodiment of the present invention.
Figure 29B:
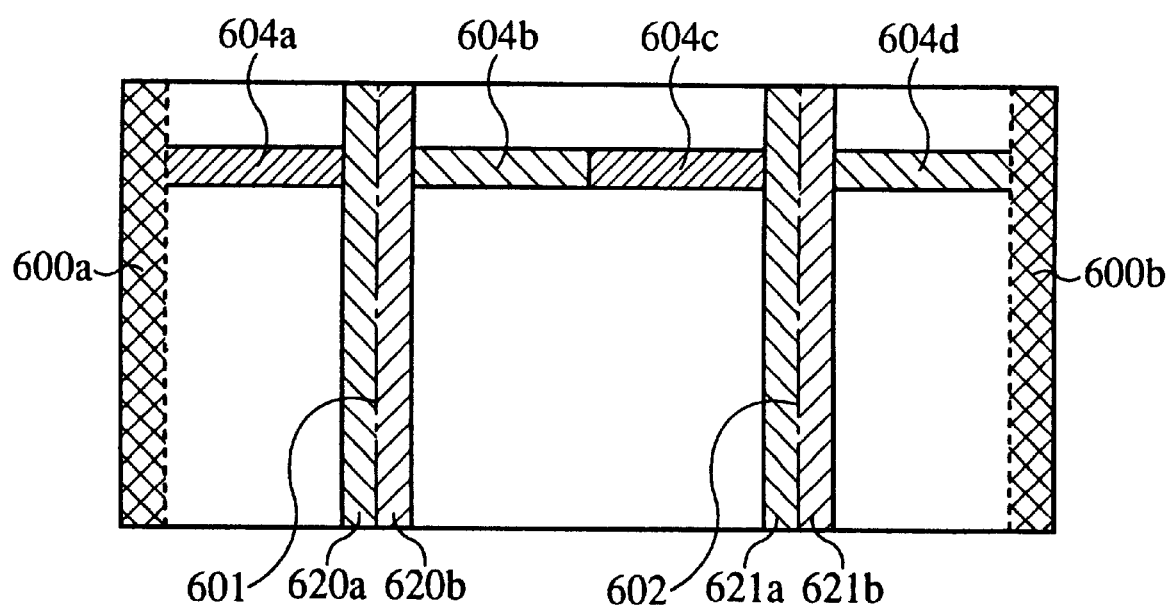
FIG. 29B is a developed diagram of the bag shown in FIG. 29A.

In FIG. 29A and FIG. 29B, identical or similar components found in FIG. 27A and FIG. 27B are denoted by like reference numerals. The description of these components will be omitted from the following description to avoid repetition. FIG. 29B depicts the bag shown in FIG. 29A in a developed state. The bag shown in FIG. 29A differs from the bag shown in FIG. 27A only in respect that the strip portions (heat-sealed portions) 620 and 621 extended along the left and the right sides in the tube mentioned above are heat-sealed. The strip portion 620*a* of the water-soluble film 6 and the strip portion 620*b* of the water-soluble film 6 in FIG. 29B are superposed and fused to each other and these strip portions 620*a* and 620*b* jointly form the heat-sealed portion 620. The strip portion 621*a* of the water-soluble film 6 and the strip portion 621*b* of the water-soluble film 6 in FIG. 29B are superposed and fused to each other and these strip portions 621*a* and 621*b* jointly form the heat-sealed portion 621.

In the package using the bag shown in FIG. 29A, the outer bag film 60 can be peeled in the same manner as in the package using the bag shown in FIG. 27A. Incidentally, in the back supplying method mentioned above, a multiplicity of bags prepared for accommodating commodities therein are superposed and set in position in an automatic packing device. In this case, the bags shown in FIG. 27A have their left sides 601 and the right side 602 formed simply by folding the laminated film. The opposite sides 601 and 602, therefore, are more or less raised above their web portions. It is, therefore, difficult to have the multiplicity of bags neatly superposed. This difficulty possibly brings about inconveniences such as obstructing the operation of the automatic packing device. In contrast, the bags shown in FIG. 29A have the heat-sealed portions 620 and 621 formed along the opposite sides 601 and 602, the multiplicity of the bags can be neatly superposed without incurring such inconveniences as mentioned above.

Figure 30A:
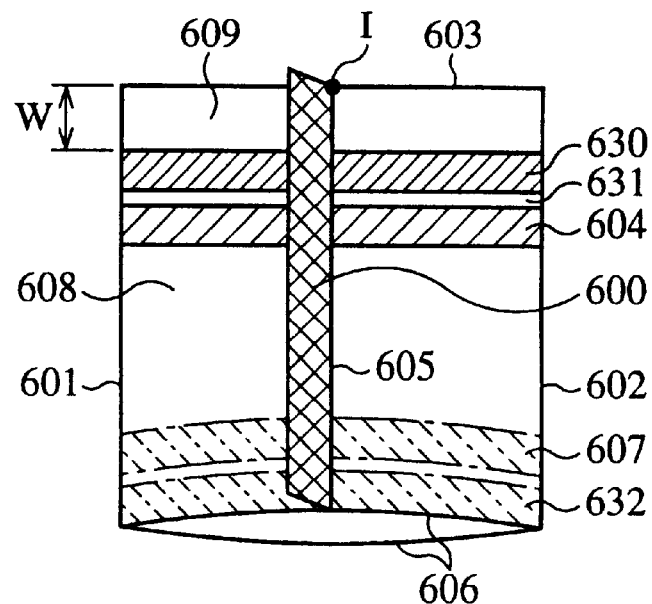
FIG. 30A is a diagram illustrating a bag according to a further embodiment of the present invention.
Figure 30B:
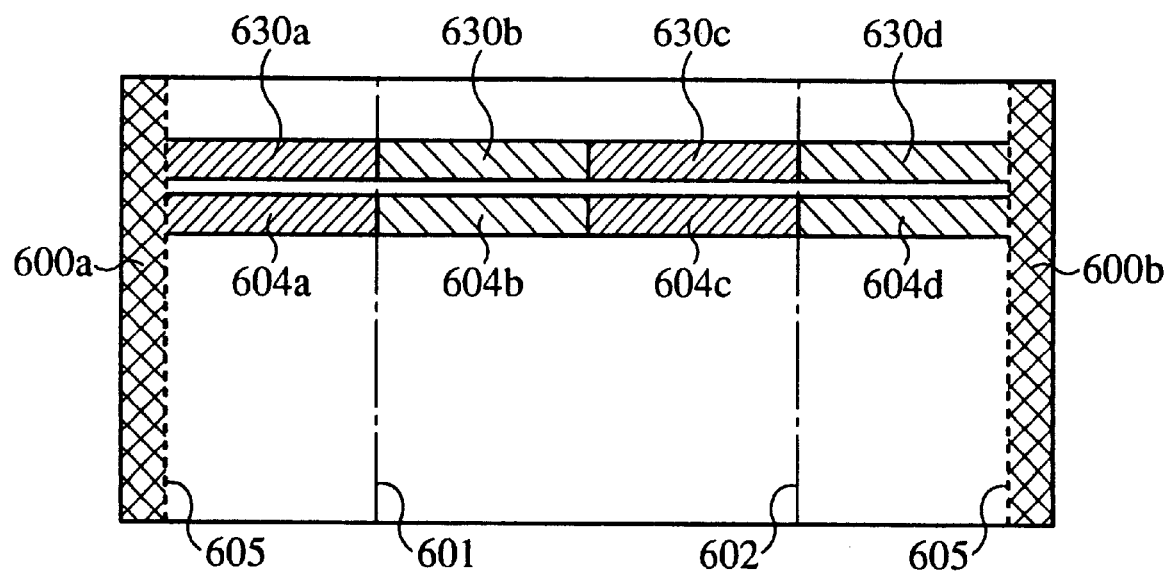
FIG. 30B is a developed diagram of the bag shown in FIG. 30A.

In FIG. 30A and FIG. 30B, identical and similar components found in FIG. 27A and FIG. 27B are denoted by like reference numerals. The description of these components will be omitted from the following description to avoid repetition. FIG. 30B depicts the bag shown in FIG. 30A in a developed state. The bag shown in FIG. 30A differs from the bag shown in FIG. 27A in respect that a heat-sealed portion 630 is formed so that a non-heat-sealed portion 631 having a hermetically sealed periphery is interposed between the non-heat-sealed portion 609 and the heat-sealed portion 604 occluding the area 608 destined to accommodate the commodity relative to the side of the end part side 603. In the present embodiment, as shown in FIG. 30A, the heat-sealed portion 630 is separated by a prescribed distance from the heat-sealed portion 604 and extended parallel to the heat-sealed portion 604. A portion 630*a* of the water-soluble film 6 and a portion 630*b* of the water-soluble film in FIG. 30B are superposed and fused to each other and a portion 630*c* of the water-soluble film 6 and a portion 630*d* of the water-soluble film are superposed and fused to each other. These portions 630*a*–630*d* jointly form the heat-sealed portion 630.

In the package using the bag shown in FIG. 30A, the outer bag film 60 can be peeled in the same manner as in the package using the bag shown in FIG. 27A. In the package using the bag shown in FIG. 30A, the area 608 destined to accommodate the commodity is doubly occluded by the heat-sealed portions 604 and 630 relative to the side of the end part side 603. Even when the water-soluble film 6 of the non-heat-sealed portion 603 happens to be degenerated by the ambient condition, there is no possibility of this degeneration exerting an adverse effect on the area destined to accommodate the commodity.

The procedure that consists in heat-sealing not only the strip portion 607 but also a strip portion 632 which is separated by a prescribed distance from the strip portion 607 and extended parallel thereto as shown in FIG. 30A after the insertion of the commodities in the bag proves advantageous in that the possibility of the outer bag film 60 being accidentally peeled from the end part side 606 is diminished. It is not always necessary to heat-seal additionally the strip portion 632. The strip portion 632 to be heat-sealed may be disposed as separated by a prescribed distance from the end part side 606 instead. This point similarly applies to the various other bags to be described below.

Figure 31A:
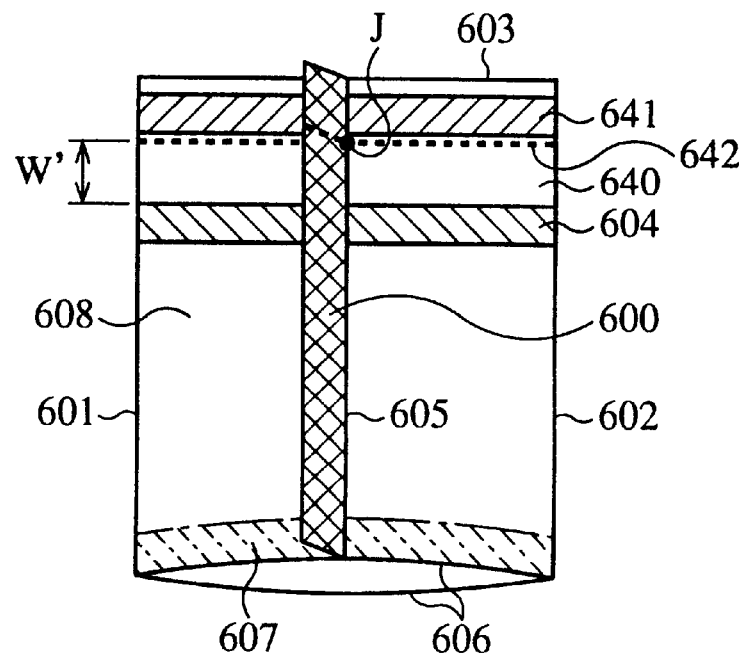
FIG. 31A is a diagram illustrating a bag according to another embodiment of the present invention.
Figure 31B:
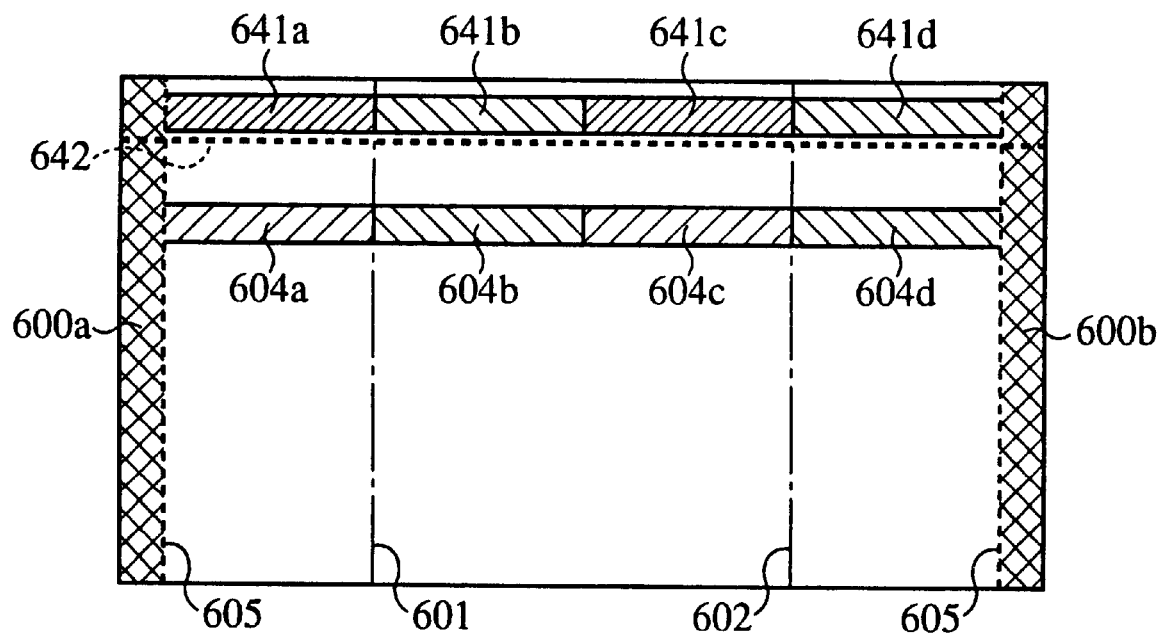
FIG. 31B is a developed diagram of the bag shown in FIG. 31A.

In FIG. 31A and FIG. 31B, identical and similar components found in FIG. 27A and FIG. 27B are denoted by like reference numerals. The description of these components will be omitted from the following description to avoid repetition. FIG. 31B depicts the bag shown in FIG. 31A in a developed state. The bag shown in FIG. 31A differs from the bag shown in FIG. 27A only in respect of the following point. In the bag shown in FIG. 31A, a heat-sealed portion 641 is formed so as to give rise to a non-heat-sealed portion 640 having a hermetically sealed periphery in the area outside the heat-sealed portion 604 occluding the area 608 destined to accommodate the commodity relative to the side of the end part side 603. In the present embodiment, as shown in FIG. 31A, the heat-sealed portion 641 is disposed as separated by severally prescribed distances from the end part side 603 and the heat-sealed portion 604 and extended parallel to the heat-sealed portion 604. In FIG. 31B, a portion 641*a* of the water-soluble film 6 and a portion 641*b* of the water-soluble film 6 are superposed and fused to each other and a portion 641*c* of the water-soluble film 6 and a portion 641*d* of the water-soluble film 6 are superposed and fused to each other. These portions 641*a*–641*d* jointly form the heat-sealed portion 641. The non-heat-sealed portion 640 is formed on the both sides of the boundary line 605 astride the boundary line 605. In the outside area mentioned above and the area of the heat-sealed portion 600 corresponding thereto both in the tube mentioned above, perforations 642 for excising a part of these areas are formed. In the present embodiment, the perforations 642 are linearly formed parallel to the lower side of the heat-sealed portion 641 at the position slightly lower than the lower side of the heat-sealed portion 641. One end (the point J) of the boundary line 605 between the heat-sealed portion 600 and the tube mentioned above remaining after the excision of the upper side portion of the perforations 642 in the outside area mentioned above and the area of the heat-sealed portion 600 corresponding thereto reaches the perforations 642. A part of the peripheral edge of the non-heat-sealed portion 640 (in the present embodiment, the upper side of the remaining non-heat-sealed portion 640) remaining after the separation of the upper side portion of the perforations 642 coincides with the perforations 642. It is appropriate that the width W' from the lower side of the non-heat-sealed portion 640 to the perforations 642 be equal to the width W in FIG. 27A.

In the package using the bag shown in FIG. 31A, the peeling of the outer bag film 60 is initiated by excising the upper side portion of the perforations 642 along this perforations 642. As a result, the package becomes practically the same state as the package using the bag shown in FIG. 13 and the remaining non-heat-sealed portion 640 corresponds to the non-heat-sealed portion 609 in FIG. 27A and the point J corresponds to the point I. After the excision of the upper side portion of the perforations 642, the outer bag film 60 can be as easily peeled as in the package using the bag shown in FIG. 27A. In the bag shown in FIG. 31A, since the non-heat-sealed portion 640 is not opened to the ambience except for the portion of the perforations 642, there is no possibility of the water-soluble film 6 in the non-heat-sealed portion 640 being degenerated by the ambient condition.

Figure 32:
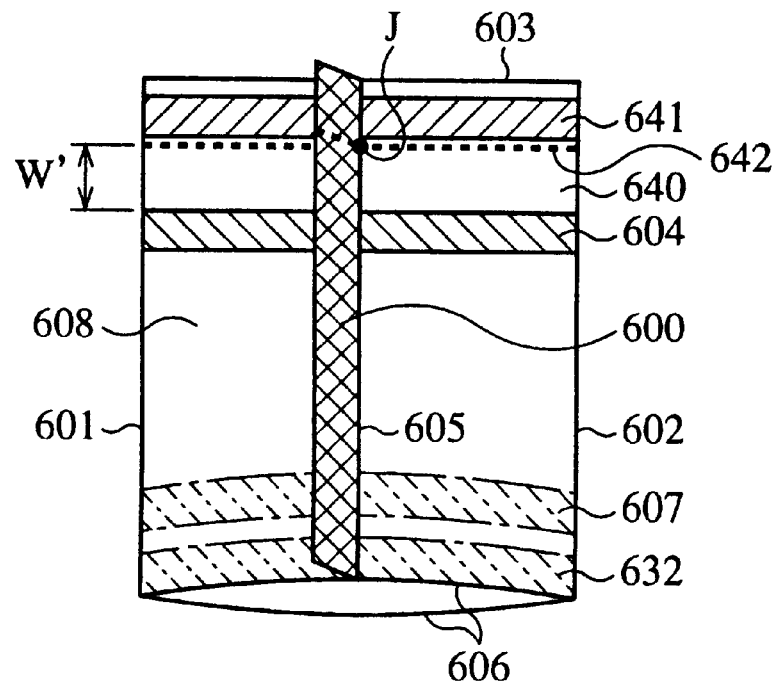
FIG. 32 is a diagram illustrating a bag according to a further embodiment of the present invention.

In the embodiment shown in FIG. 31A, the strip portion 607 along the end part side 606 is destined to be heat-sealed after the commodity has been inserted in the bag. Alternatively, it may contemplate heat-sealing the strip portions 607 and 632 as shown in FIG. 32 similarly to the embodiment shown in FIG. 30A. This point similarly applies to the various other bags which will be described below. The bag shown in FIG. 32 is identical with the bag shown in FIG. 31A.

Figure 33A:
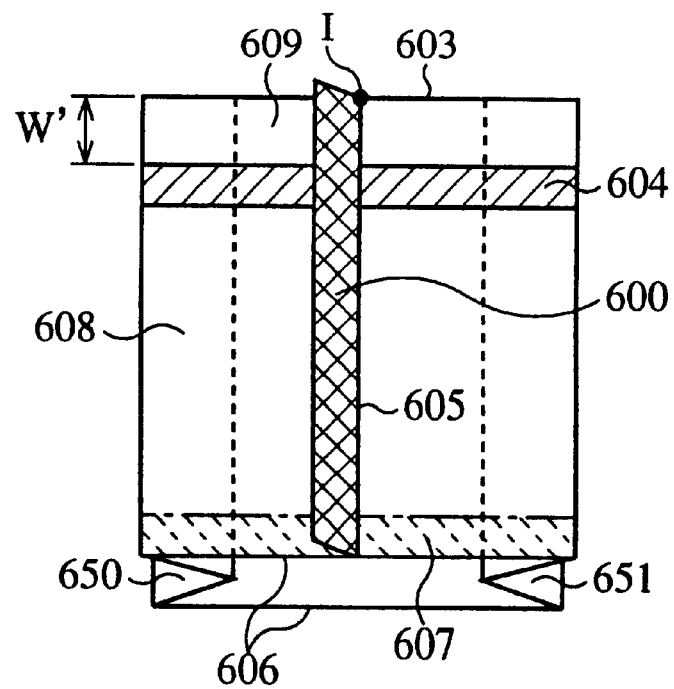
FIG. 33A is a diagram illustrating a bag according to another embodiment of the present invention.
Figure 33B:
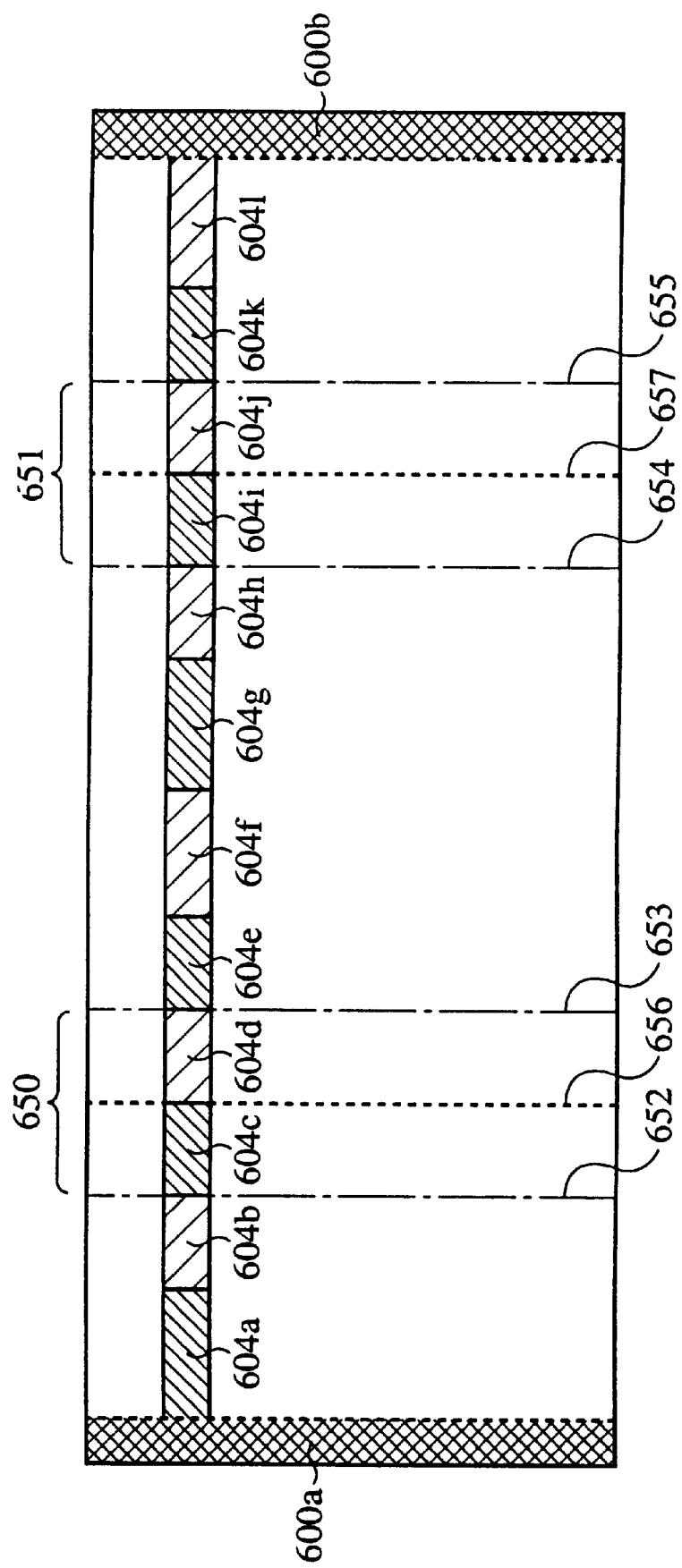
FIG. 33B is a developed diagram of the bag shown in FIG. 33A.

In FIG. 33A and FIG. 33B, identical and similar components found in FIG. 27A and FIG. 27B are denoted by like reference numerals. The description of these components will be omitted from the following description to avoid repetition. FIG. 33B depicts the bag shown in FIG. 33A in a developed state. While the bag shown in FIG. 33A is a backlining-type bag like the bag shown in FIG. 27A, the bag shown in FIG. 33A is a gusset-type bag provided with gussets 650 and 651. In the bag shown in FIG. 33A, the rectangular laminated film is folded inwardly along lines 652–655 in FIG. 33B and folded outwardly along lines 656 and 657 for the purpose of forming the gussets 650 and 651. In FIG. 33B, the portion 604a and a portion 604f, the portion 604b and the portion 604c, the portion 604d and a portion 604e, a portion 604g and a portion 604l, a portion 604h and a portion 604i, a portion 604j and a portion 604k are severally superposed and the corresponding portions of the water-soluble film 6 are fused. These portions 604a–604l jointly form the heat-sealed portion 604.

In the package using the bag shown in FIG. 33A, the outer bag film 60 can be peeled in the same manner as in the package using the bag shown in FIG. 27A.

Figure 34A:
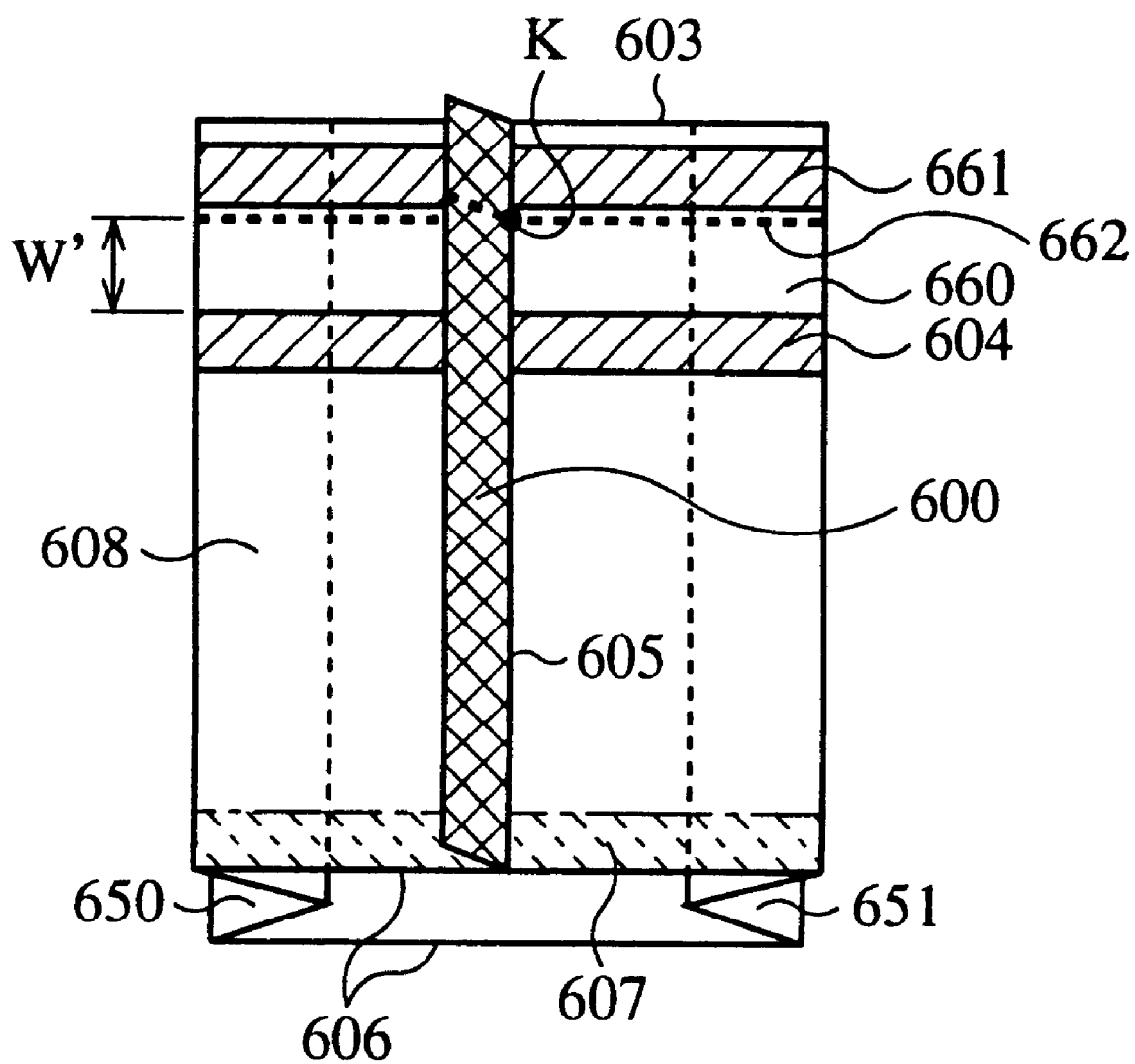
FIG. 34A is a diagram illustrating a bag according to a further embodiment of the present invention.
Figure 34B:
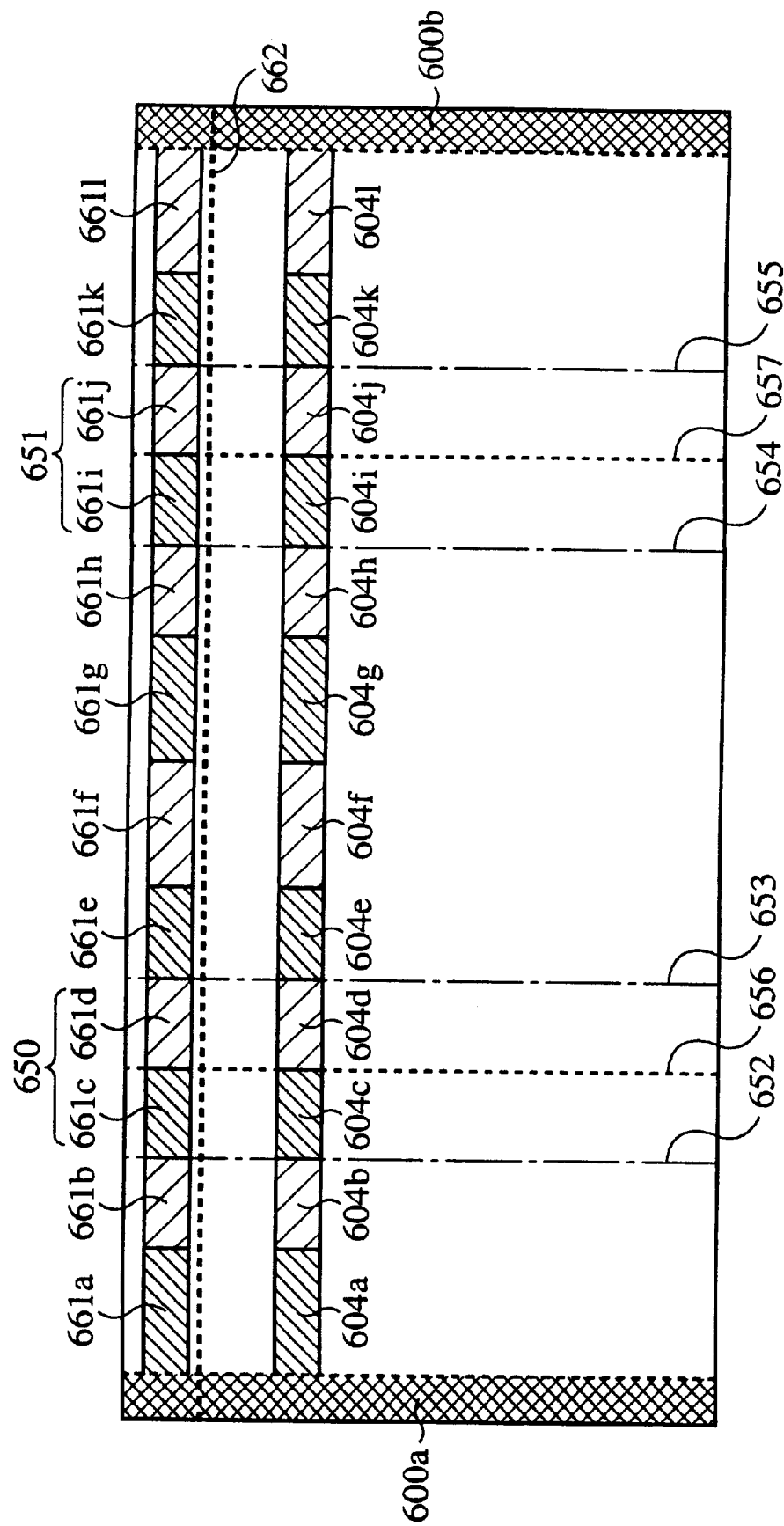
FIG. 34B is a developed diagram of the bag shown in FIG. 34A.

In FIG. 34A and FIG. 34B, identical and similar components found in FIG. 33A and FIG. 33B are denoted by like reference numerals. The description of these components will be omitted from the following description to avoid repetition. FIG. 34B depicts the bag shown in FIG. 34A in a developed state. The bag shown in FIG. 34A differs from the bag shown in FIG. 33A only in the following point. To be specific, in the bag shown in FIG. 34A, a heat-sealed portion 661 is formed so as to give rise to a non-heat-sealed portion 660 having a hermetically sealed periphery in the area outside the heat-sealed portion 604 occluding the area 608 destined to accommodate the commodity relative to the side of the end part side 603. In the present embodiment, the heat-sealed portion 661 is formed as separated by severally prescribed distances from the end part side 603 and the heat-sealed portion 604 and extended parallel to the heat-sealed portion 604 as shown in FIG. 34A. In FIG. 34B, a portion 661a and a portion 661f, a portion 661b and a portion 661c, a portion 661d and a portion 661e, a portion 661g and a portion 661l, a portion 661h and a portion 661i, a portion 661j and a portion 661k are severally superposed and the corresponding portions of the water-soluble film 6 are fused. These portions 661a–661l jointly form the heat-sealed portion 604. The non-heat-sealed portion 660 is formed on the both sides of the boundary line 605 astride the boundary line 605. In the outside area mentioned above and the area of the heat-sealed portion 600 corresponding thereto both in the tube mentioned above, perforations 662 for excising a part of these areas are formed. In the present embodiment, the perforations 662 are linearly formed parallel to the lower side of the heat-sealed portion 661 at the position slightly lower than the lower side of the heat-sealed portion 661. One end (the point K) of the boundary line 605 between the heat-sealed portion 600 and the tube mentioned above remaining after the excision of the upper side portion of the perforations 662 in the aforementioned outside area and the area of the heat-sealed portion 600 corresponding thereto reaches the perforations 642. A part of the peripheral edge of the non-heat-sealed portion 660 (in the present embodiment, the upper side of the remaining non-heat-sealed portion 660) remaining after the excision of the upper side portion of the perforations 662 coincides with the perforations 662. It is appropriate that the width W' from the lower side of the non-heat-sealed portion 660 to the perforations 662 be equal to the width W in FIG. 27A.

In the package using the bag shown in FIG. 34A, the peeling of the outer bag film 60 is initiated by excising the upper side portion of the perforations 662 along this perforations 662. As a result, the package assumes practically the same state as the package using the bag shown in FIG. 33A and the remaining non-heat-sealed portion 660 corresponds to the non-heat-sealed portion 609 in FIG. 13 and the point K corresponds to the point I. After the excision of the upper side portion of the perforations 662, the outer bag film 60 can be as easily peeled in a manner similar to the package using the bag shown in FIG. 27A. In the bag shown in FIG. 34A, since the non-heat-sealed portion 660 is not opened to the ambience except for the portion of the perforations 662, there is no possibility of the water-soluble film 6 in the non-heat-sealed portion 660 being degenerated by the ambient condition.

Figure 35A:
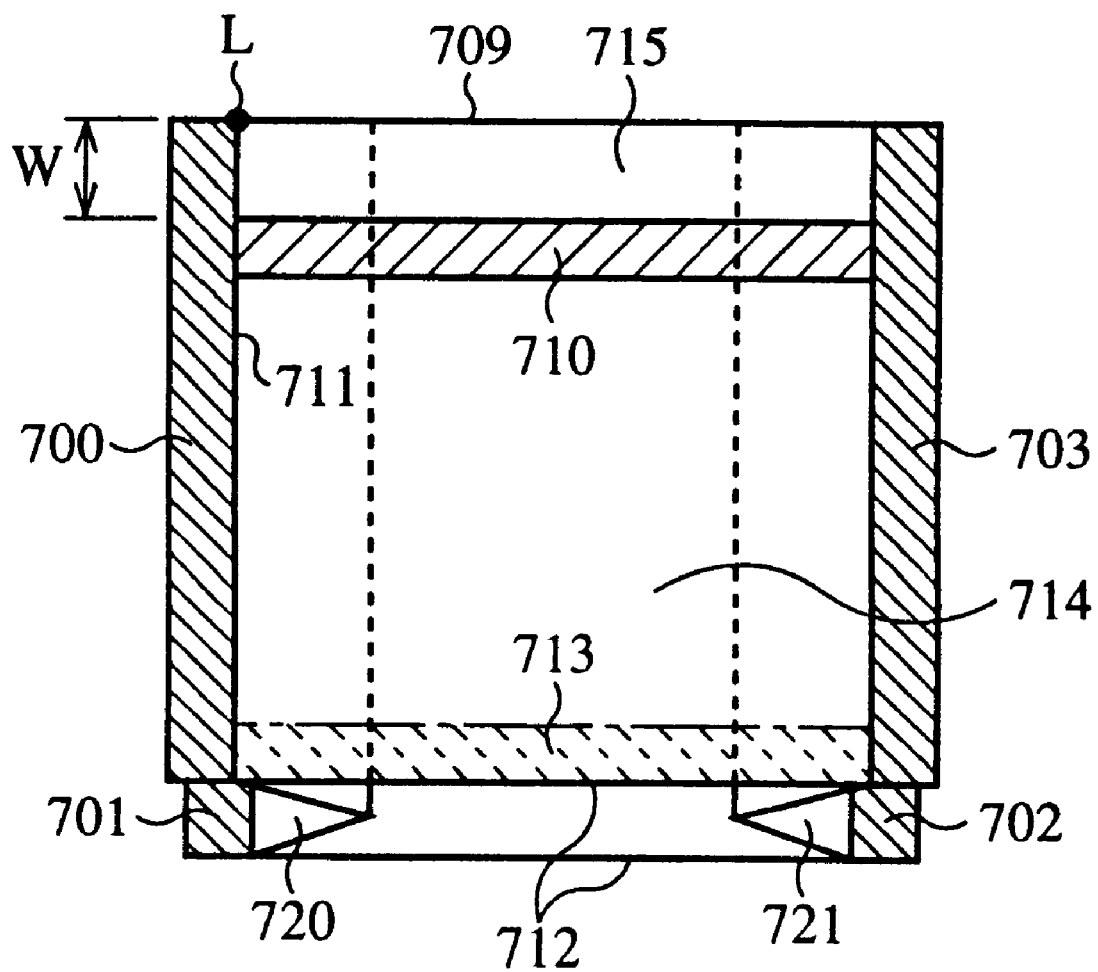
FIG. 35A is a diagram illustrating a bag according to another embodiment of the present invention.
Figure 35B:
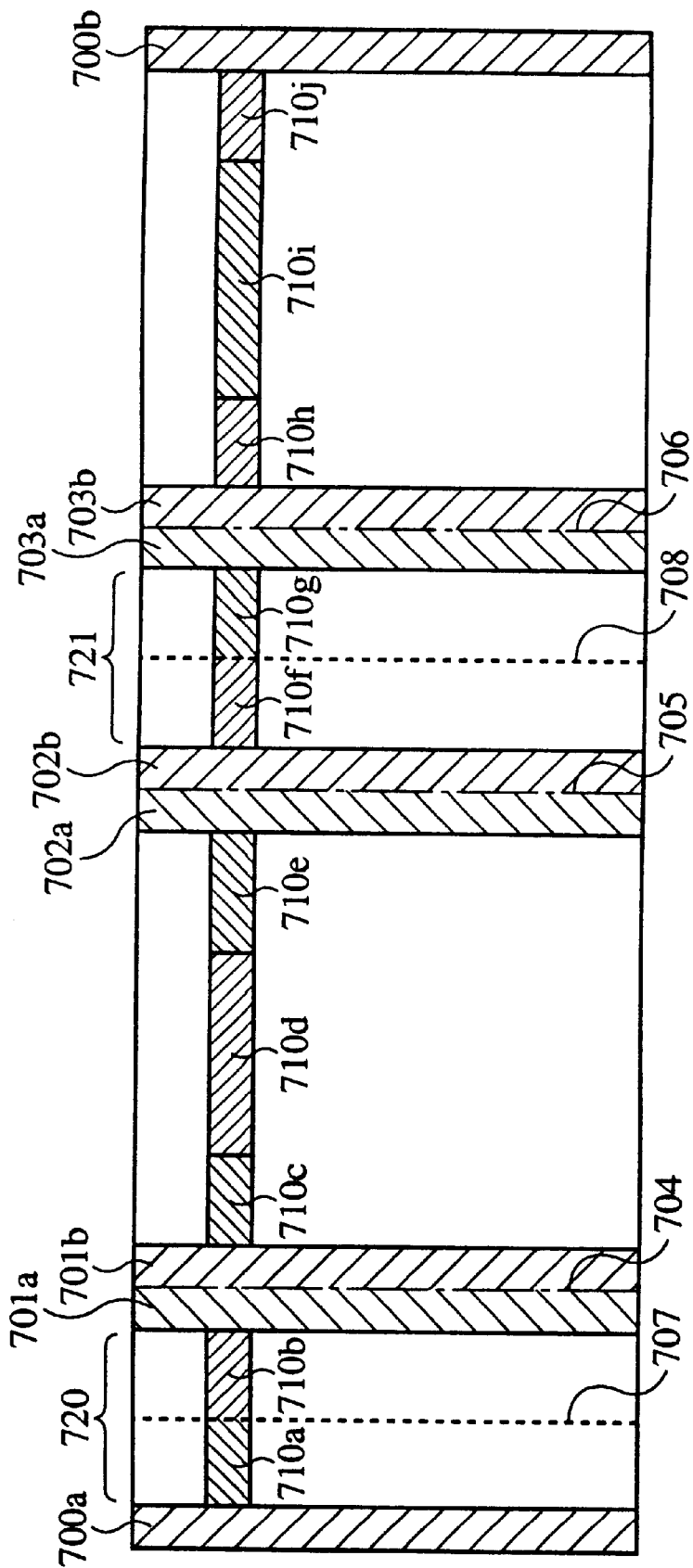
FIG. 35B is a developed diagram of the bag shown in FIG. 35A.

The bag shown in FIG. 35A is formed in the form of a gusset-type bag with one rectangular laminated film (the laminated film of the structure of FIG. 1) shown in FIG. 35B. FIG. 35B depicts the bag shown in FIG. 35A in a developed state. In FIG. 35B, as in the developed diagram mentioned above, the water-soluble film 6 is disposed in the foreground side and the outer bag film 60 in the background side with respect to the surface of the sheet of the figure. In the bag shown in FIG. 35A, a first strip portion 700*a* extending along the left side and a second strip portion 700*b* extending along the right side of the laminated film shown in FIG. 35B are superposed so that the corresponding portions of the water-soluble film of the strip portions 700*a* and 700*b* face to each other. The corresponding portions of the water-soluble film of the strip portions 700*a* and 700*b* are fused to each other. In such a manner, the portion of the laminated film other than the strip portions 700*a* and 700*b* forms a tube. In FIG. 35A, 700 denotes a heat-sealed portion consisting of the strip portions 700*a* and 700*b*. In the present embodiment, the heat-sealed portion 700 is disposed in a side portion and does not constitute a backlining part. In the bag shown in FIG. 35A, the rectangular laminated film is folded inwardly along lines 704–706 and folded outwardly along lines 707 and 708 so as to give rise to gussets 720 and 721. In the bag shown in FIG. 35A, a strip portion (heat-sealed portion) 710 which is separated by a prescribed distance W from an upper end part side 709 of the tube mentioned above and extended parallel to the end part side 709 is heat-sealed. That is, a portion 710*a* and a portion 710*j*, a portion 710*b* and a portion 710*c*, a portion 710*d* and a portion 710*i*, a portion 710*e* and a portion 710*f*, and a portion 710*g* and a portion 710*h* in FIG. 35B are severally superposed and the corresponding portions of the water-soluble film 6 are fused. These portions 710*a*–710*j* jointly form the heat-sealed portion 710. In the bag shown in FIG. 35A, the strip portions (heat-sealed portions) 701–703 along the sides corresponding to the folding lines 704–706 mentioned above are heat-sealed. Specifically, a portion 701*a* and a portion 701*b*, a portion 702*a* and a portion 702*b*, and a portion 703*a* and a portion 703*b* in FIG. 35B are severally superposed and the corresponding portions of the water-soluble film 6 are fused. The portions 701*a* and 701*b* form a heat-sealed portion 701, the portions 702*a* and 702*b* form a heat-sealed portion 702, and the portions 703*a* and 703*b* form a heat-sealed portion 703. One end (the upper end, the point L) of a boundary line 711 between the heat-sealed portion 700 and the tube mentioned above reaches the end part side 709. In the present embodiment, the other end (the lower end) of boundary line 711 similarly reaches a lower end part side 712. In the bag shown in FIG. 35A, the area in the tube mentioned above between the heat-sealed portion 710 and a strip portion 713 extended along the end part side 712 is an area 714 destined to accommodate the commodity. The strip portion 713 is destined to be heat-sealed after a commodity has been inserted into the bag through the opened end part side 712. The strip portion 713 to be heat-sealed may be separated by a slight distance from the end part side 712. As a result, the heat-sealed portion 710 occludes the area 714 destined to accommodate the to commodity relative to the side of the end part side 709. In the area outside the heat-sealed portion 710 in the tube mentioned above, a non-heat-sealed portion 715 is formed. In the present embodiment, the non-heat-sealed portion 715 is formed in the shape of a strip of width W along the end part side 709. The non-heat-sealed portion 715 is formed on one side (right side) of the boundary line 711 so as to be contiguous to the boundary line 711. A part of the peripheral edge of the non-heat-sealed portion 715 (namely, the upper side of the non-heat-sealed portion 715) includes one end (the point L) of the boundary line 711 and forms a part of the end part side 709.

In the package using the bag shown in FIG. 35A, the point L in FIG. 35A corresponds to the point A in FIG. 14A–FIG. 14D and the point A in FIG. 26A–FIG. 26D. The outer bag film 60 can be easily peeled from this package by the method of peeling described above with reference to FIG. 14A–FIG. 14D and the method of peeling described above with reference to FIG. 26A–FIG. 26D.

The bag shown in FIG. 35A acquires an exalted self-sustaining property owing to the heat-sealed portions 700–703. A multiplicity of bags of this structure can be neatly superposed due to the heat-sealed portions 700–703. In the bag shown in FIG. 33A and the bag shown in FIG. 34A, heat-sealed portions corresponding to the heat-sealed portions 700–703 may be formed.

Figure 36A:
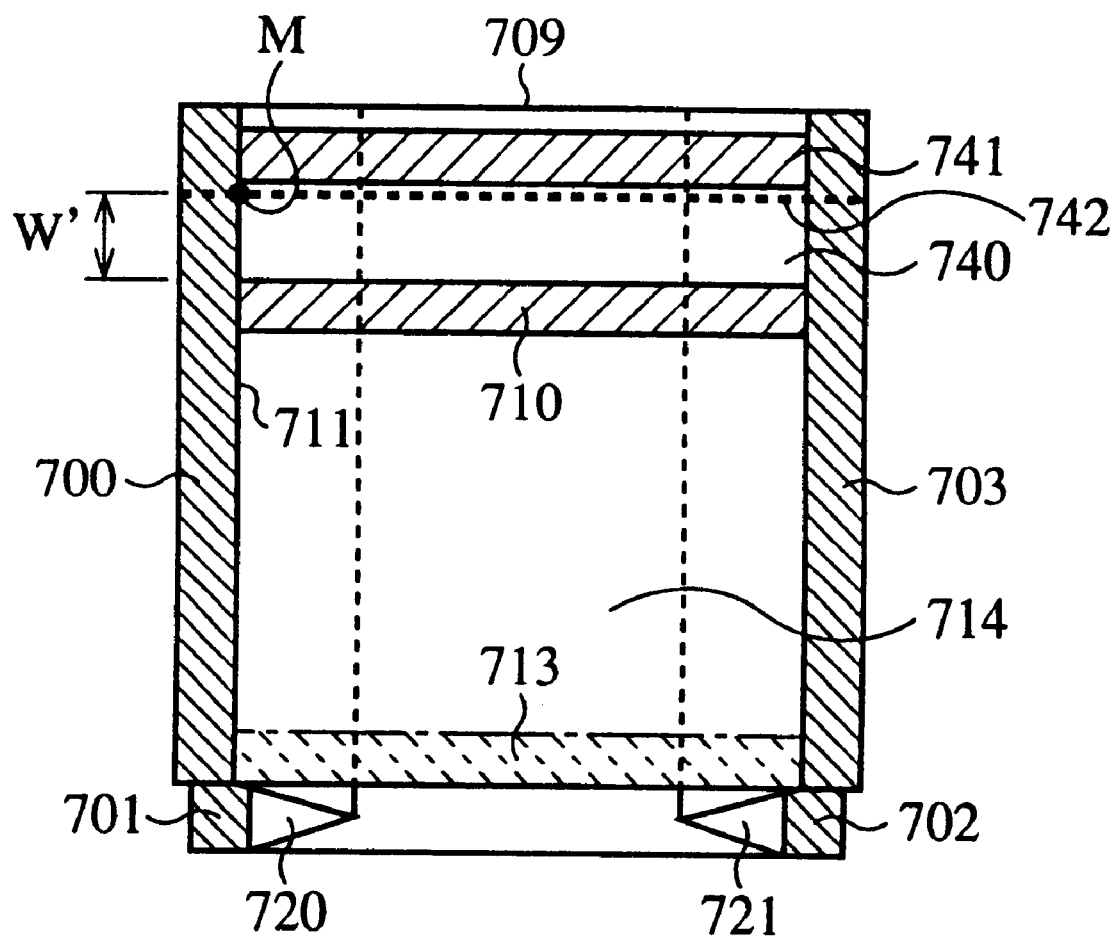
FIG. 36A is a diagram illustrating a bag according to a further embodiment of the present invention.
Figure 36B:
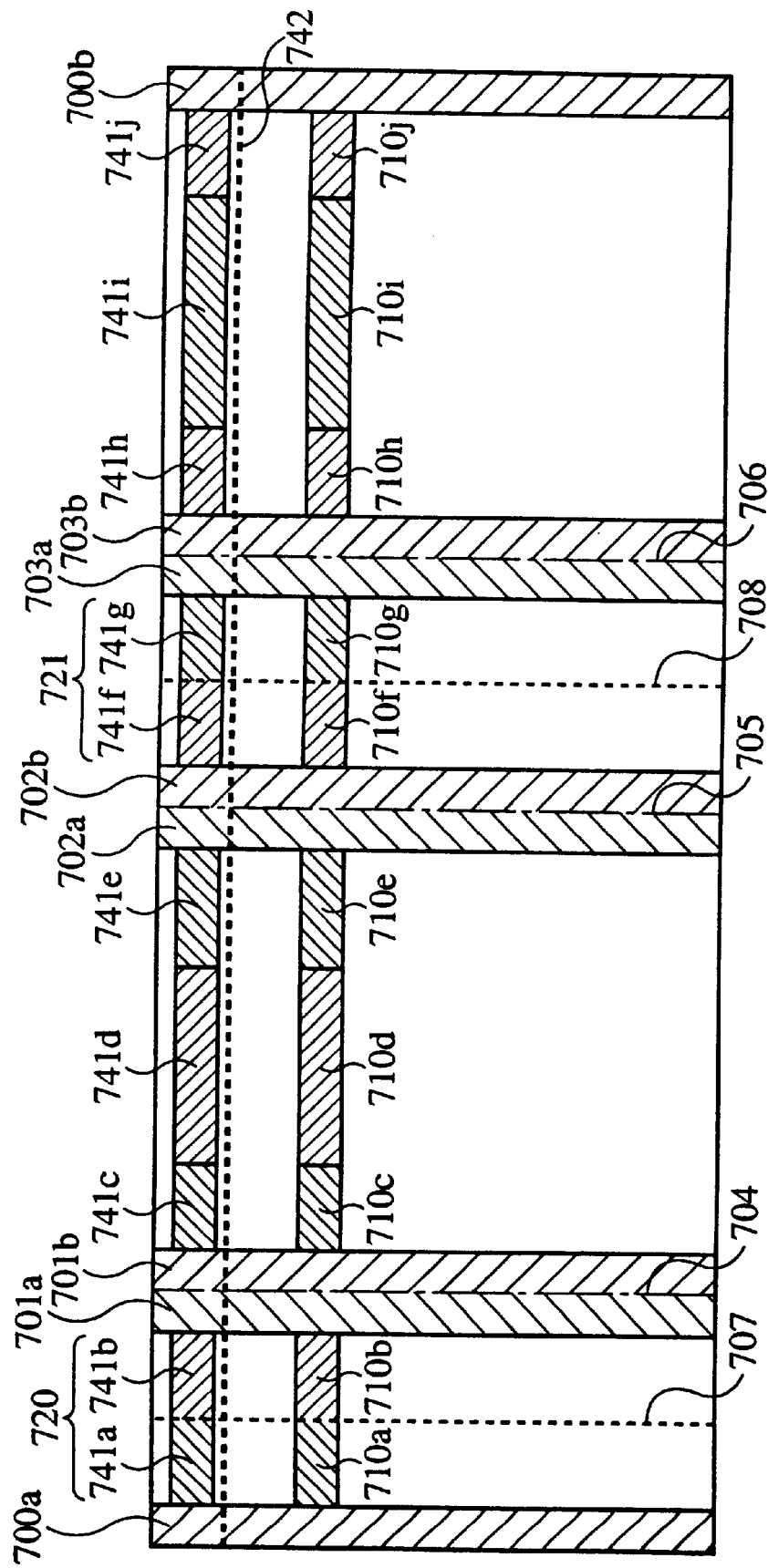
FIG. 36B is a developed view of the bag shown in FIG. 36A.

In FIG. 36A and FIG. 36B, identical and similar components found in FIG. 35A and FIG. 35B are denoted by like reference numerals. The description of these components will be omitted from the following description to avoid repetition. FIG. 36B depicts the bag shown in FIG. 36B in a developed state. The bag shown in FIG. 36A differs from the bag shown in FIG. 35A only in the following point. Specifically, in the bag shown in FIG. 36A, a heat-sealed portion 741 is formed so as to give rise to a non-heat-sealed portion 740 having a hermetically sealed periphery in an area outside in the tube which is positioned outside the heat-sealed portion 710 occluding the area 714 destined to accommodate the commodity relative to the side of the end part side 709. In the present embodiment, the heat-sealed portion 741 is formed as separated by severally prescribed distances from the end part side 709 and the heat-sealed portion 710 and extended parallel to the heat-sealed portion 710 as shown in FIG. 36B. In FIG. 36B, a portion 741*a* and a portion 741*j*, a portion 741*b* and a portion 741*c*, a portion 741*d* and a portion 741*i*, a portion 741*e* and a portion 741*f*, and a portion 741*g* and a portion 741*h* are severally superposed and the corresponding portions of the water-soluble film 6 are fused. These portions 741*a*–741*j* jointly form the heat-sealed portion 741. The non-heat-sealed portion 740 is formed on one side (right side) of the boundary line 711 so as to be contiguous to the boundary line 711. In the aforementioned outside area and the area of the heat-sealed portion 700 corresponding thereto both in the tube, perforations 741 for excising a part of these areas are formed. In the present embodiment, the perforations 741 are linearly formed parallel to the lower side of the heat-sealed portion 741 at the position slightly lower than the lower side of the heat-sealed portion 741. One end (the point M) of the boundary line 711 between the heat-sealed portion 700 and the tube mentioned above remaining after the excision of the upper side portion of the perforations 742 in the outside area mentioned above and the area of the heat-sealed portion 700 corresponding thereto reaches the perforations 742. A part of the peripheral edge of the non-heat-sealed portion 740 (in the present embodiment, the upper side of the remaining non-heat-sealed portion 740) remaining after the excision of the upper side portion of the perforations 742 coincides with the perforations 742. It is appropriate that the width W' from the lower side of the non-heat-sealed portion 740 to the perforations 742 be equal to the width W in FIG. 13.

In the package using the bag shown in FIG. 36A, the peeling of the outer bag film 60 is initiated by excising the upper side portion of the perforations 742 along the perforations 742. As a result, this package assumes practically the same state as the package using the bag shown in FIG. 35A. The remaining non-heat-sealed portion 740 corresponds to the non-heat-sealed portion 715 in FIG. 34A and the point M corresponds to the point L. After the excision of the upper side portion of the perforations 742, the outer bag film 60 can be easily peeled in a manner similar to the package using the bag shown in FIG. 35A. In the bag shown in FIG. 36A, since the non-heat-sealed portion 740 is not open to the ambience except for the portion of the perforations 742, there is no possibility that the water-soluble film 6 in the non-heat-sealed portion 740 is degenerated by the ambient condition.

While there have been shown and described present preferred embodiments of the invention, it is to be distinctly understood that the invention is not limited thereto but may be otherwise variously embodied and practiced within the scope of the claims.

As described above, the present invention provides a laminated film which allows a bag having a double-wall structure consisting substantially of an outer bag and an inner bag formed of a water-soluble film and excelling in outer bag peeling property to be produced by the use of existing facilities, a method for the production of the laminated film, and a bag and a package using the laminated film.

The present invention further provides a bag and a package which have a double-wall structure consisting substantially of an outer bag and an inner bag formed of a water-soluble film and allow the production thereof to be effected by the use of the existing facilities and, when a commodity accommodated therein is to be used, permit the outer bag film to be easily peeled and a method for peeling the outer bag film.

What is claimed is:

1. A laminated film comprising:

an outer-layer-film including one or more layers;

a water-soluble film; and an intermediate layer interposed between said outer-layer-film and said water-soluble film, said intermediate layer containing high-pressure polyethylene oxidized to a prescribed degree at least on a surface thereof contiguous to said water-soluble film;

wherein said outer-layer-film and said intermediate layer adhere fast to each other; and said intermediate layer and said water-soluble film directly contact each other and adhere so weakly to each other as to be peelable.

2. A laminated film according to claim 1, wherein said intermediate layer contains an ethylene.α-olefin copolymer elastomer mixed with said high-pressure polyethylene.

3. A laminated film according to claim 1, wherein the carbonyl groups of said oxidized high-pressure polyethylene on the surface of said intermediate layer are bound to the hydroxyl groups of a surface of said water-soluble film.

4. A laminated film according to claim 1, wherein said water-soluble film comprises at least one material selected from the group consisting of polyvinyl alcohol, vinyl acetate, vinyl acetate type resin, polyacrylamide, polyethylene oxide, and polyvinylpyrrolidone.

5. A laminated film according to claim 1, wherein said water-soluble film has the surface thereof contiguous to said intermediate layer subjected to a corona treatment.

6. A bag made of at least one laminated film set forth in claim 1, said at least one laminated film being formed in the shape of a bag opened on one side thereof;

wherein said at least one laminated film is superposed so that said water-soluble film is positioned inside; and prescribed portions of the superposed laminated film are heat-sealed so that the parts of said water-soluble film facing to each other at the prescribed portions are fused to each other.

7. A package comprising:

a hermetically sealed bag made of at least one laminated film set forth in claim 1; and a prescribed commodity placed in said bag;

wherein said at least one laminated film is superposed so that said water-soluble film is positioned inside; and prescribed portions of the superposed laminated film are heat-sealed so that the parts of said water-soluble film facing to each other at the prescribed portions are fused to each other.

8. A package according to claim 7, wherein perforations for tearing are formed in the heat-sealed portion of said package.

9. A package comprising:

a hermetically sealed bag made of at least one laminated film set forth in claim 1, said water-soluble film not being formed on prescribed edge portions of said outer-layer-film; and a prescribed commodity placed in said bag; wherein said at least one laminated film is superposed so that said water-soluble film is positioned inside and that said edge portions are shifted and faced to each other; and prescribed portions of the superposed laminated film are heat-sealed so that the parts of said water-soluble film facing to each other at the prescribed portions are fused to each other.

10. A package according to claim 7, wherein said bag has a non-heat-sealed portion enclosed with said heat-sealed portions and taking no part in accommodating said commodity; and said bag has a notched part for tearing formed in the edge portion corresponding to said non-heat-sealed portion.

11. A package according to claim 7, wherein said commodity is agricultural chemicals, medicament, food, or ground bait.

* * * * *

UNITED STATES PATENT AND TRADEMARK OFFICE
CERTIFICATE OF CORRECTION

PATENT NO.     : 6,440,508 B1
DATED          : August 27, 2002
INVENTOR(S)    : Yoshiaki Tokita and Takahiro Takagi It is certified that error appears in the above-identified patent and that said Letters Patent is hereby corrected as shown below:

Title page,
Item [73], after "Co.," insert -- Ltd., --.

Column 1,
Line 28, delete "." (period);
Line 35, after "method"", delete "." (period);

Column 4,
Line 30, change "." to -- • -- (period to raised dot); and
Line 62, change "." to -- • -- (period to raised dot).

Column 6,
Line 24, change "$[CH_2-CH_2]n$" to -- $[CH_2 - CH_2] n$ --.

Column 8,
Line 9, change "." to -- • -- (period to raised dot);
Line 14, change "." to -- • -- (period to raised dot); and Column 9,
Line 44, delete period after "scribed".

Column 10,
Line 29, delete hyphen after "group".

Column, 11
Line 13, delete period after "odor,"; and

Column 23,
Line 49, "FIG. 14A" starts a new paragraph; and
Line 60, "FIG. 15B" starts a new paragraph.

Column 25,
Line 53, change "." to -- • -- (period to raised dot).

Column 26,
Line 30, change "." to -- • -- (period to raised dot).

UNITED STATES PATENT AND TRADEMARK OFFICE
CERTIFICATE OF CORRECTION

PATENT NO. : 6,440,508 B1
DATED : August 27, 2002
INVENTOR(S) : Yoshiaki Tokita and Takahiro Takagi It is certified that error appears in the above-identified patent and that said Letters Patent is hereby corrected as shown below:

Column 27,
Line 10, change "c" (under "Species" column) to -- C --; and
Line 14, change "." to -- • -- (period to raised dot).

Column 29,
Line 40, change "ethylene- a -olefin" to -- ethylene • α-olefin --.

Column 30,
Line 21, change "." to -- • -- (period to raised dot).

Column 41,
Line 64, delete "." (period).

Column 49,
Line 43, change "." to -- • -- (period to raised dot).

Signed and Sealed this

Third Day of June, 2003

JAMES E. ROGAN
*Director of the United States Patent and Trademark Office*